US007725509B2

(12) United States Patent
Raff

(10) Patent No.: US 7,725,509 B2
(45) Date of Patent: May 25, 2010

(54) COMMUNICATIONS SYSTEM AND METHOD

(75) Inventor: Adam Raff, Crowthorne (GB)

(73) Assignee: Infederation Ltd., Berkshire (GB)

( * ) Notice: Subject to any disclaimer, the term of this patent is extended or adjusted under 35 U.S.C. 154(b) by 669 days.

(21) Appl. No.: 10/542,365

(22) PCT Filed: Dec. 19, 2003

(86) PCT No.: PCT/GB03/05617
§ 371 (c)(1),
(2), (4) Date: Jan. 30, 2008

(87) PCT Pub. No.: WO2004/064349

PCT Pub. Date: Jul. 29, 2004

(65) Prior Publication Data
US 2008/0140640 A1 Jun. 12, 2008

(30) Foreign Application Priority Data
Jan. 14, 2003 (GB) ................. 0300790.3

(51) Int. Cl.
G06F 17/30 (2006.01)
G06F 12/00 (2006.01)
(52) U.S. Cl. .................................. 707/913
(58) Field of Classification Search ............ 707/104.1, 707/101, 102, 10
See application file for complete search history.

(56) References Cited
U.S. PATENT DOCUMENTS
6,052,122 A   4/2000  Dunn et al.

| 6,112,181 | A | 8/2000 | Shear et al. |
| 7,139,728 | B2* | 11/2006 | Rigole ................... 705/26 |
| 2002/0161664 | A1* | 10/2002 | Shaya et al. ............ 705/26 |
| 2004/0034537 | A1* | 2/2004 | Gengarella et al. ....... 705/1 |
| 2004/0034573 | A1* | 2/2004 | Cohen .................. 705/26 |

FOREIGN PATENT DOCUMENTS
GB        2375921       11/2002
WO        WO-0115480    3/2001

* cited by examiner

Primary Examiner—Kuen S Lu
(74) Attorney, Agent, or Firm—Nixon Peabody LLP; Jeffrey L. Costellia

(57) ABSTRACT

A system for matching information comprises a first sub-system adapted to store at least one profile, wherein the said at least one profile contains predetermined attributes and requirements and predetermined introduction information, and a second sub-system adapted to store at least one profile, wherein the said at least one profile contains predetermined attributes and requirements and predetermined introduction information, an introduction processor is programmed to receive data relating to the said introduction information from the said first sub-system, a match processor comprised within the said first sub-system is programmed to receive information relating to requirements of the said second sub-system when the said introduction processor registers a compatible profile introduction between the said first sub-system and the said second sub-system.

54 Claims, 11 Drawing Sheets

User A

| Field Type | Field Name | Attributes | Requirements | Received Requirements | Result |
|---|---|---|---|---|---|
| Selection | Sex | Female | Male | Female | Match |
| Int_Numeric | Age | 27 | Min = 25, Max =30 Mandatory = True | Min = 20, Max =30 Mandatory = True | Match |
| Selection | Education | "O-Levels/GCSE" "A-Levels" "University Degree" | "University Degree" | "NULL" | Match |
| Selection | Hair Colour | "Brown" | "NULL" | Include = "NULL" Exclude = "Grey" | Match |
| Fit_Numeric | Height | 5' 8" | Min = 5' 9", Max = NULL | Min =NULL, Max = 6' 1" | Match |
| Int_Numeric | Salary | Not entered | Min = NULL, Max = NULL Mandatory = False | Min = 15K, Max =NULL Mandatory = False | Match |
| Selection | Commitment Level | "Good Friendship" "Long Term Partner" "Casual Sex" | "Casual Sex" | "Casual Sex" OR "Long Term Partner" | Match |

User B

| Field Type | Field Name | Attributes | Requirements | Received Requirements | Result |
|---|---|---|---|---|---|
| Selection | Sex | Male | Female | Male | Match |
| Int_Numeric | Age | 31 | Min = 20, Max =30 Mandatory = True | Min = 25, Max =30 Mandatory = True | Match |
| Selection | Education | "O-Levels/GCSE" "A-Levels" "University Degree" | "NULL" | "University Degree" | Match |
| Selection | Hair Colour | "Black" | Include = "NULL" Exclude = "Grey" | "NULL" | Match |
| Fit_Numeric | Height | 6' 1" | Min =NULL, Max = 6' 1" | Min = 5' 9", Max = NULL | Match |
| Int_Numeric | Salary | 30K | Min = 15K, Max = NULL Mandatory = False | Min = NULL, Max = NULL Mandatory = False | Match |
| Selection | Commitment Level | "Casual Sex" "Long Term Partner" | "Casual Sex" OR "Long Term Partner" | "Casual Sex" | Match |

Figure 10

COMMUNICATIONS SYSTEM AND METHOD

BACKGROUND OF THE INVENTION

1. Field of the Invention

This invention relates to a system and method for matching information.

2. Description of the Related Art

There are many situations in which a user might want to match information with other users. The Internet provides the ability for communication between computers throughout the world, and puts the information stored on a multitude of remote computers at the disposal of any given computer user. These remote computers may be computers that contain data that has been classified, arranged and otherwise stored and sorted in accordance with predetermined criteria. The data contained therein is likely to be located in specific fields.

Such data can have many uses, both commercial and non-commercial. Non-commercial uses include file sharing and general information exchanges. Commercial uses include on-line retail facilities.

In order to find the correct information, programs known as "search engines" have been developed which prompt the user to enter a search term or terms and the search engine will search at least a portion of the Internet to find an answer to the search query. For example, a person wishing to search for a house in Cardiff might wish to conduct a search among Cardiff's estate agents without actually going there. It is of course entirely possible to do this already. A user could find the web site of any estate agents in the Cardiff area using a standard Internet search-engine and visit each of these sites. On each site the user could fill in the appropriate form to specify their property preferences, initiate a search using these preferences, and view the details of any matching properties.

On the conclusion of this lengthy and repetitive process, the user could be satisfied that they have conducted a reasonable search of at least a sizeable portion of the properties currently available in the Cardiff area. However, if some days later the user wishes to check for any properties that have become available since their previous search, the user is required to repeat the same lengthy process from scratch.

In a commercial arena, such search engines therefore allow users to search to some limited degree at least some portion of the information held within various companies' web pages; but the ability of the user to identify actual products for purchase is limited by the necessity of the consumer to choose an applicable web site for a particular product. Furthermore, such searches are not context driven, and rely almost exclusively on simple text-based pattern matches against the contents of publicly accessible web pages. Consequently, complex, structured information of the type that might be stored within a database is rarely accessible to a standard search engine.

Dedicated company web pages provide a means for customers to search a company's "database" of information. However, these methods are not flexible in any way, and rely on a significant initial and on-going investment by the companies to customize and maintain such web pages for their particular needs. Furthermore, users must "visit" each company web-site and search for their desired information in order to investigate the products of different companies. This is often a lengthy and repetitive process, involving entering the same or very similar data on each company web site visited.

Other search engines have been developed, known as "shopping bots", which search the Internet for specific products at a variety of locations. These shopping bots provide a means for consumers to enter context specific information for particular items they wish to purchase. These services then conduct a search among a group of suppliers for those products, and return information such as the cost and availability of these products at these various suppliers to the user.

However, these services perform periodic updates of the data from the various suppliers and cache it locally, rather than farming-out each query to the disparate and remote databases of the various suppliers. On this basis the data is only as up to date as the last time it was cached. While this might not pose a problem for information relating to the price of goods, such a system in unsuitable for dynamic information such as an item's stock levels.

Furthermore, the pool of suppliers amongst which such systems conduct searches on their customer's behalf is strictly limited and generally fairly static. In order to add an additional supplier (or indeed when any of their existing pool of suppliers significantly modifies their web site or databases), the provider of this shopping bot service must write new code, or modify their existing code, in order to accommodate this new supplier or the new format of the data.

Further drawbacks of such shopping bot systems include a lack of flexibility. The extension of such systems to new areas can only be achieved by substantial coding effort by the service providers themselves. This would involve, at the very least, modifications to the web pages that drive the service, and deciding on and liaising with the suppliers for this new area.

In a non-commercial context, instant Messaging Services provide a means for registered clients to be informed of such things as the "currently logged-in" status of other pre-determined clients. The list of pre-determined clients is often termed a "buddy-list". In such systems a centralised Server is provided that maintains a database of active clients and periodically communicates with these active clients to update them as to the status of the other clients on their buddy-list. Such services primarily exist to offer the ability for instant communication (text, voice, and/or video) between their registered clients. Users of such systems can be matched based on their interests. However, all the match data is stored on the server and a "match" is typically little or no more than a randomly selected other user with a similar or identical recorded interest.

Furthermore, a number of computer dating systems exist that aim to aid a user to meet others having similar interests and personal characteristics. For example, a user who has recently moved to a new area will likely not know many other people and thus may have limited social opportunities available to him. Such a user may be introduced to many new people, but common interests or desirable and undesirable characteristics may not be readily apparent. For example a user may reliably be able to estimate the age of another, but not his educational level or other such characteristics that may be of interest to the user. Furthermore, a person may want to enter a relationship only with a person having a particular sexual preference, which would generally not be discernible from appearance alone.

Computer dating systems typically rely on a user specifying information about themselves and sending this information to a central server. The user specified information typically includes personal characteristics of the user and their search criteria. All this data is stored on the central server, which for a given user compares the user's search criteria with the personal characteristics of every other user. Typically the user will then be informed of any other users whose personal characteristics match their search criteria.

In such systems all the matching is performed by the central server, and the search criteria of a given user are periodically compared with the personal characteristics of every other user. This has significant drawbacks, as the central server will be required to store and manipulate a potentially very large amount of data. If the number of users is large, comparing the search criteria of a given user against the personal characteristics of every other user will also involve a significant processor load on the central server.

Such systems only have application in the area of matching the interests of one person with another person, and they would be of very limited use in other fields such as the property example given above. This is because it is not feasible for a central resource, to store and keep up-to-date the property details of all of the properties for sale in an extended geographical area.

Furthermore, the user's personal characteristics are stored on the central server and are available for viewing by other registered users. Although a user's anonymity can generally be preserved by such systems, these systems are nevertheless limited by the kind of data that a user would wish to publish on an external source. For example, a user is unlikely to be willing to enter very private or intimate details about themselves.

Such systems are also limited in scope, and users of such system can only conduct searches among other users using a predefined and limited set of fields for both their personal characteristics and search criteria. They would therefore require modifications to the underlying computer software in order to render it fit for these other purposes.

SUMMARY OF THE INVENTION

The object of the invention is to provide a system and method for matching information that obviates or ameliorates the above described problems associated with conventional means.

According to a first aspect of the invention there is provided a system for matching information comprising: a first sub-system adapted to store at least one profile, wherein the said at least one profile contains predetermined attributes and requirements and predetermined introduction information; a second sub-system adapted to store at least one profile, wherein the said at least one profile contains predetermined attributes and requirements and predetermined introduction information; an introduction processor adapted to receive data relating to the said introduction information from the said first sub-system, wherein the introduction processor is adapted to compare the said introduction information from the said first sub-system with introduction information received from the said second sub-system and to register a compatible profile introduction between the said first sub-system and the said second sub-system when the said introduction information of the said first sub-system or the said second sub-system is satisfied by the introduction information of the other of the said first sub-system or the said second sub-system; and a match processor comprised within the said first sub-system, the said match processor being adapted to receive information relating to requirements of the said second sub-system when the said introduction processor registers a compatible profile introduction between the said first sub-system and the said second sub-system, the said match processor being further adapted to register a match between the said first sub-system and the said second sub-system when the said attributes of the said first sub-system match the said requirements of the said second sub-system; and wherein the said first sub-system does not need to receive information relating to the said attributes of the said second sub-system, in order to register a match with the said second sub-system.

Such a system provides an efficient means of matching information between users. The introduction processor functions as a virtual "meeting place" for profiles, and the matching of the attributes of a user with received requirements is only performed when a compatible profile introduction has been established. Thus the system does not waste processing time in trying to match profiles that have no possibility of being useful to the user. Furthermore, a large portion of the data are stored on each terminal, and not on a centralised resource. In addition the match processing is performed on each terminal in the system and is thus distributed. This contrasts to the prior art systems described that rely on a central server to store a user's details and perform the match processing.

It is further the case that such a system is adapted to register a match based on the exchange of requirements data, rather than on the exchange of attribute data. Thus the attributes data of a user can always be kept stored on the user's terminal until a match has been established.

In one embodiment, the introduction processor is adapted to register a compatible profile introduction between the said first sub-system and the said second sub-system only when both the said introduction information of the said first sub-system is satisfied by the introduction information of the said second sub-system and the said introduction information of the said second sub-system are satisfied by the introduction information of the said first sub-system.

In one embodiment, the introduction information of the said first sub-system and the said second sub-system comprises introduction attributes and introduction requirements, and wherein the said introduction processor is adapted to compare the introduction attributes from the said first sub-system with the introduction requirements from the said second sub-system and to compare the introduction attributes from the said second sub-system with the introduction requirements from the said first sub-system, and to register a compatible profile introduction between the said first sub-system and the said second sub-system when the said introduction requirements of the said first sub-system or the said second sub-system are satisfied by the introduction attributes of the other of the said first sub-system or the said second sub-system. The introduction processor may be adapted to register a compatible profile introduction between the said first sub-system and the said second sub-system only when both the said introduction requirements of the said first sub-system are satisfied by the introduction attributes of the said second sub-system and the said introduction requirements of the said second sub-system are satisfied by the introduction attributes of the said first sub-system.

In one embodiment the system further comprises an introduction data store connected to the said introduction processor, the said introduction data store being adapted to store received introduction information from the said first sub-system or the said second sub-system. The introduction data store may be adapted to store information relating to the requirements of the said first sub-system and the said second sub-system, and wherein the introduction processor is adapted to send information relating to the requirements of the said first sub-system to the said second sub-system, and to send information relating to the requirements of the said second sub-system to the said first sub-system, on the establishment of a compatible profile introduction.

On the establishment of a compatible profile introduction the said first sub-system may be adapted to send information relating to the requirements of the profile involved in the compatible profile introduction to the said second sub-system via the introduction processor.

On the establishment of a compatible profile introduction the said first sub-system may be adapted to send information relating to the requirements of the profile involved in the compatible profile introduction to the said second sub-system via a peer-to-peer connection between the said first sub-system and the said second sub-system.

In one embodiment, the said first sub-system is adapted to enter a matched mode when the said match processor has established that a match has been made. The said first sub-system may be adapted to enter the said matched mode only when the said match processor has established that a match has been made and that a match signal has been received from the said second sub-system, the said match signal indicating that the said second sub-system has registered a corresponding match.

In one embodiment, the said second sub-system does not comprise a match processor, and wherein the said introduction processor is adapted to receive information relating to the said requirements of the said first sub-system when the said introduction processor registers a compatible profile introduction between the said first sub-system and the said second sub-system, the said introduction processor being further adapted to register a match between the said second sub-system and the said first sub-system when a condition determined by the information relating to the said requirements of the said first sub-system is satisfied. The said attributes of the said second sub-system and the said requirements of the said first sub-system may be null, and the said introduction processor will always register a match between the said second sub-system and the said first sub-system. The said first sub-system may be adapted to enter a matched mode only when the said match processor has established that a match has been made and that a match signal has been received from the said introduction processor, the said match signal indicating that the said introduction processor has registered a corresponding match between the said second sub-system and the said first sub-system.

In one embodiment, the said first sub-system is further adapted to store at least one tag, the or each said tag comprising information to be shared with the said second sub-system on the establishment of a match, wherein the said first sub-system is adapted to enable the or each said tag to be sent to the said second sub-system on the establishment of a match. The said first sub-system may be adapted to send the or each said tag to the said second sub-system via the introduction processor. The said first sub-system may be adapted to send the or each said tag to the said second sub-system via a peer-to-peer connection between the said first sub-system and the said second sub-system.

In one embodiment, the said first sub-system is further adapted to allow a user to designate which of the stored at least one profiles the user designates as active; and the introduction processor is further adapted to receive information relating to the said introduction information from only the active profile or profiles stored in the said first sub-system.

In one embodiment, the or each said profile comprises a self-describing data file, each self-describing data file comprising at least one field. In such an embodiment, the self-describing nature of profiles enables a large variety of profiles comprised of any standard and appropriate field types. The self-describing profile mechanism enables any two profiles of the same type to perform a meaningful data exchange. This data exchange can use an effectively infinite variety of information as the introduction criteria in order to determine if any two profiles should be subjected to the full matching process.

The full matching process itself can use an effectively infinite variety of information as the attribute and requirement data to describe and exchange the information being matched, and can use an effectively infinite variety of information as the tag data to describe the matched information. Hence, such embodiments of the invention can be used as a general-purpose system for querying and matching information.

In one embodiment, the said first sub-system is adapted to store at least one profile that is a finder-finder profile, the said finder-finder profile comprising at least one requirement field for every corresponding attribute field.

In one embodiment, the said first sub-system is adapted to store at least one profile that is a finder-provider profile, the or each said finder-provider profile comprising a variant for a finder and a variant for a provider, and wherein for each attribute field in the or each provider variant there is at least one corresponding requirement field in the finder variant. The said first sub-system may be adapted to store an indication of whether a user of the said first sub-system is a provider or a finder in the profile. The said first sub-system may be adapted to store multiple instances of the said attributes for the provider variant of the profile.

In one embodiment, the said first sub-system comprises a backend database, the said backend database comprising information relating to the at least one profile. The said backend database may be adapted to store information relating to multiple instances of the said attributes for the provider variant of the profile as multiple sets of virtual attributes. The said first sub-system may comprise a query processor, the said query processor being adapted to construct a query from the information relating to the received requirements of the said second sub-system and to submit the query to the said backend database, wherein on reception of the said query the backend database is adapted to provide the match processor with information relating to any matching instances of the said virtual attributes. The said backend database may be adapted to store tag information as virtual tag data. The said first sub-system may comprise a query processor adapted to query the said backend database in order to generate the said tag information from the virtual tag data. In such an embodiment the construction of a query from the information relating to the self-describing received requirements, provides a general-purpose system for querying heterogeneous, distributed databases.

In one embodiment, the or each said profile comprises a header section, the header section comprising the predetermined introduction information of the respective profile. The said introduction processor may be adapted to receive the header section of the active profile or profiles stored in the said first sub-system. The header section of the or each said profile may comprise one or more subset identifiers, the or each subset identifier comprising predetermined segregation information, wherein the introduction processor is adapted to use the or each said subset identifier to segregate otherwise compatible profiles according to the predetermined segregation information.

In one embodiment, the said first sub-system is further adapted to store a unique ID of the said first sub-system. The said first sub-system may be adapted to store a unique Profile ID for the or each profile stored in the said first sub-system. The said first sub-system may be adapted to store multiple instances of a profile with the same Profile ID, wherein each said multiple instance of a profile is assigned a unique Profile Instance ID.

In one embodiment, the introduction processor comprises a recent encounters cache for the said first sub-system, the said recent encounters cache comprising information relating to compatible sub-systems that have been involved in profile introductions with the said first sub-system, wherein the introduction processor is adapted to refrain from trying to establish a compatible profile introduction with profiles received from compatible sub-systems if appropriate information is contained in the said recent encounters cache. The said recent encounters cache may comprise any one or combination of: a list of unique IDs of compatible sub-systems, a list of unique Profile IDs from compatible sub-systems, or a list of the profile Instance IDs for a particular instance of a profile from compatible sub-systems.

In one embodiment, the introduction processor comprises a blacklist cache for the said first sub-system, the said blacklist cache comprising information relating to compatible sub-systems that have been involved in profile introductions with the said first sub-system that have been blacklisted by a user of the said first sub-system, wherein the introduction processor is adapted to refrain from trying to establish a compatible profile introduction with profiles received from compatible sub-systems if appropriate information is contained in the said blacklist cache. The said blacklist cache may comprise any one or combination of: a list of unique IDs of compatible sub-systems, a list of unique Profile IDs from compatible sub-systems, or a list of the profile Instance IDs for a particular instance of a profile from compatible sub-systems.

In one embodiment, the said first sub-system comprises a sub-system recent encounters cache, the said sub-system recent encounters cache comprising any one or combination of: a list of unique IDs of compatible sub-systems, a list of unique Profile IDs from compatible sub-systems, or a list of the profile Instance IDs for a particular instance of a profile from compatible sub-systems that have been involved in match processing with the said first sub-system.

In one embodiment, the said first sub-system further comprises a sub-system blacklist cache, the said sub-system blacklist cache comprising any one or combination of: a list of unique IDs of compatible sub-systems, a list of unique Profile IDs from compatible sub-systems, or a list of the profile Instance IDs for a particular instance of a profile from compatible sub-systems that have been blacklisted during match processing by a user of the said first sub-system.

The said first sub-system may be adapted to store a match log, the said match log comprising information regarding previously established matches. The match log may comprise match information comprised in any received tags. On establishment of a match the said first sub-system may be adapted to enter a talk mode with the said second sub-system, wherein in the said talk mode the said first system is adapted to share information with the said second sub-system. In the said talk mode the said first system may be adapted to share information with the said second sub-system via any one or combination of: direct text, direct voice, direct video, or anonymous email over a communications network.

The or each said tag may comprise any one or combination of: text data, graphics data, audio data, video data, geographic data, hypertext-links or computer software. The or each said tag may comprise a java applet, wherein the or each said Java applet is adapted to establish a programmed dialogue between the said first sub-system and the said second sub-system.

In one embodiment, the introduction information comprises geographic information. The said geographic information may be obtained dynamically using GPS.

The said first sub-system may be adapted to communicate with the said introduction processor via any one of the Internet, an intranet, an extranet, a local area network, a wide area network or a network employing wireless application protocol. The said first sub-system may be adapted to communicate with the said introduction processor via a wireless application protocol comprising any one of: 808.11a, 808.11b, WAP, GRPS or 3G transmission.

In one embodiment, the introduction processor is adapted to send software to a user device to enable the said user device to function as a first sub-system. The said software may be in the form of a java applet.

According to a second aspect of the present invention there is provided a terminal for use in a system for matching information, the said terminal comprising: a memory adapted to store at least one profile, wherein the said at least one profile contains predetermined attributes and requirements and predetermined introduction information; a communications interface adapted to communicate with a remote introduction processing system, wherein the said communications interface is adapted to send information relating to the said introduction information to the said introduction processing system, and to receive information relating to requirements of a compatible terminal when the said introduction processor registers a compatible profile introduction between the said terminal and the said compatible terminal; a match processor adapted to register a match between the said terminal and the said compatible terminal when the said attributes of the said terminal match the said requirements of the said compatible terminal; and wherein the said terminal does not need to receive information relating to the attributes of the said compatible terminal, in order to register a match with the said compatible terminal.

On the establishment of a compatible profile introduction the said communications interface may be adapted to send information relating to the requirements of the profile involved in the compatible profile introduction to the said compatible terminal via the introduction processing system.

On the establishment of a compatible profile introduction the communications interface may be adapted to send information relating to the requirements of the profile involved in the compatible profile introduction to the compatible terminal via a peer-to-peer connection between the said terminal and the said compatible terminal.

In one embodiment, the said terminal may be adapted to enter a matched mode when the said match processor has established that a match has been made. The said first sub-system may be adapted to enter the said matched mode only when the said match processor has established that a match has been made and that a match signal has been received from the said compatible terminal, the said match signal indicating that the said compatible terminal has registered a corresponding match.

According to a third aspect of the invention there is provided a terminal for use in a system for matching information, the said terminal comprising: a memory adapted to store at least one profile, wherein the said at least one profile contains predetermined attributes and requirements and predetermined introduction information; a communications interface adapted to communicate with a remote introduction processing system, wherein the said communications interface is adapted to send information relating to the said introduction information, the said requirements, and the said attributes to the said introduction processing system; the said communications interface being further adapted to receive a match signal from the introduction processing system when a compatible terminal registers a match with the said terminal.

In one embodiment, the said terminal is further adapted to store at least one tag, the or each said tag comprising information to be shared with the said compatible terminal on the establishment of a match, wherein the said terminal is adapted to enable the or each said tag to be sent to the said compatible terminal on the establishment of a match. The said terminal may be adapted to send the or each said tag to the said compatible terminal via the introduction processing system. The said terminal may be adapted to send the or each said tag to the said compatible terminal via a peer-to-peer connection between the said terminal and the said compatible terminal.

In one embodiment, the said terminal is further adapted to allow a user to designate which of the stored at least one profiles the user designates as active, wherein the said communications interface is adapted to send to the said introduction processing system information relating to the said introduction information of only the active profile or profiles stored in the said terminal.

In one embodiment, the or each said profile comprises a self-describing data file, each self-describing data file comprising at least one field.

The said terminal may be adapted to store at least one profile that is a finder-finder profile, the said finder-finder profile comprising at least one requirement field for every corresponding attribute field.

The said terminal may be adapted to store at least one profile that is a finder-provider profile, the or each said finder-provider profile comprising a variant for a finder and a variant for a provider, and wherein for each attribute field in the or each provider variant there is at least one corresponding requirement field in the finder variant. The said terminal may be adapted to store an indication of whether a user of the said terminal is a provider or a finder in the profile. The said terminal may be adapted to store multiple instances of the said attributes for the provider variant of the profile.

In one embodiment, the said terminal is connected to a backend database, the said backend database comprising information relating to the at least one profile. The said backend database may be adapted to store information relating to multiple instances of the said attributes for the provider variant of the profile as multiple sets of virtual attributes. The said terminal may comprise a query processor, the said query processor being adapted to construct a query from the information relating to the said received requirements of the said compatible terminal and to submit the query to the said backend database, wherein on reception of the said query the backend database is adapted to provide the match processor with information relating to any matching instances of the said virtual attributes. The said backend database may be adapted to store tag information as virtual tag data.

The said terminal may comprise a query processor the said query processor being adapted to query the said backend database in order to generate the said tag information from the virtual tag data.

In one embodiment, the or each said profile comprises a header section, the header section comprising the predetermined introduction information of the respective profile. The communications interface may be adapted to send the header section of the active profile or profiles stored in the said terminal to the said introduction processing system. The header section of the or each said profile may further comprise one or more subset identifiers, the or each subset identifier comprising predetermined segregation information.

In one embodiment, the said terminal is further adapted to store a unique ID of the said terminal. The said terminal may be further adapted to store a unique Profile ID for the or each profile stored in the said terminal. The said terminal may be adapted to store multiple instances of a profile with the same Profile ID, wherein each said multiple instance of a profile is assigned a unique Profile Instance ID.

In one embodiment, the said terminal comprises a terminal recent encounters cache, the said terminal recent encounters cache comprising any one or combination of: a list of unique IDs of compatible terminals, a list of unique Profile IDs from compatible terminals, or a list of the profile Instance IDs for a particular instance of a profile from compatible terminals that have been involved in match processing with the said terminal.

In one embodiment, the said terminal further comprises a terminal blacklist cache, the said terminal blacklist cache comprising any one or combination of: a list of unique IDs of compatible terminals, a list of unique Profile IDs from compatible terminals, or a list of the profile Instance IDs for a particular instance of a profile from compatible terminals that have been blacklisted during match processing by a user of the said first terminal.

The said terminal may be adapted to store a match log, the said match log comprising information regarding previously established matches. The match log may comprise match information comprised in any received tags.

On establishment of a match the terminal may be adapted to enter a talk mode with the said compatible terminal, wherein in the said talk mode the said terminal is adapted to share information with the said compatible terminal. In the said talk mode the said terminal may be adapted to share information with the said compatible terminal via any one or combination of: direct text, direct voice, direct video, or anonymous email over a communications network.

The or each said tag may comprise any one or combination of: text data, graphics data, audio data, video data, geographic data, hypertext-inks or computer software. The or each said tag may comprise a java applet, wherein the or each said Java applet is adapted to establish a programmed dialogue between the said terminal and the said compatible terminal.

The introduction information may comprise geographic information. The said geographic information may be obtained dynamically using GPS.

In one embodiment, the said communications interface is adapted to communicate with the said introduction processing system via any one of the Internet, an intranet, an extranet, a local area network, a wide area network or a network employing wireless application protocol. The said communications interface may be adapted to communicate with the said introduction processing system via a wireless application protocol comprising any one of: 808.11a, 808.11b, WAP, GRPS or 3G transmission.

The terminal may be any one of, or a combination of: a personal computer, a notebook computer, a laptop computer, a handheld computer, a workstation, a mainframe, a PDA or palmtop computer, a wearable computing device, a tablet, a smartcard, a device or product with embedded computing capability, a pager, a mobile telephone, an interactive television, or an application specific device.

According to a fourth aspect of the invention there is provided a server for use in a system for matching information comprising: a communications interface adapted to receive data relating to predetermined introduction information from a plurality of terminals connected to the system; an introduction processor adapted to compare introduction information from a first terminal with introduction information received from a second terminal and to register a compatible profile introduction between the said first terminal and the said second terminal when the said introduction information of the said first terminal or the said second terminal is met by the introduction information of the other of the said first terminal or the said second terminal; and wherein the said server is adapted to send a signal to the said first terminal and the said second terminal on the establishment of a compatible profile introduction.

In one embodiment, the introduction processor is adapted to register a compatible profile introduction between the said first terminal and the said second terminal when the said introduction information of the said first terminal is met by the introduction information of the said second terminal and the said introduction information of the said second terminal is met by the introduction information of the said first terminal.

In one embodiment, the introduction information of the said first terminal and the said second terminal comprises introduction attributes and introduction requirements, and wherein the said introduction processor is adapted to compare the introduction attributes from the said first terminal with the introduction requirements from the said second terminal and to compare the introduction attributes from the said second terminal with the introduction requirements from the said terminal, and to register a compatible profile introduction between the said first terminal and the said second terminal when the said introduction requirements of the said first terminal or the said second terminal are met by the introduction attributes of the other of the said first terminal or the said second terminal.

The introduction processor may be adapted to register a compatible profile introduction between the said first terminal and the said second terminal when the said introduction requirements of the said first terminal are met by the introduction attributes of the said second terminal and the said introduction requirements of the said second terminal are met by the introduction attributes of the said first terminal.

In one embodiment, the server may further comprise an introduction data store connected to the said introduction processor, the said introduction data store being adapted to store received introduction information from the said first terminal and the said second terminal. The said introduction data store may be adapted to store information relating to requirements of the said first terminal and the said second terminal, and wherein the introduction processor is adapted to send information relating to the requirements of the said first terminal to the said second terminal, and to send information relating to the requirements of the said second terminal to the said first terminal, on the establishment of a compatible profile introduction.

On the establishment of a compatible profile introduction the said communications interface may be adapted to receive information relating to requirements of the profile involved in the compatible profile introduction from the first sub-system, and to send the said information relating to the requirements of the profile involved in the compatible to the said second sub-system.

The said introduction processor may be adapted to receive information relating to requirements of the said first terminal when the said introduction processor registers a compatible profile introduction between the said first terminal and the said second terminal, the said introduction processor being further adapted to register a match between the said second terminal and the said first terminal when a condition determined by the information relating to the said requirements of the said first terminal is satisfied. The said attributes of the said second terminal and the said requirements of the said first terminal may be null, in which case the said introduction processor always registers a match between the said second terminal and the said first terminal.

In one embodiment, the said communications interface is adapted to receive at least one tag from the said first terminal on the establishment of a match, and to send the or each said tag to the said second terminal.

In one embodiment, the communications interface is adapted to receive one or more subset identifiers from the said first terminal, the or each subset identifier comprising predetermined segregation information, wherein the introduction processor is adapted to use the or each said subset identifier to segregate otherwise compatible profiles according to the predetermined segregation information.

In one embodiment, the server further comprises a recent encounters cache for the said first terminal, the said recent encounters cache comprising information relating to compatible sub-systems that have been involved in profile introductions with the said first sub-system, wherein the introduction processor is adapted to refrain from trying to establish a compatible profile introduction with profiles received from compatible sub-systems if appropriate information is contained in the said recent encounters cache.

In one embodiment, the server further comprises a blacklist cache for the said first terminal, the said blacklist cache comprising information relating to compatible terminals that have been involved in profile introductions with the said first terminal that have been blacklisted by a user of the said first terminal, wherein the introduction processor is adapted to refrain from trying to establish a compatible profile introduction with profiles received from compatible terminals if appropriate information is contained in the said blacklist cache.

The introduction information may comprise geographic information. The said geographic information may be obtained dynamically using GPS.

The said communications interface may be adapted to communicate with the plurality of terminals via any one, or combination, of the Internet, an intranet, an extranet, a local area network, a wide area network or a network employing wireless application protocol. The said communications interface may be adapted to communicate with the plurality of terminals via wireless application protocol comprising any one of: 808.11a, 808.11b, WAP, GRPS or 3G transmission.

In one embodiment, the communications interface is adapted to send software to a user device to enable the said user device to function as a terminal in the system for matching information. The said software may be in the form of a java applet.

According to a fifth aspect of the invention there is provided an operation method for a system for matching information comprising: using a first sub-system to store at least one profile, wherein the said at least one profile contains predetermined attributes and requirements and predetermined introduction information; using a second sub-system to store at least one profile, wherein the said at least one profile contains predetermined attributes and requirements and predetermined introduction information; using an introduction processor to receive data relating to the said introduction information from the said first sub-system, to compare the said introduction information from the said first sub-system with introduction information received from the said second sub-system, and to register a compatible profile introduction between the said first sub-system and the said second sub-system when the said introduction information of the said first sub-system or the said second sub-system is satisfied by the introduction information of the other of the said first sub-system or the said second sub-system; and using a match processor comprised within the said first sub-system to receive information relating to requirements of the said second sub-system when the said introduction processor registers a compatible profile introduction between the said first sub-system and the said second sub-system, and to register a match between the said first sub-system and the said second sub-system when the said attributes of the said first sub-system match the said requirements of the said second sub-system; and wherein the said first sub-system does not need to receive information relating to the said attributes of the said second sub-system, in order to register a match with the said second sub-system.

In one embodiment, the method comprises using the said introduction processor to register a compatible profile introduction between the said first sub-system and the said second sub-system only when both the said introduction information of the said first sub-system is satisfied by the introduction information of the said second sub-system and the said introduction information of the said second sub-system are satisfied by the introduction information of the said first sub-system.

In one embodiment, the introduction information of the said first sub-system and the said second sub-system comprises introduction attributes and introduction requirements, and the method further comprises using the said introduction processor to compare the introduction attributes from the said first sub-system with the introduction requirements from the said second sub-system and to compare the introduction attributes from the said second sub-system with the introduction requirements from the said first sub-system, and to register a compatible profile introduction between the said first sub-system and the said second sub-system when the said introduction requirements of the said first sub-system or the said second sub-system are satisfied by the introduction attributes of the other of the said first sub-system or the said second sub-system.

In one embodiment, the method comprises using the introduction processor to register a compatible profile introduction between the said first sub-system and the said second sub-system only when both the said introduction requirements of the said first sub-system are satisfied by the introduction attributes of the said second sub-system and the said introduction requirements of the said second sub-system are satisfied by the introduction attributes of the said first sub-system.

In one embodiment, the method comprises using an introduction data store connected to the said introduction processor to store received introduction information from the said first sub-system or the said second sub-system. The said introduction data store may be used to store information relating to the requirements of the said first sub-system and the said second sub-system, and the introduction processor may be used to send information relating to the requirements of the said first sub-system to the said second sub-system, and to send information relating to the requirements of the said second sub-system to the said first sub-system, on the establishment of a compatible profile introduction.

On the establishment of a compatible profile introduction the said first sub-system may send information relating to the requirements of the profile involved in the compatible profile introduction to the said second sub-system via the introduction processor.

On the establishment of a compatible profile introduction the said first sub-system may send information relating to the requirements of the profile involved in the compatible profile introduction to the said second sub-system via a peer-to-peer connection between the said first sub-system and the said second sub-system.

In one embodiment, the said first sub-system enters a matched mode when the said match processor has established that a match has been made. The said first sub-system may enter the said matched mode only when the said match processor has established that a match has been made and that a match signal has been received from the said second sub-system, the said match signal indicating that the said second sub-system has registered a corresponding match.

In one embodiment, the method comprises using a said second sub-system that does not comprise a match processor, and using the said introduction processor to receive information relating to the said requirements of the said first sub-system when the said introduction processor registers a compatible profile introduction between the said first sub-system and the said second sub-system, and to register a match between the said second sub-system and the said first sub-system when a condition determined by the information relating to the said requirements of the said first sub-system is satisfied. The said attributes of the said second sub-system and the said requirements of the said first sub-system may be null, and the said introduction processor will always register a match between the said second sub-system and the said first sub-system. The said first sub-system may enter a matched mode only when the said match processor has established that a match has been made and that a match signal has been received from the said introduction processor, the said match signal indicating that the said introduction processor has registered a corresponding match between the said second sub-system and the said first sub-system.

In one embodiment, the method comprises using the said first sub-system to store at least one tag, the or each said tag comprising information to be shared with the said second sub-system on the establishment of a match, and using the said first sub-system to enable the or each said tag to be sent to the said second sub-system on the establishment of a match. The said first sub-system may send the or each said tag to the said second sub-system via the introduction processor. The said first sub-system may send the or each said tag to the said second sub-system via a peer-to-peer connection between the said first sub-system and the said second sub-system.

In one embodiment, the method comprises using the said first sub-system to allow a user to designate which of the stored at least one profiles the user designates as active; and using the introduction processor to receive information relating to the said introduction information from only the active profile or profiles stored in the said first sub-system.

In one embodiment, the or each said profile comprises a self-describing data file, each self-describing data file comprising at least one field.

In one embodiment, the method comprises using the said first sub-system to store at least one profile that is a finder-finder profile, the said finder-finder profile comprising at least one requirement field for every corresponding attribute field.

In one embodiment, the method comprises using the said first sub-system to store at least one profile that is a finder-provider profile, the or each said finder-provider profile comprising a variant for a finder and a variant for a provider, and wherein for each attribute field in the or each provider variant there is at least one corresponding requirement field in the finder variant. The said first sub-system may be used to store an indication of whether a user of the said first sub-system is a provider or a finder in the profile. The said first sub-system may store multiple instances of the said attributes for the provider variant of the profile.

In one embodiment, the method comprises using a backend database comprised within the said first sub-system to store information relating to the at least one profile. The said backend database may store information relating to multiple instances of the said attributes for the provider variant of the profile as multiple sets of virtual attributes. A query processor may be comprised in the said first sub-system and used to construct a query from the information relating to the received requirements of the said second sub-system and to submit the query to the said backend database, wherein on reception of the said query the backend database provides the match processor with information relating to any matching instances of the said virtual attributes. The said backend database may store tag information as virtual tag data. A query processor comprised in the said first sub-system may be used to query the said backend database in order to generate the said tag information from the virtual tag data.

In one embodiment, the or each said profile comprises a header section, the header section comprising the predetermined introduction information of the respective profile.

In one embodiment, the said introduction processor receives the header section of the active profile or profiles stored in the said first sub-system. In one embodiment, the header section of the or each said profile comprises one or more subset identifiers, the or each subset identifier comprising predetermined segregation information, wherein the introduction processor uses the or each said subset identifier to segregate otherwise compatible profiles according to the predetermined segregation information.

In one embodiment, the method comprises using the said first sub-system to store a unique ID of the said first sub-system. In one embodiment, the method comprises using the said first sub-system to store a unique Profile ID for the or each profile stored in the said first sub-system. In one embodiment, the method comprises using the said first sub-system to store multiple instances of a profile with the same Profile ID, wherein each said multiple instance of a profile is assigned a unique Profile Instance ID.

In one embodiment, the method comprises using a recent encounters cache for the said first sub-system comprised in the introduction processor to store information relating to compatible sub-systems that have been involved in profile introductions with the said first sub-system, wherein the introduction processor refrains from trying to establish a compatible profile introduction with profiles received from compatible sub-systems if appropriate information is contained in the said recent encounters cache. The said recent encounters cache may store any one or combination of: a list of unique IDs of compatible sub-systems, a list of unique Profile IDs from compatible sub-systems, or a list of the profile Instance IDs for a particular instance of a profile from compatible sub-systems.

In one embodiment, the method comprises using a blacklist cache for the said first sub-system comprised in the introduction processor to store information relating to compatible sub-systems that have been involved in profile introductions with the said first sub-system that have been blacklisted by a user of the said first sub-system, wherein the introduction processor refrains from trying to establish a compatible profile introduction with profiles received from compatible sub-systems if appropriate information is contained in the said blacklist cache. The said blacklist cache may store any one or combination of: a list of unique IDs of compatible sub-systems, a list of unique Profile IDs from compatible sub-systems, or a list of the profile Instance IDs for a particular instance of a profile from compatible sub-systems.

In one embodiment, the method comprises using a sub-system recent encounters cache comprised in the said first sub-system to store any one or combination of: a list of unique IDs of compatible sub-systems, a list of unique Profile IDs from compatible sub-systems, or a list of the profile Instance IDs for a particular instance of a profile from compatible sub-systems that have been involved in match processing with the said first sub-system.

In one embodiment, the method comprises using a sub-system blacklist cache comprised in the said first sub-system to store any one or combination of: a list of unique IDs of compatible sub-systems, a list of unique Profile IDs from compatible sub-systems, or a list of the profile Instance IDs for a particular instance of a profile from compatible sub-systems that have been blacklisted during match processing by a user of the said first sub-system.

In one embodiment, the method comprises using the said first sub-system to store a match log, the said match log comprising information regarding previously established matches. The match log may comprise match information comprised in any received tags.

On establishment of a match the said first sub-system may enter a talk mode with the said second sub-system, wherein in the said talk mode the said first system shares information with the said second sub-system. In the said talk mode the said first system may share information with the said second sub-system via any one or combination of: direct text, direct voice, direct video, or anonymous email over a communications network. The or each said tag may comprise any one or combination of: text data, graphics data, audio data, video data, geographic data, hypertext-links or computer software.

The or each said tag may comprises a java applet, wherein the or each said Java applet establishes a programmed dialogue between the said first sub-system and the said second sub-system.

In one embodiment, the method comprises using introduction information comprising geographic information. The said geographic information may be obtained dynamically using GPS.

In one embodiment, the said first sub-system communicates with the said introduction processor via any one of the Internet, an intranet, an extranet, a local area network, a wide area network or a network employing wireless application protocol. The said first sub-system may communicate with the said introduction processor via a wireless application protocol comprising any one of: 808.11a, 808.11b, WAP, GRPS or 3G transmission.

In one embodiment, the method comprises using the introduction processor to send software to a user device to enable the said user device to function as a first sub-system. The said software may be in the form of a java applet.

According to a sixth aspect of the invention there is provided an operation method for a terminal for use in a system for matching information, the said method comprising: using a memory to store at least one profile, wherein the said at least one profile contains predetermined attributes and requirements and predetermined introduction information; using a communications interface to communicate with a remote introduction processing system, wherein the said communications interface sends information relating to the said introduction information to the said introduction processing system, and receives information relating to requirements of a compatible terminal when the said introduction processor registers a compatible profile introduction between the said terminal and the said compatible terminal; using a match processor to register a match between the said terminal and the said compatible terminal when the said attributes of the said terminal match the said requirements of the said compatible terminal; and wherein the said terminal does not need to receive information relating to the attributes of the said compatible terminal, in order to register a match with the said compatible terminal.

On the establishment of a compatible profile introduction the said communications interface may send information relating to the requirements of the profile involved in the compatible profile introduction to the said compatible terminal via the introduction processing system.

On the establishment of a compatible profile introduction the communications interface may send information relating to the requirements of the profile involved in the compatible profile introduction to the compatible terminal via a peer-to-peer connection between the said terminal and the said compatible terminal.

In one embodiment, the said terminal enters a matched mode when the said match processor has established that a match has been made. The said first terminal may enter the said matched mode only when the said match processor has established that a match has been made and that a match signal has been received from the said compatible terminal, the said match signal indicating that the said compatible terminal has registered a corresponding match.

According to a seventh aspect of the invention there is provided an operation method for a terminal for use in a system for matching information, the said method comprising: using a memory adapted to store at least one profile, wherein the said at least one profile contains predetermined attributes and requirements and predetermined introduction information; using a communications interface to communicate with a remote introduction processing system, wherein the said communications interface sends information relating to the said introduction information, the said requirements, and the said attributes to the said introduction processing system; and receives a match signal from the introduction processing system when a compatible terminal registers a match with the said terminal.

In one embodiment, the method comprises storing at least one tag, the or each said tag comprising information to be shared with the said compatible terminal on the establishment of a match, wherein the said terminal enables the or each said tag to be sent to the said compatible terminal on the establishment of a match. The method may comprise sending the or each said tag to the said compatible terminal via the introduction processing system. The said terminal may send the or each said tag to the said compatible terminal via a peer-to-peer connection between the said terminal and the said compatible terminal.

In one embodiment, the method comprises allowing a user to designate which of the stored at least one profiles the user designates as active, and using the said communications interface to send to the said introduction processing system information relating to the said introduction information of only the active profile or profiles stored in the said terminal.

In one embodiment, the or each said profile comprises a self-describing data file, each self-describing data file comprising at least one field.

In one embodiment, the method comprises storing at least one profile that is a finder-finder profile, the said finder-finder profile comprising at least one requirement field for every corresponding attribute field.

In one embodiment, the method comprises storing at least one profile that is a finder-provider profile, the or each said finder-provider profile comprising a variant for a finder and a variant for a provider, and wherein for each attribute field in the or each provider variant there is at least one corresponding requirement field in the finder variant. The method may comprise storing an indication of whether a user of the said terminal is a provider or a finder in the profile. The method may comprise storing multiple instances of the said attributes for the provider variant of the profile.

In one embodiment, the method comprises using a backend database connected to the said terminal, and using the said backend database to store information relating to the at least one profile. The said backend database may be used to store information relating to multiple instances of the said attributes for the provider variant of the profile as multiple sets of virtual attributes. In one embodiment, the method comprises using a query processor to construct a query from the information relating to the said received requirements of the said compatible terminal and to submit the query to the said backend database, wherein on reception of the said query the backend database provides the match processor with information relating to any matching instances of the said virtual attributes. The said backend database may be used to store tag information as virtual tag data. A query processor may be used to query the said backend database in order to generate the said tag information from the virtual tag data.

In one embodiment, the or each said profile comprises a header section, the header section comprising the predetermined introduction information of the respective profile.

In one embodiment, the communications interface sends the header section of the active profile or profiles stored in the said terminal to the said introduction processing system. The header section of the or each said profile may further comprise one or more subset identifiers, the or each subset identifier comprising predetermined segregation information.

The said terminal may store a unique ID of the said terminal. The said terminal may store a unique Profile ID for the or each profile stored in the said terminal. The said terminal may store multiple instances of a profile with the same Profile ID, wherein each said multiple instance of a profile is assigned a unique Profile Instance ID.

In one embodiment, the method comprises using a terminal recent encounters cache to store any one or combination of: a list of unique IDs of compatible terminals, a list of unique Profile IDs from compatible terminals, or a list of the profile Instance IDs for a particular instance of a profile from compatible terminals that have been involved in match processing with the said terminal.

In one embodiment, the method comprises using a terminal blacklist cache to store any one or combination of: a list of unique IDs of compatible terminals, a list of unique Profile IDs from compatible terminals, or a list of the profile Instance IDs for a particular instance of a profile from compatible terminals that have been blacklisted during match processing by a user of the said first terminal.

In one embodiment, the method comprises storing a match log, the said match log comprising information regarding previously established matches. The match log may comprise match information comprised in any received tags.

On establishment of a match the terminal may enter a talk mode with the said compatible terminal, wherein in the said talk mode the said terminal shares information with the said compatible terminal. In the said talk mode the said terminal may share information with the said compatible terminal via any one or combination of: direct voice, direct video, or anonymous email over a communications network.

The or each said tag may comprise any one or combination of: text data, graphics data, audio data, video data, geographic data, hypertext-inks or computer software. The or each said tag may comprise a java applet, wherein the or each said Java applet establishes a programmed dialogue between the said terminal and the said compatible terminal.

In one embodiment, the introduction information comprises geographic information. The said geographic information may be obtained dynamically using GPS.

In one embodiment, the said communications interface communicates with the said introduction processing system via any one of the Internet, an intranet, an extranet, a local area network, a wide area network or a network employing wireless application protocol. The said communications interface may communicate with the said introduction processing system via a wireless application protocol comprising any one of: 808.11a, 808.11b, WAP, GRPS or 3G transmission.

According to an eighth aspect of the invention there is provided an operation method for a server for use in a system for matching information comprising: using a communications interface to receive data relating to predetermined introduction information from a plurality of terminals connected to the system; using an introduction processor to compare introduction information from a first terminal with introduction information received from a second terminal and to register a compatible profile introduction between the said first terminal and the said second terminal when the said introduction information of the said first terminal or the said second terminal is met by the introduction information of the other of the said first terminal or the said second terminal; and sending a signal to the said first terminal and the said second terminal on the establishment of a compatible profile introduction.

In one embodiment, the introduction processor registers a compatible profile introduction between the said first terminal and the said second terminal when the said introduction information of the said first terminal is met by the introduction information of the said second terminal and the said introduction information of the said second terminal is met by the introduction information of the said first terminal.

In one embodiment, the introduction information of the said first terminal and the said second terminal comprises introduction attributes and introduction requirements, and wherein the said introduction processor compares the introduction attributes from the said first terminal with the introduction requirements from the said second terminal and compares the introduction attributes from the said second terminal with the introduction requirements from the said terminal, and registers a compatible profile introduction between the said first terminal and the said second terminal when the said introduction requirements of the said first terminal or the said second terminal are met by the introduction attributes of the other of the said first terminal or the said second terminal.

In one embodiment, the introduction processor registers a compatible profile introduction between the said first terminal and the said second terminal when the said introduction requirements of the said first terminal are met by the introduction attributes of the said second terminal and the said introduction requirements of the said second terminal are met by the introduction attributes of the said first terminal.

In one embodiment, the method comprises using an introduction data store connected to the said introduction processor to store received introduction information from the said first terminal and the said second terminal. The said introduction data store may store information relating to requirements of the said first terminal and the said second terminal, and wherein the introduction processor sends information relating to the requirements of the said first terminal to the said second terminal, and sends information relating to the requirements of the said second terminal to the said first terminal, on the establishment of a compatible profile introduction.

On the establishment of a compatible profile introduction the said communications interface may receive information relating to requirements of the profile involved in the compatible profile introduction from the first sub-system, and send the said information relating to the requirements of the profile involved in the compatible to the said second sub-system.

In one embodiment, the introduction processor receives information relating to requirements of the said first terminal when the said introduction processor registers a compatible profile introduction between the said first terminal and the said second terminal, and registers a match between the said second terminal and the said first terminal when a condition determined by the information relating to the said requirements of the said first terminal is satisfied. The said attributes of the said second terminal and the said requirements of the said first terminal may be null, wherein the said introduction processor always registers a match between the said second terminal and the said first terminal.

In one embodiment, the said communications interface receives at least one tag from the said first terminal on the establishment of a match, and to send the or each said tag to the said second terminal.

In one embodiment, the communications interface receives one or more subset identifiers from the said first terminal, the or each subset identifier comprising predetermined segregation information, wherein the introduction processor uses the or each said subset identifier to segregate otherwise compatible profiles according to the predetermined segregation information.

In one embodiment, the method comprises using a recent encounters cache for the said first terminal to store information relating to compatible sub-systems that have been involved in profile introductions with the said first sub-system, wherein the introduction processor refrains from trying to establish a compatible profile introduction with profiles received from compatible sub-systems if appropriate information is contained in the said recent encounters cache.

In one embodiment, the method comprises using a blacklist cache for the said first terminal to store information relating to compatible terminals that have been involved in profile introductions with the said first terminal that have been blacklisted by a user of the said first terminal, wherein the introduction processor refrains from trying to establish a compatible profile introduction with profiles received from compatible terminals if appropriate information is contained in the said blacklist cache.

In one embodiment, the introduction information comprises geographic information. The said geographic information may be obtained dynamically using GPS.

In one embodiment, the said communications interface communicates with the plurality of terminals via any one, or combination, of the Internet, an intranet, an extranet, a local area network, a wide area network or a network employing wireless application protocol. The said communications interface may communicate with the plurality of terminals via wireless application protocol comprising any one of: 808.11a, 808.11b, WAP, GRPS or 3G transmission.

In one embodiment, the communications interface sends software to a user device to enable the said user device to function as a terminal in the system for matching information. The said software may be in the form of a java applet.

According to a ninth aspect of the invention there is provided a system for matching information comprising: a first sub-system adapted to store at least one profile, wherein the said at least one profile contains predetermined attributes and requirements and predetermined introduction attributes and introduction requirements; a second sub-system adapted to store at least one profile, wherein the said at least one profile contains predetermined attributes and requirements and predetermined introduction attributes and introduction requirements; and an introduction processing system comprising an introduction processor and a match processor; wherein the said introduction processor is adapted to receive data relating to the said introduction attributes and introduction requirements from the said first sub-system and the said second sub-system, wherein the introduction processor is adapted to compare the introduction attributes from the said first sub-system with the introduction requirements from the said second sub-system and to compare the introduction attributes from the said second sub-system with the introduction requirements from the said first sub-system, and to register a compatible profile introduction between the said first sub-system and the said second sub-system when the said introduction requirements of the said first sub-system or the said second sub-system are satisfied by the introduction attributes of the other of the said first sub-system or the said second sub-system; wherein the said match processor is adapted to receive information relating to the attributes of the said first sub-system and the requirements of the said second sub-system when the said introduction processor registers a compatible profile introduction between the said first sub-system and the said second sub-system, the said match processor being further adapted to register a match between the said first sub-system and the said second sub-system when the said attributes of the said first sub-system match the said requirements of the said second sub-system.

In one embodiment, the introduction processor is adapted to register a compatible profile introduction between the said first sub-system and the said second sub-system only when both the said introduction requirements of the said first sub-system are satisfied by the introduction attributes of the said second sub-system and the said introduction requirements of the said second sub-system are satisfied by the introduction attributes of the said first sub-system.

In one embodiment, the match processor is adapted to receive information relating to the attributes of the said second sub-system and the requirements of the said first sub-system when the said introduction processor registers a compatible profile introduction between the said second sub-system and the said first sub-system, the said match processor being adapted to only register a match when both the said attributes of the said first sub-system match the said requirements of the said second sub-system and the said attributes of the said second sub-system match the said requirements of the said first sub-system.

In one embodiment, the said first sub-system is further adapted to store at least one tag, the or each said tag comprising information to be shared with the said second sub-system on the establishment of a match, wherein the said first sub-system is adapted to enable the or each said tag to be sent to the said second sub-system on the establishment of a match. The said first sub-system may be adapted to send the or each said tag to the said second sub-system via the introduction processing system. The said first sub-system may be adapted to send the or each said tag to the said second sub-system via a peer-to-peer connection between the said first sub-system and the said second sub-system.

The or each said profile may comprise a self-describing data file, each self-describing data file comprising at least one field.

The said first sub-system may be adapted to store at least one profile that is a finder-finder profile, the said finder-finder profile comprising at least one requirement field for every corresponding attribute field.

The said first sub-system may be adapted to store at least one profile that is a finder-provider profile, the or each said finder-provider profile comprising a variant for a finder and a variant for a provider, and wherein for each attribute field in the or each provider variant there is at least one corresponding requirement field in the finder variant. The said first sub-system may be adapted to store an indication of whether a user of the said first sub-system is a provider or a finder in the profile. The said first sub-system may be adapted to store multiple instances of the said attributes for the provider variant of the profile.

The or each said profile may comprise a header section, the header section comprising the predetermined introduction information of the respective profile. The header section of the or each said profile may comprise one or more subset identifiers, the or each subset identifier comprising predetermined segregation information, wherein the introduction processor is adapted to use the or each said subset identifier to segregate otherwise compatible profiles according to the predetermined segregation information.

In one embodiment, the said first sub-system is further adapted to store a unique ID of the said first sub-system. In one embodiment, the said first sub-system is further adapted to store a unique Profile ID for the or each profile stored in the said first sub-system. In one embodiment, the said first sub-system is adapted to store multiple instances of a profile with the same Profile ID, wherein each said multiple instance of a profile is assigned a unique Profile Instance ID.

In one embodiment, the introduction processing system comprises a recent encounters cache for the said first sub-system, the said recent encounters cache comprising information relating to compatible sub-systems that have been involved in profile introductions with the said first sub-system, wherein the introduction processor is adapted to refrain from trying to establish a compatible profile introduction with profiles received from compatible sub-systems if appropriate information is contained in the said recent encounters cache. The said recent encounters cache may comprise any one or combination of: a list of unique IDs of compatible sub-systems, a list of unique Profile IDs from compatible sub-systems, or a list of the profile Instance IDs for a particular instance of a profile from compatible sub-systems.

In one embodiment, the introduction processing system comprises a blacklist cache for the said first sub-system, the said blacklist cache comprising information relating to compatible sub-systems that have been involved in profile introductions with the said first sub-system that have been blacklisted by a user of the said first sub-system, wherein the introduction processor is adapted to refrain from trying to establish a compatible profile introduction with profiles received from compatible sub-systems if appropriate information is contained in the said blacklist cache. The said blacklist cache comprises any one or combination of: a list of unique IDs of compatible sub-systems, a list of unique Profile IDs from compatible sub-systems, or a list of the profile Instance IDs for a particular instance of a profile from compatible sub-systems.

On establishment of a match the said first sub-system may be adapted to enter a talk mode with the said second sub-system, wherein in the said talk mode the said first system is adapted to share information with the said second sub-system. In the said talk mode the said first system may be adapted to share information with the said second sub-system via any one or combination of: direct voice, direct video, or anonymous email over a communications network.

The or each said tag may comprise any one or combination of: text data, graphics data, audio data, video data, geographic data, hypertext-links or computer software. The or each said tag may comprise a java applet, wherein the or each said Java applet is adapted to establish a programmed dialogue between the said first sub-system and the said second sub-system.

The introduction information may comprises geographic information. The said geographic information may be obtained dynamically using GPS.

In one embodiment, the said first sub-system is adapted to communicate with the said introduction processing system via any one of the Internet, an intranet, an extranet, a local area network, a wide area network or a network employing wireless application protocol. The said first sub-system may be adapted to communicate with the said introduction processor via a wireless application protocol comprising any one of: 808.11a, 808.11b, WAP, GRPS or 3G transmission.

The introduction processing system may be adapted to send software to a user device to enable the said user device to function as a first sub-system. The said software may be in the form of a java applet.

According to a tenth aspect of the invention there is provided an operation method for a system for matching information comprising: using a first sub-system adapted to store at least one profile, wherein the said at least one profile contains predetermined attributes and requirements and predetermined introduction attributes and introduction requirements; using a second sub-system adapted to store at least one profile, wherein the said at least one profile contains predetermined attributes and requirements and predetermined introduction attributes and introduction requirements; and using an introduction processing system comprising an introduction processor and a match processor; wherein the said introduction processor receives data relating to the said introduction attributes and introduction requirements from the said first sub-system and the said second sub-system, and compares the introduction attributes from the said first sub-system with the introduction requirements from the said second sub-system and compares the introduction attributes from the said second sub-system with the introduction requirements from the said first sub-system, and registers a compatible profile introduction between the said first sub-system and the said second sub-system when the said introduction requirements of the said first sub-system or the said second sub-system are satisfied by the introduction attributes of the other of the said first sub-system or the said second sub-system; wherein the said match processor receives information relating to the attributes of the said first sub-system and the requirements of the said second sub-system when the said introduction processor registers a compatible profile introduction between the said first sub-system and the said second sub-system, and register a match between the said first sub-system and the said second sub-system when the said attributes of the said first sub-system match the said requirements of the said second sub-system.

In one embodiment, the method comprises using the introduction processor to register a compatible profile introduction between the said first sub-system and the said second sub-system only when both the said introduction requirements of the said first sub-system are satisfied by the introduction attributes of the said second sub-system and the said introduction requirements of the said second sub-system are satisfied by the introduction attributes of the said first sub-system.

In one embodiment, the match processor receives information relating to the attributes of the said second sub-system and the requirements of the said first sub-system when the said introduction processor registers a compatible profile introduction between the said second sub-system and the said first sub-system, and only registers a match when both the said attributes of the said first sub-system match the said requirements of the said second sub-system and the said attributes of the said second sub-system match the said requirements of the said first sub-system.

In one embodiment, the method comprises using the said first sub-system to store at least one tag, the or each said tag comprising information to be shared with the said second sub-system on the establishment of a match, and using the said first sub-system to enable the or each said tag to be sent to the said second sub-system on the establishment of a match.

In one embodiment, the method comprises using the said first sub-system to send the or each said tag to the said second sub-system via the introduction processing system. The method may comprise using the said first sub-system to send the or each said tag to the said second sub-system via a peer-to-peer connection between the said first sub-system and the said second sub-system.

The or each said profile may comprise a self-describing data file, each self-describing data file comprising at least one field.

In one embodiment, the method comprises using the said first sub-system to store at least one profile that is a finder-finder profile, the said finder-finder profile comprising at least one requirement field for every corresponding attribute field.

In one embodiment, the method comprises using the said first sub-system to store at least one profile that is a finder-provider profile, the or each said finder-provider profile comprising a variant for a finder and a variant for a provider, and wherein for each attribute field in the or each provider variant there is at least one corresponding requirement field in the finder variant. The method may comprise using the said first sub-system to store an indication of whether a user of the said first sub-system is a provider or a finder in the profile. The method may comprise using the said first sub-system to store multiple instances of the said attributes for the provider variant of the profile.

In one embodiment, the or each said profile comprises a header section, the header section comprising the predetermined introduction information of the respective profile. The header section of the or each said profile may comprise one or more subset identifiers, the or each subset identifier comprising predetermined segregation information, wherein the introduction processor uses the or each said subset identifier to segregate otherwise compatible profiles according to the predetermined segregation information.

In one embodiment, the method comprises using the said first sub-system to store a unique ID of the said first sub-system. In one embodiment, the method comprises using the said first sub-system to store a unique Profile ID for the or each profile stored in the said first sub-system. In one embodiment, the method comprises using the said first sub-system to store multiple instances of a profile with the same Profile ID, wherein each said multiple instance of a profile is assigned a unique Profile Instance ID.

In one embodiment, the method comprises using a recent encounters cache for the said first sub-system comprised in the introduction processor to store information relating to compatible sub-systems that have been involved in profile introductions with the said first sub-system, wherein the introduction processor refrains from trying to establish a compatible profile introduction with profiles received from compatible sub-systems if appropriate information is contained in the said recent encounters cache. The said recent encounters cache may store any one or combination of: a list of unique IDs of compatible sub-systems, a list of unique Profile IDs from compatible sub-systems, or a list of the profile Instance IDs for a particular instance of a profile from compatible sub-systems.

In one embodiment, the method comprises using a blacklist cache for the said first sub-system comprised in the introduction processor to store information relating to compatible sub-systems that have been involved in profile introductions with the said first sub-system that have been blacklisted by a user of the said first sub-system, wherein the introduction processor refrains from trying to establish a compatible profile introduction with profiles received from compatible sub-systems if appropriate information is contained in the said blacklist cache. The said blacklist cache may store any one or combination of: a list of unique IDs of compatible sub-systems, a list of unique Profile IDs from compatible sub-systems, or a list of the profile Instance IDs for a particular instance of a profile from compatible sub-systems.

On establishment of a match the said first sub-system may enter a talk mode with the said second sub-system, wherein in the said talk mode the said first system shares information with the said second sub-system. In the said talk mode the said first system shares information with the said second sub-system via any one or combination of: direct voice, direct video, or anonymous email over a communications network.

The or each said tag may comprise any one or combination of: graphics, audio data, video data, hypertext-links or computer software. The or each said tag may comprise a java applet, wherein the or each said Java applet establishes a programmed dialogue between the said first sub-system and the said second sub-system.

The introduction information may comprise geographic information. The said geographic information may be obtained dynamically using GPS.

In one embodiment, the said first sub-system communicates with the said introduction processor via any one of the Internet, an intranet, an extranet, a local area network, a wide area network or a network employing wireless application protocol. The said first sub-system may communicate with the said introduction processor via a wireless application protocol comprising any one of: 808.11a, 808.11b, WAP, GRPS or 3G transmission.

In one embodiment, the method comprises using the introduction processor to send software to a user device to enable the said user device to function as a first sub-system. The said software may be in the form of a java applet.

BRIEF DESCRIPTION OF THE DRAWINGS

Embodiments of the invention will now be described, by way of example, and with reference to the accompanying drawings in which:—

FIG. 10 is a table showing an example of an abbreviated user profile suitable for use in the first specific embodiment of the invention.

DETAILED DESCRIPTION OF THE INVENTION

Figure 1:
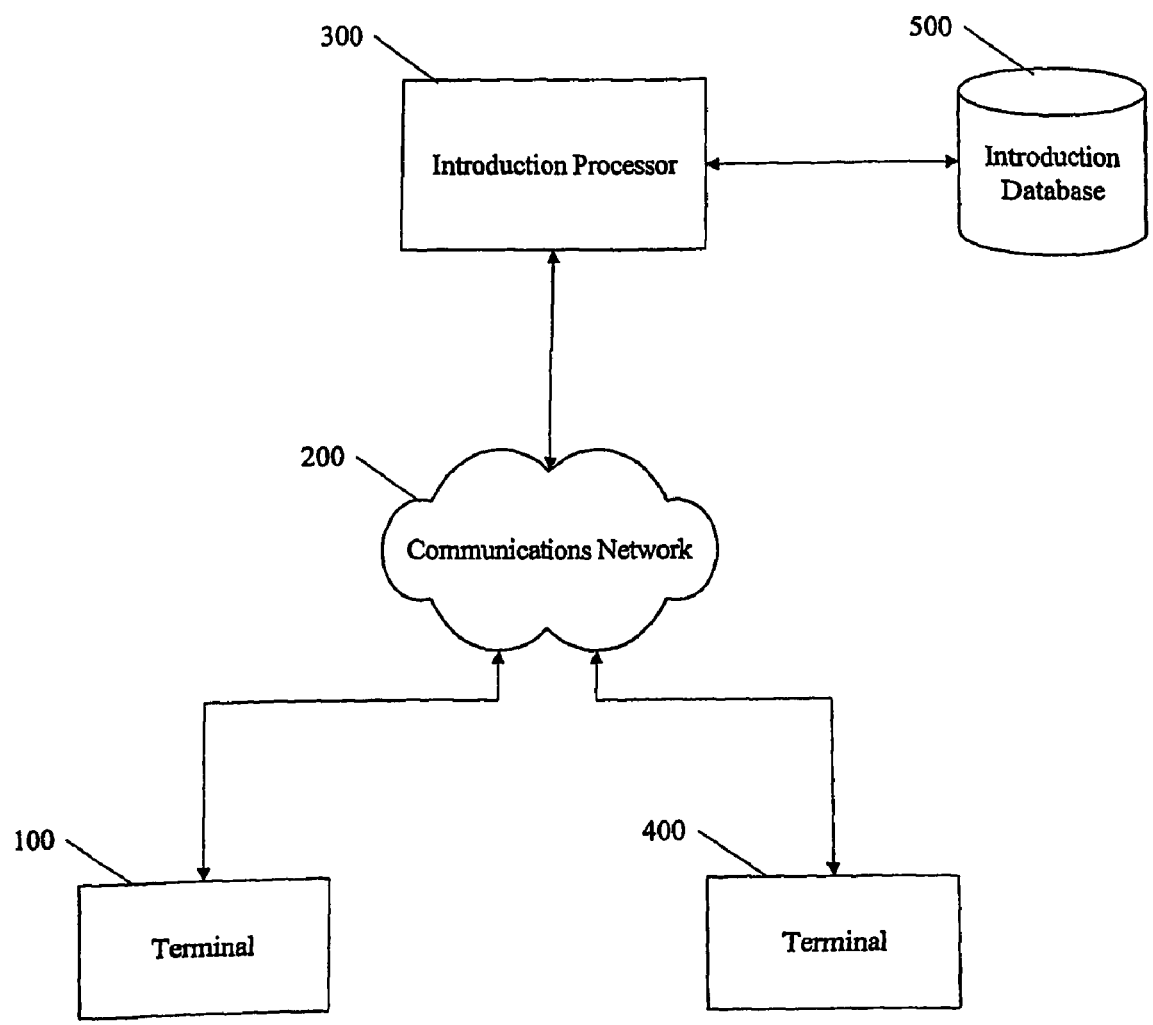
FIG. 1 is a schematic diagram of a system for matching user information according to a general embodiment of the present invention.

A generalised embodiment of the invention will now be described with reference to FIG. 1. This and other embodiments will be described with reference to a communications system for matching information from compatible terminals in order to facilitate the matching of user interests. For example, a user of such a system could be seeking to arrange a physical meeting with another user. In other situations a user could be searching for another user who is a retailer that has a particular item in stock. These applications are by way of example only, and those skilled in the art will understand that the invention is not limited in this way. Embodiments of the invention could equally apply to the matching of any type of user data for any purpose. Furthermore, the self-describing nature of profiles enables a user of such a system to seek to match any type of user data, and for any purpose, for which a suitably constructed profile template has been made available. The composition of the user data, and its intended purpose is derived from the contents of the self-describing profile.

A communications system according to this generalised embodiment comprises a plurality of terminals connected to a communications network 200 via a suitable communications interface. An introduction processor 300 is also connected to the network 200 via a suitable communications interface. Connected to the introduction processor 300 is an introduction database 500. In the generalised embodiment shown in FIG. 1 there are two terminals 100, 400. However, those skilled in the art will understand that the number of users in the system is not limited in any way, and that the number of terminals connected to the communications network could be very large.

Each terminal has a unique User ID that cannot be altered by the user, and is stored on the terminal. This is used by the communications system to identify each terminal connected to the communications network 200. The User ID could be encrypted by one or more elements of the communications system in order to increase the security of the system.

The terminal 100 stores information comprising the attributes of the user, the requirements of the user, and introduction criteria of the user in one or more profiles. A "profile" is a self-describing data file that is made up of a combination of data, metadata, and instructions and comprises a series of fields. Every profile comprises a header section that has a predetermined format. Therefore, a suitably constructed and populated profile will be capable of being processed on any terminal. A blank, unpopulated profile is referred to as a "profile template".

Each profile has a unique Profile ID that indicates the profile type. The Profile ID is stored in a header section of the profile. Once populated by the user, a profile contains the data that enables the terminal 100 and the introduction processor 300 to carry out a meaningful search of the interests of other users.

The "attributes" are personal data of the user and contain a set of characteristics of the user or of something offered by the user. The attributes for a given profile are stored in the attributes section of the profile. The "requirements" are the user's search criteria, and define the preferences of the user with respect to the characteristics of other users of compatible terminals or with respect to the characteristics of something offered by other users of compatible terminals that the user of the terminal 100 is seeking. The requirements are stored in the requirements section of the profile. Two profiles are considered "matched" when the requirements of one profile match the attributes of the other. That is, when the requirements of one profile are satisfied by the corresponding attributes of the other. A "two-way match" occurs between two profiles when the requirements of each profile match the attributes of the other.

The "introduction criteria" are stored in the header section of each profile, and are used by the introduction processor 300 to determine whether two profiles of the same type (i.e. with the same Profile ID) should be considered compatible for the matching process. The introduction criteria comprise introduction attributes and introduction requirements. The "introduction attributes" are data that contain a suitable selection of characteristics relevant to the user that allow the number of match attempts to be limited. The introduction attributes could comprise data found in the attributes section of the profile, or other suitable data. The "introduction requirements" are data relating to the profiles of other users (rather than specific data about the other users themselves) that the user would consider matching with. Two profiles are considered "compatible" when the introduction requirements of one profile are satisfied by the introduction attributes of the other. Due to the potentially large numbers of terminals connected to the system, each with many stored profiles, the introduction criteria provide a way of limiting the numbers of match attempts the system performs. The introduction criteria provide limiting characteristics, and are distinct from the user's full attributes and requirements. The introduction criteria thus enable the introduction processor 300 to select which profiles are compatible and thus matches are not attempted for profiles of users that have no possibility of being useful to the user.

The user can determine a "tag" for each profile, which is stored in the tag section of the profile. The tag section of a profile comprises at least one field and comprises any information that is transmitted by the terminal to users of other terminals connected to the system on the establishment of a match. The tag therefore could comprise any information about the match, and in a simple form could take the form of a name or nickname of the user. Alternatively the tag may comprise more detailed information about the match. The tag may include text, graphics, audio, or video data that can be automatically passed to the appropriate application on the user's terminal for viewing/listening etc. The tag information can also include hypertext-inks (or bookmarks) that can similarly be automatically passed to an appropriate browser application on the user's terminal. The tag information can also include geographic information. This geographic information could be obtained dynamically using GPS. The tag information can also include computer software, for example, in the form of a java applet that can be automatically passed to the appropriate application on the user's terminal and allow for two matched terminals to perform a programmed dialogue.

The following are examples of profiles suitable for use for matching information of users:

Relationship Finder Profile: the object of this profile is to aid a user to find a personal relationship. A user enters their personal details, which are stored in the fields of the attributes section. The user also enters the search criteria in the fields of the requirements section. The requirements section will contain fields including one that defines a desired level of commitment. This can range from casual sex, to friendship, to marriage and children. The introduction criteria can contain geographic information and non-geographic information. The users of the communication system could be physically located far away from each other. As a result a user may not be interested in finding a relationship with other users who are geographically distant. The introduction attributes can contain data relating to either a rough or very specific geographical location as well as the gender of the user. The introduction requirements can contain a geographic point and a radius from that point, within which the user would be interested in performing match attempts with other users. In this example, the geographic introduction criteria could provide a way of limiting the matches between users that are located physically close to each other. Alternatively, these geographic introduction criteria could be used to limit matches to only those other users who are located in a particular location, and this location could be remote to the current position of the user, such as in another country or region. If the introduction criteria of two profiles are compatible the situation is analogous to a "virtual meeting" of two profiles. The introduction requirements can also contain information regarding the gender of other users that the user is interested in forming a relationship with. The user may also enter information within a text field of a tag section of the profile. This tag information may be transmitted when a two-way match is established for this profile.

Sports Partner Finder Profile: the object of this profile is to aid a user in finding a suitable sports partner within a particular, and possibly remote, geographic area. A user enters the relevant details about themselves in the attributes section, together with the appropriate search criteria for finding others in the requirements section. The requirements section contains information such as how often and when the user would like to play, the user's competency level, etc. The introduction criteria contains a mixture of geographic, to limit match attempts to users within a certain local or remote radius or area, and non-geographic criteria to limit match attempts to a particular gender of sports partner or to a particular sport.

The above two profiles are examples of profiles that are particularly suitable for arranging a physical meeting between users. The above two profiles treat all users of terminals in the communications system in the same way. Such profiles are termed "finder-finder" profiles, and matching is attempted based on a set of requirements and attributes fields that are equal in shape and size as between all users of the profile, i.e. the users of each terminal will have both populated the same set of attributes and requirements fields.

A finder-finder profile comprises at least one requirement field for every corresponding attribute field.

The terminal 100 can store one or more profiles, including multiple instances of the same profile type, which are populated with different criteria, to allow the terminal 100 to try and perform matches based on a number of different sets of criteria. For example, a user may wish to find both a tennis partner and a squash partner at the same time. This user may well have different attributes and requirements for the two sports, as their proficiency level may differ greatly between the two.

In some situations, one party's requirements may be less restrictive than the other's. For example, a house hunter who wishes to buy a house will be seeking a specific type of property, based on strict criteria. This could include information such as price, number of rooms, and location of the property. The house hunter could be interested in being matched with every property on the estate agent's books that match their house requirements.

An estate agent may have many properties on their books, and wish to be matched with every user who is seeking to buy or rent one of their properties. In order to satisfy the needs of both the house hunter and the estate agent, "finder-provider" profiles can be used. Finder-provider profiles contain information in the introduction criteria to distinguish the finder of something from the provider of something.

Finder-provider profiles are distinguished from finder-finder profiles by having two variants of each profile, one for the finder and one for the provider, although both variants may be contained within a single instance of the profile template. For every attribute field in the provider variant there is at least one corresponding requirement field in the finder variant. The same is true of the attributes in the finder and the requirements in the provider, but these will generally be minimal.

A key characteristic of a finder-provider profile is that the provider party can populate multiple instances of the attributes section of a profile. For example an estate agent can populate as many attribute sets as there are properties on their books.

A provider party with multiple attribute sets, such as an estate agent or retailer, could populate multiple instances of an attributes section (one per property on an estate agent's books, for example). Alternatively, such a provider party could leave such attribute data in an existing database. A suitable converter process—specific to the particular provider party—can then be called upon (via a suitably located software User-Hook) to automatically convert any received requirements data into a suitable query for this existing database. This query will return matching records, generating suitable attribute and tag sets dynamically in response to a specific received requirement set. Attribute sets and tag sets constructed in this way are termed "virtual attribute sets" and "virtual tag sets" respectively.

The following are examples of finder-provider profiles:

Property Finder Profile: the object of this profile is to aid a user to find a suitable property to rent or buy. A user (the finder) enters their property requirements into the requirements fields of the finder variant of the profile. These could range from the desired location, whether they are interested in a flat or a house, the number of bedrooms, and a price range, to far more specific preferences such as: open plan, modern, rear facing master bedroom, decorative order. The user's introduction criteria can comprise information regarding the location of the estate agents that they are interested in trying to match with, as well as an indication that the user's variant of the profile is a finder. An estate agent (the provider) enters the details of the properties on his books as multiple instances of the attributes section of the provider variant of the profile. Apart from an indication that the estate agent is a provider, the estate agent's introduction criteria will be minimal, as the estate agent would be interested in performing match attempts with as many users as possible. Specific information relating to the precise location of the properties on the estate agent's books will be contained in the attributes section of the estate agents profile. In this example, the estate agent could store details of their properties as multiple virtual attribute sets, which could be converted into attribute sets in response to received requirements.

Book Finder Profile: the object of this profile is to aid a user to find a specific book or books that they are looking for. For example, a user could enter the ISBN numbers or Titles or Authors of the book or books that they are looking for in the requirements section of a finder variant. The user's introduction criteria can comprise information regarding the location of the book seller that they are interested in trying to match with, as well an indication that the user's variant of the profile is a finder. However, as books can be delivered around the globe, the user may wish not to specify limiting geographical introduction criteria. The user may wish to limit match attempts to only wholesale booksellers, and this information can be included in the user's introduction requirements. A bookseller could enter the details of the properties on his books as multiple attributes sets of the provider variant of the profile. Alternatively, the attribute sets could be stored as virtual attribute sets in an existing external database. For example, a bookseller with a chain of bookstores may store a list of books in stock in each of his stores in a central stock taking database. The list of books in stock in each store could comprise virtual attributes of a finder-provider variant of a Book Finder Profile.

The bookseller's introduction criteria may be minimal, as the bookseller may be interested in performing match attempts with all users. However, the bookseller may wish to only sell books wholesale, and thus may have suitably limiting introduction criteria.

Before a user can use the communications system to perform match attempts, the user determines the values of the attributes, requirements, introduction criteria, and optionally the tag, of each profile that they wish to attempt to perform matches with. The profile templates are then populated with these user determined data and the profiles stored on the user's terminal 100. Alternatively, all or part of the profile could be stored in a data store connected to the terminal 100.

In order to populate the profile templates the terminal 100 is provided with suitable user-interface software. Alternatively, the user may use the communications network 200 to obtain profile templates from a suitable server or data store. Alternatively the terminal 100 could accept profiles from a removable data carrier, such as a solid state, optical or magnetic storage media, upon which there could be pre-loaded a selection of profiles.

An indication of the profiles stored is displayed on the terminal 100 via suitable display means. Once one or more profiles are populated, the user then decides which of the stored profiles they wish to activate via a suitable user input means. An "active" profile is a profile that is being considered for match attempts whilst the user's terminal is connected to the communications network 200. The user can change the profiles that are currently active to suit their immediate needs. For example, a user who has previously activated the Sports Partner Finder Profile may wish to deactivate this profile once a suitable partner has been found. The user could have many profiles active at once, including multiple instances of the same profile type.

In order to connect to the communications network 200, the terminal 100 is provided with a communications interface. Once the terminal 100 is connected to the communication network 200 with one or more active profiles stored in the terminal 100, the communications system begins the process of matching user information. The matching process will now be described in outline, and a more detailed description of the matching process will be described later in relation to a specific embodiment of the invention.

As a first stage the terminal 100 sends the User ID of the terminal 100 along with the header section (containing the profile ID and the introduction criteria) of each active profile to the introduction processor 300 via the communications network 200. The introduction processor 300 stores this information, along with the User IDs and header sections of all the active profiles received from every other terminal connected to the system, in the introduction database 500. The introduction processor 300 therefore maintains a database of all the active profiles of all the terminals connected to the system.

Periodically the introduction processor 300 performs a search among the active profiles to determine whether any of these profiles are compatible. Alternatively, this search could be performed according to a different triggering mechanism, such as whenever the introduction database 500 changes, or upon the request of a user of a terminal 100. Two profiles are compatible when they are of the same profile type (as determined by the Profile ID) and when the introduction requirements of one profile match the introduction attributes of the other. Once the introduction processor 300 determines that two active profiles are compatible it registers a "compatible profile introduction".

If, for example, a user of terminal 100 was a male who lived in Manchester in North West England, and was interested in finding a suitable female tennis partner who lived within 10 miles of his favourite tennis courts within the city, he could activate a populated Sports Partner Finder Profile in order to try and arrange a meeting with a suitable partner. The actual basis for a match to determine whether the user of terminal 100 wished to meet other users is determined on the basis of the attributes and requirements of the Sports Partner Finder Profile. However, the user of terminal 100 might be completely uninterested in finding a tennis partner who lived in mainland Europe or in the USA, regardless of how suitable a tennis partner they might be. Therefore the introduction criteria would be used to limit the matches to those that have a chance of being useful to the user, based on a set of limiting criteria determined by the user. Without such introduction criteria, match attempts would have to be performed between every active profile of the same profile type in the system. The use of introduction criteria therefore greatly reduces the amount of processing time for the communications system, as there may be many thousands of terminals connected to the system, each with a large number of active profiles.

As discussed, the introduction criteria of a profile can contain both geographic and non-geographic criteria, or a mixture between the two. In the above example, the introduction attributes of the active instance of the Sports Partner Finder Profile of the user of terminal 100 comprise information relating to a geographic location corresponding to somewhere in the city of Manchester, and might also include information indicating that the user of terminal 100 is a male who plays tennis. The introduction requirements of this profile would contain information relating to a radius around a particular location within Manchester, and might also include information indicating that the user is seeking a female tennis partner.

For an active Sports Finder Profile on terminal 100 the introduction processor 300 compares all active profiles with the same Profile ID (which are therefore also instances of the Sports Partner Finder Profile) that are stored in the introduction database 500. The introduction processor 300 will then compare the introduction attributes of every active instance of the Sports Partner Finder Profile stored in the introduction database 500 with the introduction requirements of the Sports Partner Finder Profile sent by the terminal 100. The introduction processor 300 registers a compatible profile introduction when the introduction requirements of a first profile match the introduction attributes of a second. In some embodiments, the introduction processor 300 will only register a compatible profile introduction when the introduction requirements of a first profile match the introduction attributes of a second and the introduction requirements of the second profile match the introduction attributes of the first.

As discussed, a match is established for two profiles when the requirements of one match the attributes of the other. The matching of requirements to attributes is performed on each terminal, and not by the introduction processor 300. The role of the introduction processor 300 is to establish which profiles should be introduced to each other for subsequent match processing.

All introduction processing and subsequent match attempts by the system are performed with reference to one (and only one) instance of an active profile. That is, the system attempts to locate matches for one profile from among all the other suitable active profiles. It is thus a one-to-many style match attempt, always with reference to a first user or first terminal or first profile instance. The introduction criteria can only be applied between pairs of profiles, and thus the introduction processor 300 establishes which profiles are compatible (i.e. have matching introduction criteria etc.) with a first profile.

Once a compatible profile introduction has been established for a first profile the communications system then performs the full matching process. The introduction processor 300 provides each terminal that provided an active profile involved in the compatible profile introduction with the location on the communications network 200 of the terminal that provided the first profile. Each terminal involved in the compatible profile introduction then shares its user's requirements for the profile involved in the compatible profile introduction with the terminal that provided the first profile. The requirements are shared via the communications network 200. Alternatively the requirements could be shared using the introduction processor 300 as an intermediary, in which case the terminals involved in the matching process need not be aware of the location of each other on the communications network 200. In other embodiments, each terminal could send the requirements of every active profile to the introduction processor 300 with the header section of each profile at the first stage of the matching process. In such embodiments the introduction processor 300 could send requirement data to the relevant terminals when needed. The attributes are never shared between the terminals during the matching process.

Once the terminal 100 receives the requirements of every profile involved in the compatible profile introduction, it compares these received requirements with its stored attributes. The terminal performs the function of a match processor in the system. A match is established when the requirements of one profile match the attributes of the other. A two-way match is established when the requirements of each match the attributes of the other.

Once a match has been established for a profile, the user's optional tag section for that profile is sent by the terminal 100 to the other terminal or terminals with which a match has been established, if desired by the user. In the ensuing matched mode, information regarding the match, as contained in the tag section, though not the personal details that comprise the attributes of other users are received by the terminal 100. This information is received via the communications network 200 in this embodiment. Once a match has been established, the users involved in the match are alerted to the match.

Once alerted to the match the users involved may wish to share more detailed information about themselves. This could be performed by a peer-to-peer connection between the terminals over the communications network 200.

In the embodiment of FIG. 1, the terminal 100 could comprise a personal computer, a notebook computer, a laptop computer, a handheld computer, a workstation, a mainframe, a PDA or palmtop computer, a wearable computing device, a tablet, a smartcard, a device or product with embedded computing capability, a pager, a mobile telephone, an interactive television, or an application specific device. The profiles could be stored in a suitable data store comprised within the terminal 100. This data store could be a memory or physical storage means. Alternatively all or part of the profiles could be stored in a remote data store, and accessed by the terminal 100 when needed. In such a situation, the link could be achieved by using a local area network, wide area network or the Internet. The terminal can therefore be considered a sub-system in the system according to the generalised embodiment.

The introduction processor 300 could comprise a server running on one or more general purpose computers. The introduction processor 300 and the introduction database 500 could together be considered a processor system, and be located on the same general purpose computer or computers. Alternatively, the introduction database 500 could comprise a number of data stores, located on one or more computers.

The communications network 200 could comprise any network whether it be a conventional landline network or a wireless network. More specifically, the communications network 200 could be provided by the Internet, an intranet, an extranet, a local area network, a wide area network or a network employing wireless application protocol. The wireless application protocol could comprise 808.11a, 808.11b, WAP, GRPS or 3G transmission. The components of the network can employ standard data networking protocols for data communications on the network 200 such as TCP/IP, HTML, XML, HTTP, DNS, LDAP.

A first specific embodiment of a communications system according to the invention will now be described in more detail with reference to FIGS. 2 to 11.

This embodiment of the invention is implemented over the Internet. This embodiment comprises five users, denoted Users A to E, who are all interested in meeting others with a view to forming a relationship. However, those skilled in the art will appreciate that the number of users of such a system is not limited in any way.

The communications system comprises a number of clients 2 connected to an introduction server 6 via the Internet 4. Each user possesses a device set up to run suitable software to act as a client 2 in the system. In this embodiment these devices take the form of personal computers set up to run suitable client software. Each client 2 is connected via the Internet 4 to an introduction server 6, which forms part of an introduction processing system. The introduction processing system further comprises an introduction database 8, a server blacklist cache 9, and a server recent encounters cache 10 connected to the introduction server 6. Other embodiments could use more than one introduction database or an alternative cache arrangement.

It is well-known and will be understood by those skilled in the art that servers can comprise a computer program application implemented on a dedicated machine, or they can comprise a computer program application as one of many implemented on a machine. Thus, in the embodiment of FIG. 2, the introduction processing system could be implemented on a single computer with appropriate storage capacity for the introduction database 8, the server blacklist cache 9 and the server recent encounters cache 10. In addition, it will be well understood that a introduction processing system such as described herein could easily (and often would) define one functional element of a larger system, which could provide a range of other facilities, some of which could be co-operable with the introduction processing system.

In fact, the introduction processor 300 could perform other functions supporting the operation of other elements of the larger system; in other words, they could be shared resources. This means that the processing steps described in relation to embodiments of this invention are not necessarily self-contained and could represent components of other processes.

Figure 2:
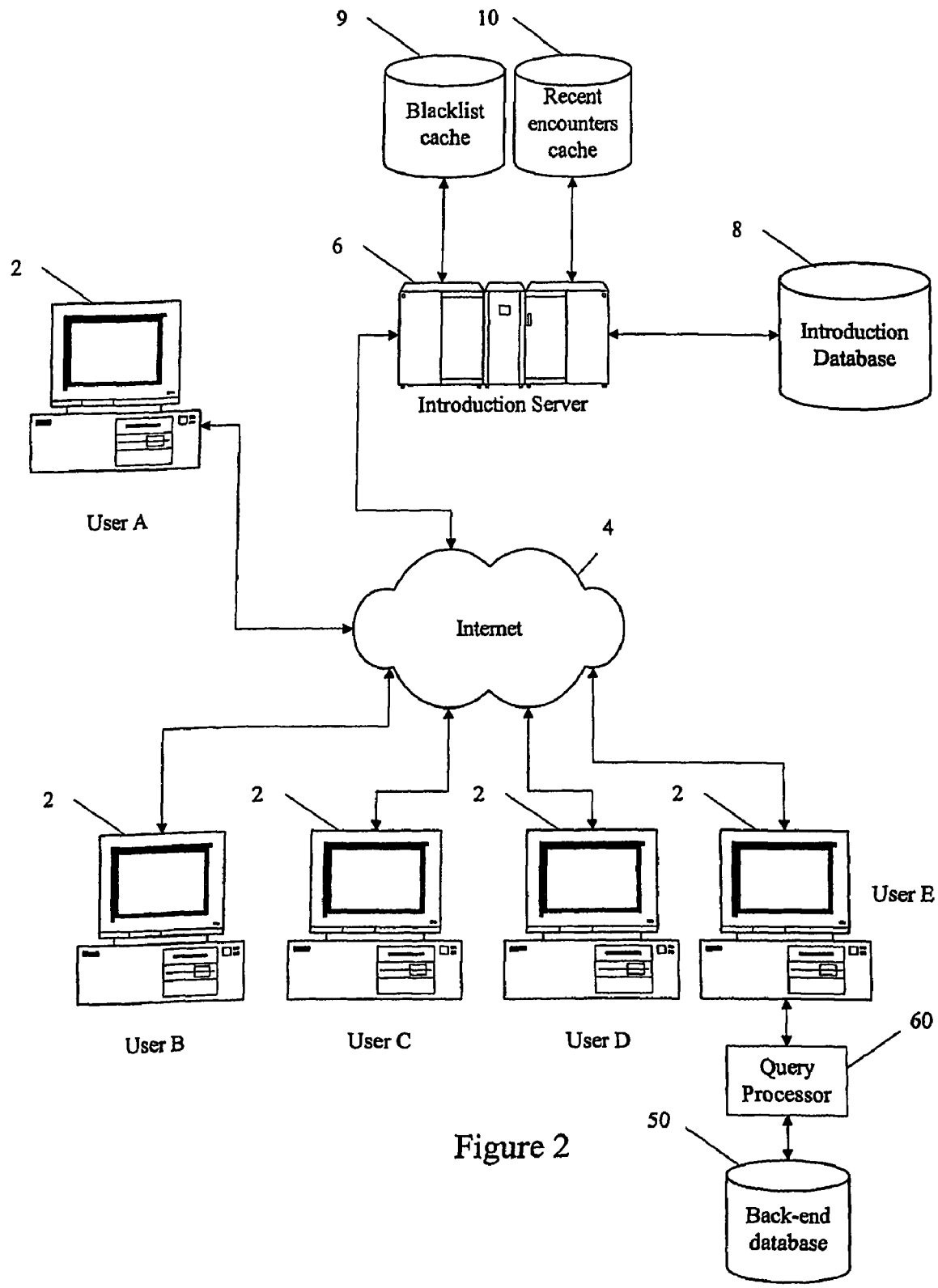
FIG. 2 is a schematic diagram of a communications system according to a first specific embodiment of the present invention.
Figure 3:
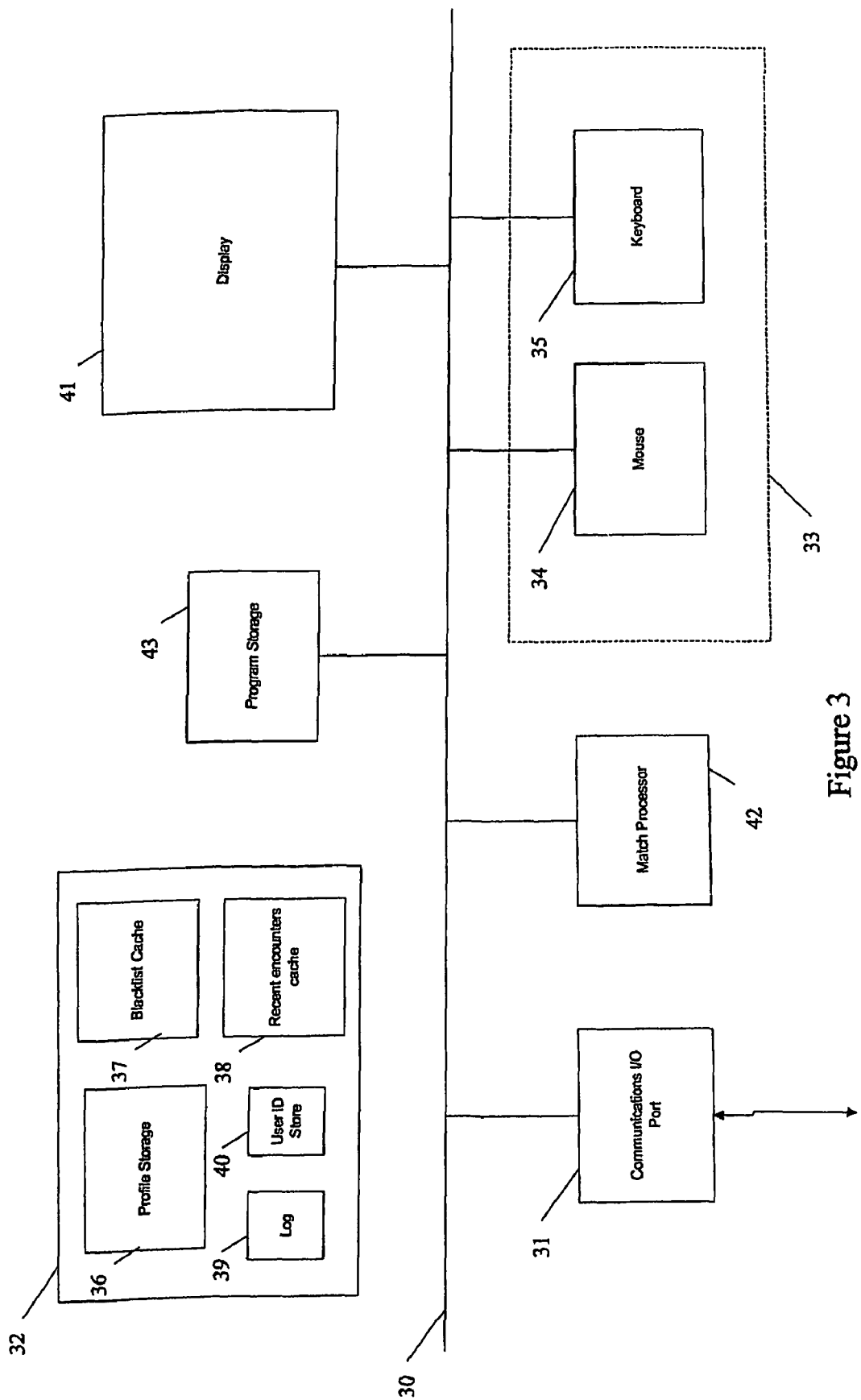
FIG. 3 is a schematic diagram of a computer terminal for use in the system of FIG. 2.

FIG. 3 is schematic diagram of a device suitable for running the client software for use with the first specific embodiment of FIG. 2. In FIG. 3 the device is represented by a desktop personal computer. However, the device could comprise any suitable hardware, including: a notebook computer, a laptop computer, a handheld computer, a workstation, a mainframe, a PDA or palmtop computer, a wearable computing device, a tablet, a smartcard, a device or product with embedded computing capability, a pager, a mobile telephone, an interactive television, or an application specific device.

The device comprises a control bus 30, a communications I/O port 31, a memory 32, a user input means 33, display means 41, match processor 42, and program storage 43. Where the client 2 comprises a general purpose computer, the user input means 33 comprises a pointing device, such as a mouse 34 and a keyboard 35, and the display means 41 would be a standard monitor. In addition, the device of User E is connected to a query processor 60 that is connected to a back-end database 50. The device set up to act as a client 2 can be a sub-system within the system according to the first specific embodiment.

The specific embodiment shown in FIG. 2 uses self-describing profiles of the type discussed in relation to the general embodiment of FIG. 1 to match user interests. The profiles, which contain information relating to the attributes, requirements, tags, and introduction criteria are stored in the profile store 36 of the memory 32 of each client 2. In addition the memory 32 comprises a client blacklist cache 37, a client recent encounters cache 38, a log 39 and a User ID storage 40. Other embodiments of the invention could be provided with an alternative memory configuration. In clients that possess a back-end database 50 all or part of the profile's attribute and tag data could be stored in the backend database 50. These attribute and tag data could form part of an existing database, and the query processor 60 used to query the data in the existing database in order to obtain data comprising the attributes and tag sections of a profile. Attribute sets and tag sets constructed in this way are termed "virtual attribute sets" and "virtual tag sets" respectively.

Each client 2 comprises suitable software for communicating and exchanging data with the introduction server 6 via the Internet 4. This software is locally stored on each device set up to act as a client in the program storage 43. In other embodiments the device could be provided with all the appropriate software by the introduction server 6 when it is needed. For example, the introduction server 6 could send the software to a user's personal computer in the form of a java applet.

Inter alia the role of the introduction server 6 is to identify which active profiles of clients 2 connected to the system are compatible with each other. In this embodiment, all matching of received requirements to stored attributes is performed on the clients 2.

Inter alia the role of the client 2 is to send profile information to the introduction server 6, and to receive requirements data from other clients with compatible profiles. The client 2 then compares the stored attributes of its user against the received requirements data from other clients in order to ascertain whether they match. A two-way match is established when the requirements of a first user are satisfied by the attributes of a second and the requirements of the second user are satisfied by the attributes of the first user.

The profile's introduction criteria are used to limit the number of match attempts between clients. It is both unfeasible and undesirable that every user logged on to the system should attempt to match with every other active user. There could be potentially millions of such users active at any given time, the majority of which may be entirely inappropriate as potential match candidates.

To accommodate this, every profile comprises fields within the header section that form the introduction criteria. These are used by the introduction server 6 to determine if two profiles of the same type should be introduced, i.e. a match attempt should be initiated. These fields are comprised of introduction requirements and corresponding introduction attributes. The introduction server initiates a match attempt for two profiles if, and only if, the introduction requirements of each profile are satisfied by the introduction attributes of the other. These introduction requirements and introduction attributes fields are generally minimal and are provided in addition to the regular requirements and attribute sections of the profile. The introduction attributes are the only attributes of the user that are sent to the introduction server 6 in this embodiment. Hence, they are the only characteristics of the user, or of something offered by the user, that are shared with any other user or computer (aside from any attributes that comprise the tag section that is shared on the establishment of a two-way match). The attributes section proper remains stored locally on each client 2 (or else as virtual attributes in a database 50 accessible to the client) and is never transmitted in this embodiment.

In embodiments of the invention, match attempts take place between a first client and multiple other clients for a single instance of an active profile belonging to the first client. Match attempts are also generally for a single instance of an active profile belonging to each of the multiple other clients. However, the introduction server 6 may determine that multiple instances of an active profile belonging to the same client should be introduced for a match attempt.

In the embodiment illustrated in FIG. 2, a user selects and configures the profiles to be stored in the client 2 using suitable software. This software could comprise a set of officially endorsed profile templates.

For each type of profile selected, the user enters any attributes, requirements, tags and introduction criteria via the user input means 33. An indication of the stored profiles and the data contained therein is displayed to the user via the display 41. Once one or more profiles are populated, the user then decides which of the stored profiles they wish to designate as active using the user input means 33. The user can change the profiles that are currently active to suit their immediate needs.

In some embodiments, every profile is subject to a predetermined active period, and the client automatically deactivates every profile after the predetermined period has elapsed. This prevents outdated profiles from being kept active. The predetermined period for each profile can be edited using the user input means 33.

In order to further facilitate the activating and deactivating of profiles, the user can also instruct the client to activate or deactivate stored profiles at predetermined times of the day or week. This could allow the user to set up a profile diary to suit their needs, and could give the user the capability of automating the selection of active profiles. These timed settings are stored in the profile and could be overridden at any time by the user. This timing information that indicates the predetermined active period of the profile could be stored in the profile header of the profile.

The user can download new profile types to the client 2 using the Internet 4. These new profiles, which could be blank and unpopulated and serve as templates for the construction of a populated profile, could be provided by the introduction server 6 or by an alternative web server. Alternatively profiles could be downloaded from an email or MMS attachment. These downloaded profiles could be officially endorsed or created by third parties. Alternatively, the client 2 could accept a removable data carrier, such as a solid state, optical or magnetic storage media, upon which there could be preloaded a selection of profiles templates. Every stored instance of a profile type (i.e. every profile with the same Profile ID) is given a unique, or at least unique as regards a single user, user-defined profile name. This profile name enables the user to identify each profile stored on their client 2.

Each client 2 is assigned a unique User ID that cannot be altered by the user, and is stored in the user ID storage 40 of the memory 32. In order to preserve the privacy and anonymity of its users, each user is assigned a unique Client ID by the introduction server 6. In this embodiment, the Client ID is derived from the User ID by an encryption method. The Client ID is used by the communications system as a means of identifying each client 2. Each client 2 stores its Client ID in the memory 32. Only the introduction server 6 is able to perform the operation that maps any Client ID to its associated User ID, and hence the anonymity of individual users from each other is preserved.

Similarly, when referring to (or caching) a specific profile instance belonging to a client 2, the introduction server 6 assigns and uses a derived profile Instance ID, rather than the user-defined profile name for that instance. The introduction server 2 informs each client 2 of the derived Instance ID of each of its profiles at the time they are uploaded from client 2 to the introduction server 6. Again, only the introduction server 6 is able to perform the operation that maps any profile Instance ID to its associated profile name. In this way, a user's name for a particular profile instance (which may contain information of a private nature) is never passed on to another user's client 2.

The introduction server 6 stores a Server ID, which is provided to and recognised by all of the clients 2 in the system.

In this embodiment, the system comprises a server recent encounters cache 10 connected to the introduction server 6 and a client recent encounters cache 38 comprised in the memory 32 of the client 2. Similarly, the system comprises a server blacklist cache 9 connected to the introduction server 6 and a client blacklist cache 37 comprised in the memory 32 of the client 2.

The caches store timestamped information comprising the unique Client IDs of other clients and information required to uniquely identify the unique instance of a particular profile belonging to that client. That is, the caches store: the unique Client ID; the unique Profile ID; and the profile Instance ID for a particular instance of a profile.

In some situations, it is desirable for the introduction server 6 to maintain some segregation of otherwise compatible profiles of two clients 2. For example, the operator of the introduction server 6, which could typically be a commercial enterprise, might wish to constrain its search to profiles applicable within a particular country, or perhaps whose owners have registered with the service through a particular third party.

In order to implement this segregation, this embodiment provides additional fields within the header section termed "Subset Identifiers". These fields provide segregation information and enable profiles to be maintained and segregated from other, otherwise compatible profiles.

In some embodiments, these fields can be used to ensure that profiles with a particular value or one of a set of possible values in the Subset Identifiers are stored and maintained in separate introduction databases connected to the introduction server 6. Alternatively, the introduction server 6 can store these profiles within the same introduction database 6, but constrains its search to those profiles with a particular value or a set of particular values within the Subset Identifiers.

Examples of such Subset Identifiers include:

Country Code—to indicate profile instances that apply only to a particular country;

Company Code—to indicate users or profiles that have registered with the service through a particular third party company. For example, a company could subcontract the introduction server 6 to host their dating service between all the company's registered customers.

The operation of the first specific embodiment of the present invention shown in FIG. 2 will now be described with reference to FIGS. 4 to 11.

In FIGS. 4 to 11, while this is not always shown, all messages sent by either the introduction server 6 include the Server ID, and all messages sent by the client 2 include the Client ID of the client 2.

Figure 4:
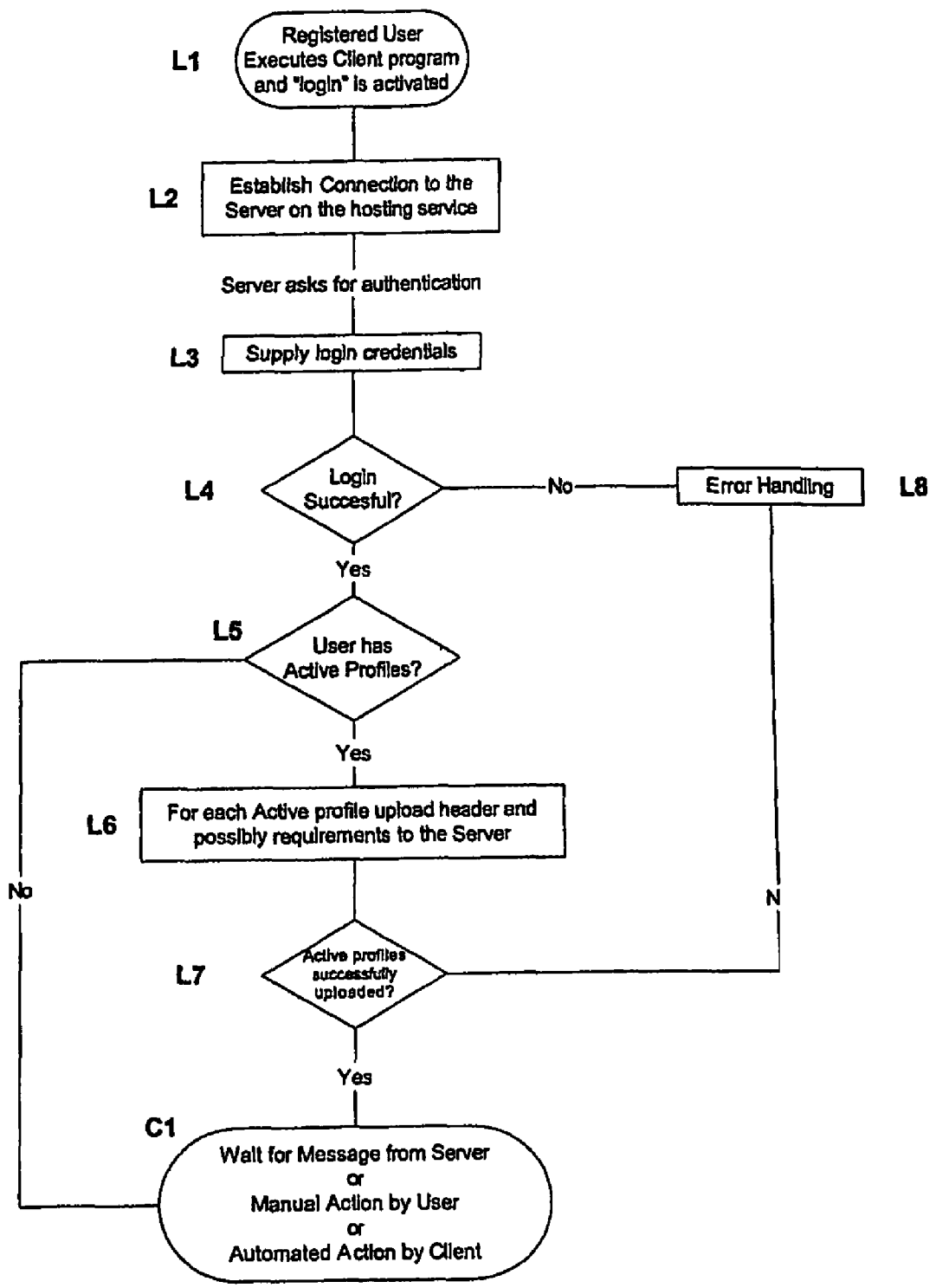
FIG. 4 is a flow diagram illustrating a method of a client logging on to the introduction server and uploading information relating to their active profiles according to the first specific embodiment of the invention.

FIG. 4 shows a flow diagram detailing the process by which a client 2 belonging to a registered user of the system establishes a connection with the introduction server 6.

At step L1 the user executes their copy of the client program on their personal computer system. This may be initiated automatically, for example, whenever the user's computer system enables a suitable network connection. The client software running on this personal computer system is thus a client 2 in the communication system.

On the instruction of the user, the client 2 commences "login" to the introduction server 6 and proceeds to step L2. Alternatively the client 2 could attempt to login when a suitable network connection to the Internet 4 is enabled. It will be appreciated by those skilled in the art that the client 2 may connect to the Internet 4 in many ways, which could typically involve the use of an Internet Service Provider.

At L2 the client 2 establishes a connection with the introduction server 6 over the Internet 4. The introduction server 6 then prompts the client 2 for authentication. At step L3 the client 2 prompts the user for the necessary authentication information, which in this embodiment is the User ID and password. Alternatively the necessary authentication information, which could take other forms, is supplied automatically by the client 2.

At step L4, the login will have either been successful, in which case the client 2 proceeds to step L5, or unsuccessful, in which case the client 2 proceeds to step L8, at which point appropriate error handing procedures are carried out. This could include prompting the user again for the appropriate login credentials.

At step L5, the client 2 checks whether any active profiles are stored in the memory 32. If there no active profiles stored, the client 2 proceeds to step C1 and awaits further action events.

If the memory 32 contains stored active profiles, the client 2 uploads the header section and possibly the requirements for every active profile at step L6 to the introduction server 6. In this embodiment, whether or not the client 2 uploads the requirements section of a given active profile is entirely flexible and is made, for example, on a per profile type basis, or on a per client basis, or on a per profile instance basis.

In other embodiments, the client 2 uploads the header section and requirements of all of the user's profiles to the introduction server 6, regardless of whether or not they are currently active. The introduction server 6 can then monitor every profile stored on the client 2 for any change to its active/inactive status, which may vary according to a predetermined user defined time schedule.

Once all the necessary uploading of data to the introduction server 6 is complete, the client 2 proceeds to step L7. If the uploads to the introduction server 6 were not successful, the client 2 moves to step L8, at which points it takes the necessary corrective action. This could include trying to upload the relevant data again.

If the uploads were successful, the client then moves to step C1 and awaits an appropriate event, such as a message from the introduction server 6.

Figure 5:
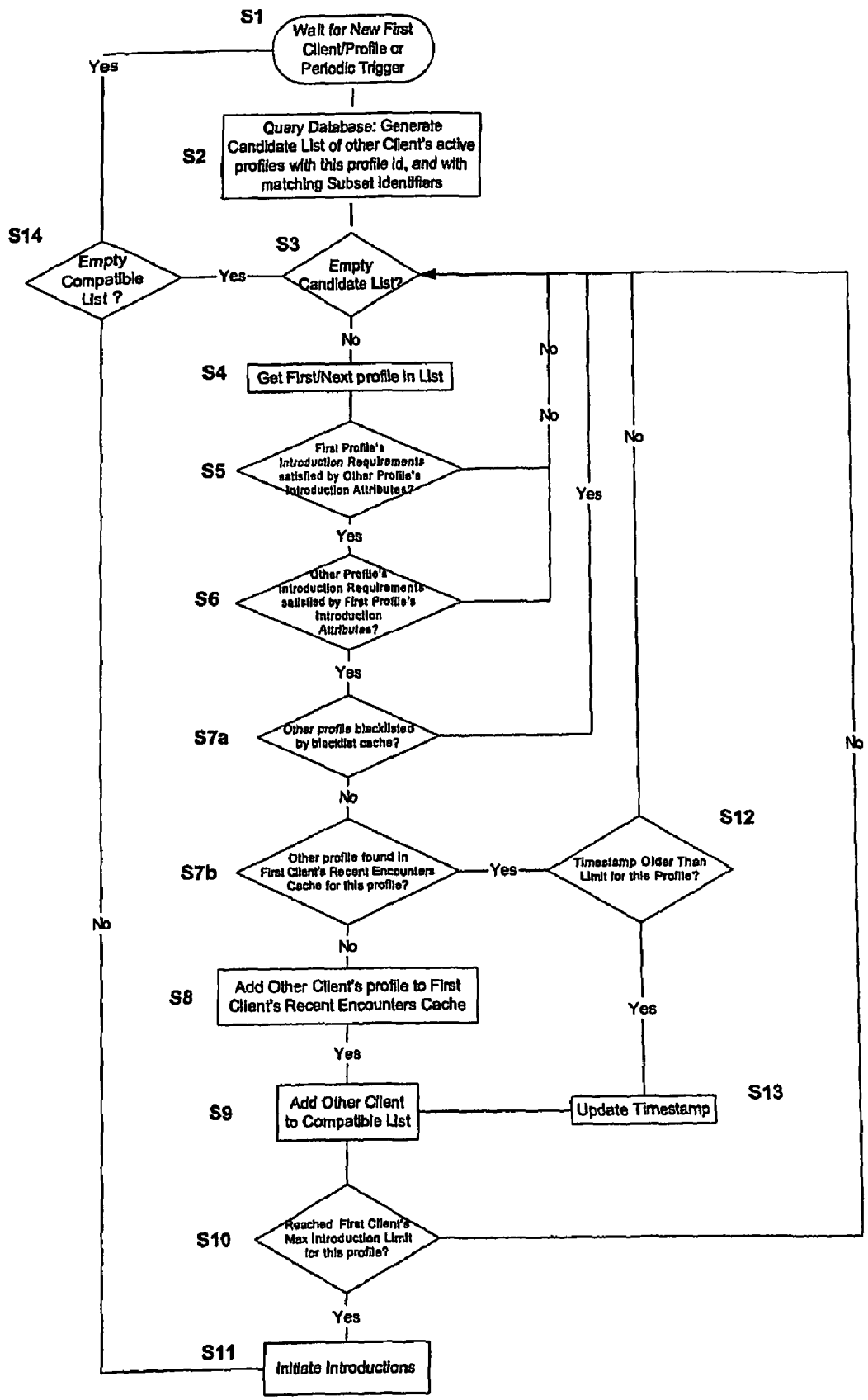
FIG. 5 is a flow diagram illustrating a method of the introduction server identifying compatible profiles relative to a first client and a first stage of the introduction procedure for compatible profiles according to the first specific embodiment of the invention.
Figure 6:
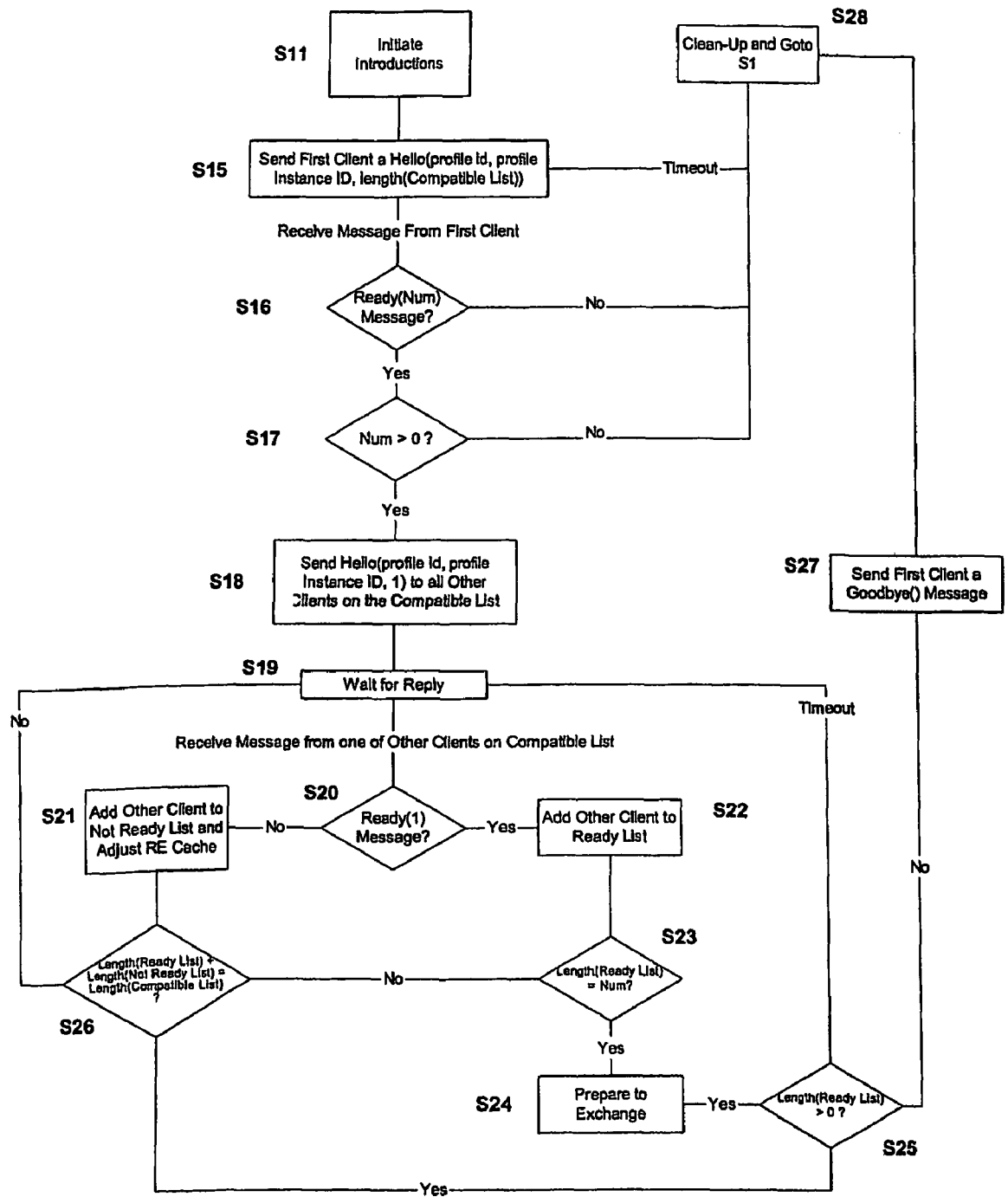
FIG. 6 is a flow diagram illustrating a second stage of the introduction procedure for compatible profiles according to the first specific embodiment of the invention.
Figure 7:
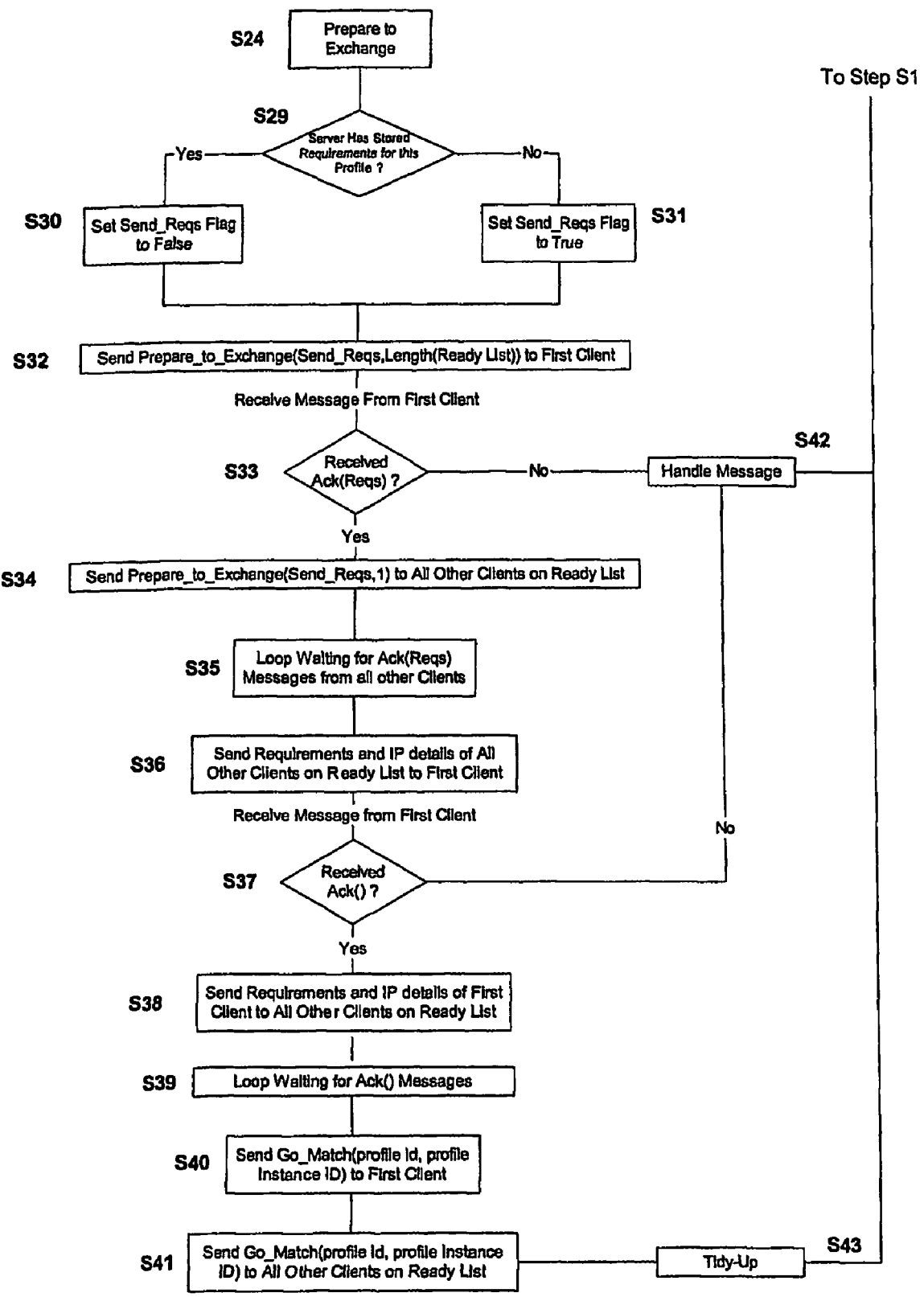
FIG. 7 is a flow diagram illustrating a third stage of the introduction procedure for compatible profiles according to the first specific embodiment of the invention.

The method by which the introduction server 6 initiates introductions between two or more clients will now be described in detail with reference to FIG. 5. Prior to step S1 a number of clients 2 will have become active, having established a connection with the introduction server 6 and supplied the necessary credentials to login.

In addition, the header sections and (in some cases) the requirements sections of any active profiles on every client 2 will have been uploaded to the introduction server 6. The introduction server 6 stores these data in the introduction database 8.

At step S1 the server waits for an appropriate event to trigger the search for compatible profiles relative to a profile of a first client 2. This embodiment of the invention can use a variety of such triggering events, which might vary according to profile type. This embodiment can use: a first client 2 registering a new active profile with the introduction server 6; a first client 2 manually requesting a match attempt for a particular profile instance; or a periodic timer for a particular profile instance.

On an appropriate triggering event, the introduction server 6 proceeds to step S2 and begins the process of trying to identify compatible profiles from those stored in the introduction database 8.

At S2, and for a given first profile, the introduction server 6 queries the introduction database 6 and generates a list of all active profiles that have the same profile ID as the first profile, and that have matching Subset Identifiers. This list is termed the "Candidate list".

At S3, if the Candidate list is empty the introduction server has determined that there are no suitable candidate profiles with which to initiate a match attempt with the first profile. The introduction server 6 then returns to step 51 (via S14) and waits for the next appropriate trigger event. If the Candidate List is not empty the Server proceeds to S4.

At S4, the introduction server removes the first/next profile from the Candidate List, termed the "candidate profile" and proceeds to step S5. At step S5, the introduction server 6 compares the first profile's introduction requirements against the candidate profile's introduction attributes. If these do not match, then the introduction server 6 has established that the candidate profile is not compatible with the first profile, and the introduction server 6 returns to S3.

If the first profile's introduction requirements match the candidate profile's introduction attributes, then at S6 the introduction server compares the candidate profile's introduction requirements against the first profile's introduction attributes. If these do not match, then the introduction server 6 has established that the candidate profile is not compatible with the first profile and it returns to S3. However, if they do match, then the introduction server 6 has established that the candidate profile is compatible with the first profile.

However, the candidate profile may be stored in either the server blacklist cache 9 or the server recent encounters cache 10.

The server recent encounters cache 10 comprises a list of the unique Client IDs, the unique Profile IDs, and the profile Instance IDs for particular instances of a profile that a particular client has communicated with recently. A separate recent encounters cache 10 is maintained in the server for each client. The purpose of this cache connected to the introduction server 6 is to prevent the introduction server 6 repeatedly attempting to introduce the same profiles from the same clients for a match attempt.

The server recent encounters cache 10 comprises the Client IDs, Profile IDs, and profile Instance IDs that the introduction server 6 has most recently introduced for a match attempt, with an appropriate time stamp for each entry. When the server recent encounters cache 10 for a particular client becomes full, the oldest entry will be purged. Entries in the server recent encounters cache 10 could also be purged after a predetermined time has elapsed. Thus the user could be able, for each profile instance or type, to record a preference that controls the length of time for which an entry in the server recent encounters cache 10 should be considered valid. The user may, for example, decide that entries should expire from the cache after a period of twenty-four hours. This could enable, for example, a user to search for matching properties from each compatible estate agent on a daily basis. Furthermore, the contents of the server recent encounters cache 10 could be displayed to the user, and the user could purge the server recent encounters cache 10 manually.

The server blacklist cache 9 contains a list of the unique Client IDs, the unique Profile IDs, and the profile Instance IDs for a particular instance of a profile that a particular client has blacklisted at any point in the matching process. The contents of the blacklist cache 10 could be purged in the same way as for the server recent encounters cache 10 described above.

In some embodiments a user is able to specify different granularities to be applied to the server blacklist cache 9. This enables a user to blacklist any of: a particular client; a particular profile type for a particular client; or a particular profile instance of a particular profile type for a particular client.

At step S7a the introduction server 6 checks the server blacklist cache 9 to see if it contains information that blacklists either: the Client ID of the user of the candidate profile, or profiles of this particularly type from the Client ID of the user of the candidate profile, or this particular profile Instance ID from the Client ID of the user of the candidate profile.

If any such information is found in the server blacklist cache 9, the introduction server 6 determines that the candidate profile is not compatible with the first profile and returns to S3.

If no such information is found in the server blacklist cache 9, the introduction server 6 proceeds to step S7b. The introduction server 6 then checks the server recent encounters cache 10 for an entry for the candidate profile.

If an entry is found, the introduction server compares the timestamp of this entry against the expiry limit for this profile (S12). The expiry limit for a profile is specified in the recorded preferences of each client 2. If the timestamp indicates that the entry in the server recent encounters cache 10 was made within the period specified by the expiry limit, the introduction server 6 determines that this profile is not currently compatible and returns to S3.

However, if the timestamp is older than the expiry limit, the introduction server 6 determines that the candidate profile should now be considered compatible. The introduction server then leaves the entry for the candidate profile in the server recent encounters cache 10, and updates the timestamp with the current time (S13), before proceeding to step S9.

If, at S7b, an entry was not found in the server recent encounters cache 10, then the introduction server 6 determines that the candidate profile is compatible with the first profile. The introduction server 6 has thus established a compatible profile introduction between the first profile and the candidate profile. Therefore, in this embodiment, a compatible profile introduction is established when the two profiles have the same Profile ID, have matching Subset Identifiers, the introduction criteria of two profiles match, and when information barring the compatible profile introduction is not found in either of the caches.

Other embodiments may not employ Subset Identifiers, and a compatible profile introduction is established when the introduction criteria of two profiles match, and when information barring the compatible match is not found in either of the caches connected to the introduction server 6 (if present). Similarly, embodiments of the invention may not employ either or both of the server blacklist cache 9 or server recent encounters cache 10 connected to the introduction server 6. In such cases a compatible profile introduction is established when the introduction criteria of two profiles match and when the Subset Identifiers match (if present).

Once a compatible profile introduction has been established the introduction server 6 adds a time stamped entry to the server recent encounters cache 10 (S8) and then proceeds to step S9.

At step S9, the introduction server 6 adds the Client ID of the client that provided the compatible profile, and relevant profile details to the "Compatible List".

At step S10, the introduction server 6 checks whether the number of profiles on the Compatible List has reached the "Maximum Introduction Limit" for this profile.

For any given active profile, the potential number of other profiles belonging to other clients that the introduction server 6 may regard as suitable for introduction may potentially be very large (possibly even many hundreds of thousands). Since each introduction, or match attempt, imposes a load on both the introduction server 6 and the clients, limits are imposed on the number of introductions that the introduction server 6 will initiate on a client's behalf.

This embodiment provides for both server-imposed limits and client-imposed limits. The introduction server 6 can employ a default server-imposed Introduction Limit as well as specific server-imposed Introduction Limits for particular profile types. The user can, as part of their recorded preferences, specify a default client-imposed Introduction Limit as well as client-imposed Introduction Limits for each profile type or even each profile instance. The Maximum Introduction Limit is the smaller of any of these limits.

The Maximum Introduction Limit is thus a limit for each profile type that is user-definable up to a threshold imposed by the introduction server 6. If the limit has not been reached, the introduction server 6 returns to S3, and begins the process of checking the compatibility of the next profile on the candidate list relative to the first profile.

If, at S10, the Maximum Introduction Limit has been reached, the introduction server 6 will discard the remainder of the Candidate List and proceed to S11.

If, on returning to S3 after S10, all of the profiles on the candidate list have been processed, the introduction server 6 proceeds to step 514.

If, at step 514, the Compatible List is empty the introduction server 6 has been unable to identify any other compatible profiles for the first profile. The introduction server 6 then returns to S1. However, if the Compatible List is not empty at S14, the introduction server 6 will proceed to S11.

At S11 the introduction server 6 begins the process of initiating introductions for those profiles on the Compatible List. The processes performed on the introduction server 6 after step S11 will now be described with reference to FIG. 6. These processes will be described with reference to a first client initiating introductions with a number of other clients that have provided active profiles on the Compatible List.

Having compiled the Compatible List, the introduction server 6 is now ready to initiate the introductions (match attempts) between the first client and the at least one other client that has a compatible profile on the Compatible List. At step S15, the introduction server 6 sends the first client a "Hello( )" message, which comprises the profile ID of the compatible profile being introduced, the profile Instance ID, and the length of the Compatible List.

This message informs the first client that match attempts are about to be initiated and informs the first client how many other clients the introduction server 6 intends to involve in the match attempt.

The introduction server 6 then waits for a message from the first client. If no message is received, then after a pre-defined timeout period the introduction server 6 assumes that something has gone wrong with the client. The appropriate clean-up actions are taken at step S28 and the introduction server 6 returns to step S1. The clean-up actions may include recording that the first client is no longer active.

If a message is received from the first client, the introduction server 6 checks that the received message was a "Ready( )" message. A Ready( )message informs the introduction server that the Hello( )message has been received. The Ready( )message comprises a number, "Num", that informs the introduction server 6 that the client is ready to be introduced to up to Num other clients. This number (Num) will be less than or equal to the length of the Compatible List that was sent to the client at step S15. This enables a client 2 to limit, dynamically, the number of other clients with which it is currently willing to perform a match attempt. If the introduction server 6 receives a message other that a valid Ready( )message the introduction server 6 proceeds to step S28, where clean-up operations are carried out.

At step S17, the server checks that Num is greater than zero. If not, then the first client 2 has indicated that it is not prepared to perform any match attempts at the present time. Clean-up operations are performed at S28 and the introduction server 6 returns to S1.

If Num is greater than zero, then the introduction server 6 proceeds to S18 at which point it sends a Hello( )message to every other client that provides a compatible profile on the Compatible List. This increases the likelihood of having at least Num other clients involved in the matching process by the time all of the other clients have agreed to participate in the match attempt.

Although the number of clients with whom the first client is willing to perform a match attempt (indicated by Num) may be smaller than the length of the Compatible List, the introduction server 6 nevertheless sends a Hello( )message to all of the clients on the Compatible list.

As before, the Hello( )message comprises the profile ID, the profile Instance ID (which is individual to each client), and the length of the compatible list with respect to the other clients on the Compatible List, which will always be "1". That is, the first client is the only compatible client for all other clients on the Compatible List. This message informs each of the other clients on the Compatible list that the introduction server 6 is about to initiate a match attempt between them and the first client 2.

At step S19, the introduction server 6 begins waiting for replies from the other clients on the compatible list. The introduction server 6 checks each received message at step S20, and if a Ready( )message is received adds the client to the "Ready List" at step S22. If a Ready( )message is not received, the introduction server 6 adds the other client to the "Not Ready List" at step S21.

The server cycles through steps S19, S20, S21, and S22 until the length of the Ready List is equal to Num (the number of other clients the first client would consider being matched with) at step S23, or until the combined length of the Ready List and the Not Ready List is equal to the total number of entries in the Compatible List (S26).

At S25, the introduction server 6 checks the length of the Ready List. If the Ready List is empty, the introduction server 6 sends the first client a "Goodbye( )" message. The Goodbye( )message informs the first client 2 that this introduction attempt is concluded and not to expect further communications from the introduction server 6 regarding this introduction attempt. The introduction server 6 then proceeds to step S28 where clean-up operations are carried out.

If there are entries in the Ready List, the introduction server 6 proceeds to step S24, at which point it prepares to exchange information between the clients on the Ready List and the first client. At step S24 the server has established that the first client and that every other client on the Ready List are ready to prepare to exchange requirements. The steps following S24 will now be described with reference to FIG. 7.

As discussed, in this embodiment, the requirements section of every active profile is either sent to the introduction server 6 prior to S1 or else it is requested by the introduction server 6 prior to being required.

At step S29, the introduction server 6 identifies whether or not it already has a local and up-to-date copy of the requirements section of the first client's profile. If it does, then at step S30 it sets the value of a "Send_Reqs" flag to False and proceeds to step S32.

If the introduction server 6 does not have a local and up-to-date copy of the requirements section of the first user's profile, then, at step S31 it sets the value of the Send_Reqs flag to True before proceeding to step S32.

At step S32, the introduction server 6 sends the first client a "Prepare_to_Exchange( )" message. This message indicates to the first client whether or not it is required to send a copy of its requirements section for this profile (depending on the value of the Send_Reqs flag), and informs the first client exactly how many other clients it will be attempting to match with. This number will be less than or equal to the number (Num) that the first client was prepared to accept match attempts with.

On receipt of a message from the first client, the server proceeds to step S33 where it checks the type of received message. On receipt of an "Ack(Reqs)" message, the introduction server 6 performs similar steps (not shown) to S29, S30, and S31, for every other client on the Ready List to set the appropriate value for the Send_Reqs flag, before proceeding to step S34. The Ack(Reqs) message is an acknowledgement message, and contains, if appropriate, the requirements data for the profile of a client on the Ready List.

At S33, if a Ack(Reqs) message is not received the introduction server 6 proceeds to step S42 and takes the appropriate action depending on the type of message received.

For example, the introduction server 6 could receive a Goodbye( )message from the first client at this point, and thus be informed that it is not to expect any further communication from the first client.

At step S34, the introduction server 6 sends a "Prepare_to_Exchange(Send_Reqs, 1)" message to all of the other clients on the Ready List. The value of the Send_Reqs flag may vary per client, such that it is set to "True" for all clients for whom the introduction server 6 does not already have a locally stored copy of the requirements section of the profile.

The introduction server 6 then proceeds to step S35, at which point it loops waiting for receipt of an Ack(Reqs) message from all of the other clients on the Ready List. The intermediary steps required to handle inappropriate or incomplete messages are not shown.

Having received an acknowledgement, together with any appropriate requirements data, from all of the other clients on the Ready List, the introduction server 6 proceeds to step S36. At S36 the introduction server 6 sends the Internet Protocol (IP) details and requirements sections of all the clients on the Ready List to the first client.

Upon receipt of an acknowledgement message, at S37, the introduction server 6 proceeds to step S38 at which point it sends the necessary IP details of the first client together with the requirements section of the first client to all of the other clients on the Ready List.

At step S39, the introduction server 6 waits for an appropriate acknowledgement message from each other client on the Ready List to confirm that the IP details and requirements data of the first user have been received. This step, and other similar steps, may comprise subsidiary steps (not shown), such as those to handle timeouts and resending of messages, in order to accommodate communications errors or one of the other clients becoming unresponsive.

On receipt of all necessary acknowledgement messages, the introduction server 6 proceeds to step S40 at which point it sends a "Go_Match( )" message to the first client. Then, at step S41 it sends a similar Go_Match( )message to all of the other clients on the Ready List. These Go_Match( )messages serve as a synchronisation point for all of the clients, and signal to the clients to begin the processing of match attempts and any inter-client communications.

In this embodiment the introduction server 6 then plays no further part in the matching process, and it therefore performs any necessary tidying up (at step S43) before returning to step Si and awaiting the next triggering event.

Figure 8:
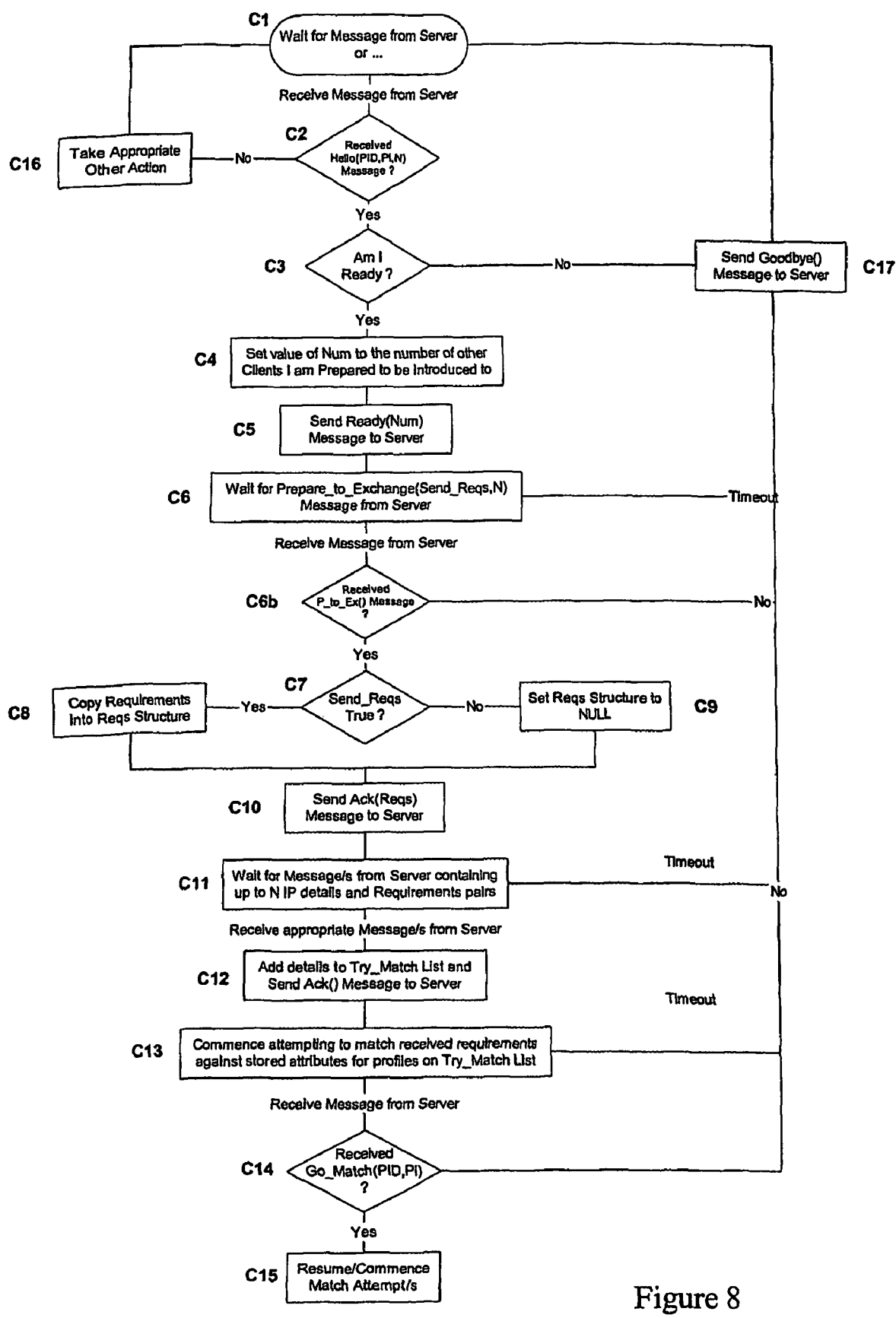
FIG. 8 is a flow diagram illustrating a first stage of the match procedure on a client according to the first specific embodiment of the invention.
Figure 9:
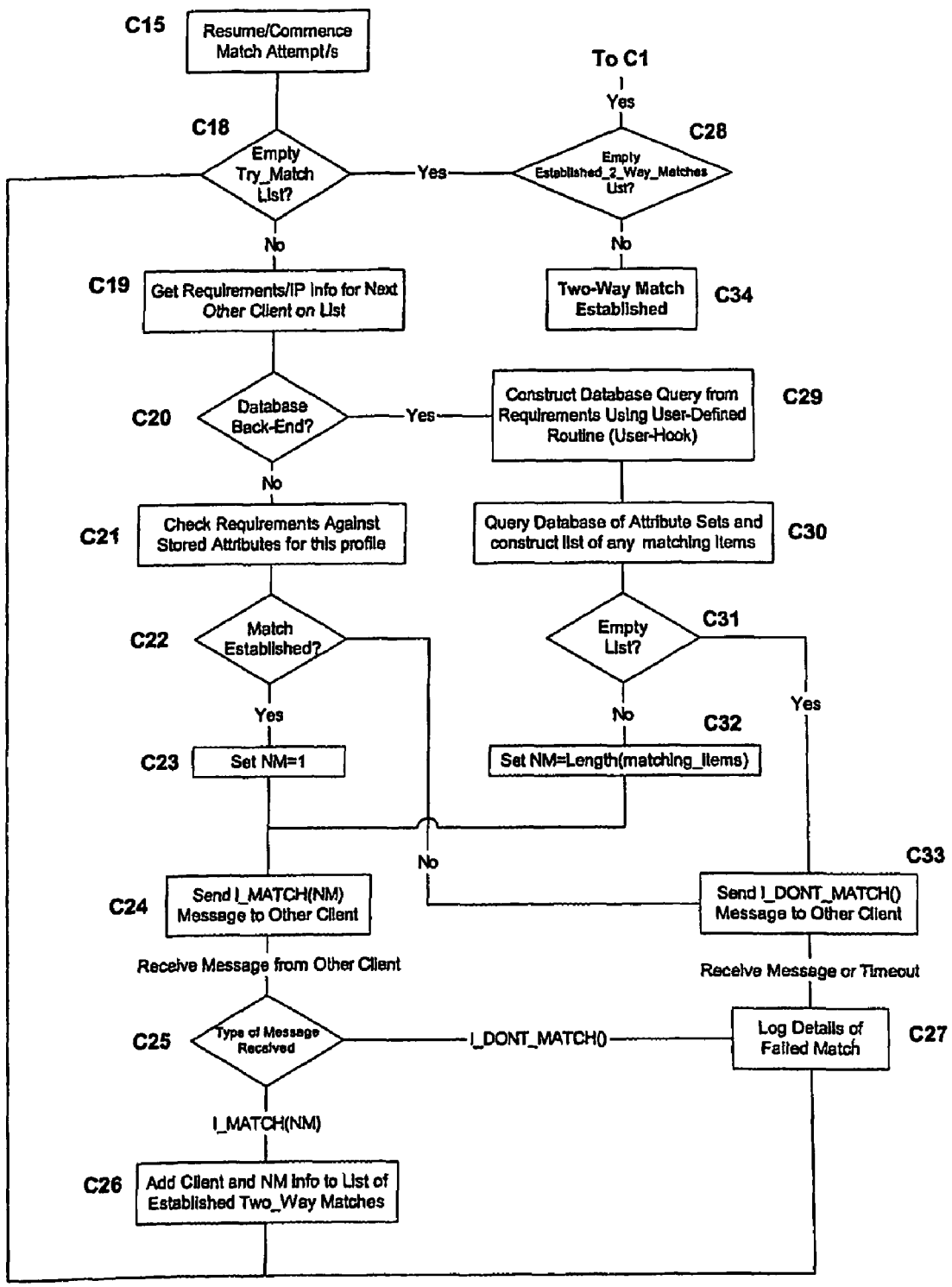
FIG. 9 is a flow diagram illustrating a second stage of the match procedure on a client according to the first specific embodiment of the invention.

The steps performed by the clients will now be discussed with reference to FIG. 8. In the following description it is assumed that the steps represented in FIG. 8 and in FIG. 9 are performed by both the first client (after the client has logged into the system) and at least one compatible client during the course of the dialogue. Furthermore, it might be the case that one or more of the other clients will have multiple compatible instances of a given profile. In such cases, and where the introduction server 6 includes some or all of these multiple instances in the Compatible List for this match attempt, the client will effectively be performing multiple copies of this logical flow.

At step C1 the client is in a state in which it is waiting for an appropriate event, such as a message from the introduction server 6. On receipt of a message from the introduction server 6, the client proceeds to step C2, at which point the client checks what sort of message has been received.

A valid "Hello( )" message from the introduction server 6 comprises the profile ID of the compatible profile being introduced, the profile Instance ID, and the length of the Compatible List. For the purposes of the discussion of FIG. 8, the length of the Compatible List will be referred to as "Num_Clients".

If the message received by the client at C2 was not a legal Hello( )message, the client proceeds to C16 and takes any appropriate action. The introduction server 6 and its clients may communicate for a large variety of reasons, including simple messages asking for confirmation as to whether both the introduction server 6 or the client are still in connection. Messages of this kind are handled by the client at step C16. Upon completion of step C16, for example by sending a message indicating that the client is still in communication with the introduction server 6, the client will return to step C1.

If the message received at step C2 was an appropriate and legal Hello( )message, then the client proceeds to step C3. If the client is ready to participate in a match attempt then it proceeds to step C4. However, if the client is not prepared to participate in a match attempt at this time, then it sends a Goodbye( )message at step C17, and returns to C1. Examples of reasons why a client may decline to participate in a match attempt include: the user is currently updating the contents of the profile; the client is in the process of closing down; or the client has multiple instances of a compatible profile and, having already agreed to participate in a match attempt with these other instances, has reached a user defined limit.

At step C4 the client sets the value of Num, which is used to indicate to the introduction server 6, the number of other clients with which it is currently willing to perform a match attempt. At step C2, the server indicated to the client, in the value of Num_Clients, the number of other clients that it has already assigned to be introduced.

The upper-bound for the value of Num_Clients is already determined, as the user (or the introduction server 6) set the Maximum Introduction Limit for this profile type or profile instance. On this basis, it is likely that the client will set the value of Num to be equal to Num_Clients. However, there may be circumstances, for example if the client's computer or network is under a particularly heavy load, when the client will set the value of Num to be lower than this. Values of Num greater than Num_Clients are not allowed, and will be handled appropriately by the server.

The client then moves to step C5, at which point it sends a Ready(Num) message to the introduction server 6 before proceeding to step C6. At step C6, the client waits for a Prepare_to_Exchange(Send_Reqs, N) message from the server. The parameter "N" represents the actual number of other clients with which the client will be performing match attempts. On receipt of a message from the server, the client proceeds to step C6b.

If the received message was an appropriate Prepare_to_Exchange(Send_Reqs,N) message, then the client will proceed to step C7. As discussed, the Boolean value of the Send_Reqs flag indicates whether the client needs to send the introduction server 6 a copy of the requirements of the profile for which a match attempt is being performed.

If the client is required to send a copy of the requirements to the introduction server 6, it copies the requirements section of the profile into a suitable "Requirements structure" at step C8, and then proceeds to C10.

If the client is not required to send a copy of the requirements to the introduction server 6, it sets the Requirements structure to NULL at C9 and proceeds to step C10.

At step C10, the client sends an acknowledgement message (Ack(Reqs)) that includes the Requirements structure as an argument before proceeding to step C11. Thus, at C11 the client will have sent a copy of the requirements section of the profile to the introduction server 6, if the introduction server 6 did not posses a copy of it already.

At step C11, the client waits for a message (or messages) from the server containing the IP details and Requirements for up to N other clients. Upon receipt of this message or messages, the client, at step C12, stores these data in a "Try_Match List" and sends an acknowledgement, before proceeding to step C13.

At step C13, the client begins the process of matching each received requirements section in the Try_Match_List against its stored attributes for this profile.

Also at C13 the client is listening for a "Go_Match(profile ID, profile Instance ID)" message from the introduction server 6. This message indicates to the client that all of the other clients that are going to participate in this match attempt are now ready and expecting to communicate with it.

Upon receipt of a Go_Match( )message, and its validation at step C14, the client proceeds to step C15 and resumes/commences attempting to match all of the received requirements against its own stored attributes for the profile instance. The Go_Match( ) message serves as a synchronisation point, after which all of the clients begin peer-to-peer communications with each other. In other embodiments the clients may communicate with each other indirectly, via the introduction server 6, rather than directly peer-to-peer.

The flow of control from C18 onwards is shown in FIG. 9 for a single thread. However, the procedure is likely to be multi-threaded. That is, match attempts will proceed either entirely or somewhat in parallel. Each thread may effectively maintain an exclusive dialogue with one of the other clients for the duration of its attempt to match the received requirements from that client with those of its own stored attributes.

From step C15, the client moves to step C18. If there are any unprocessed clients remaining on the Try_Match List, then the client proceeds to step C19 where the client retrieves the necessary requirements and IP information for the first/next other client on the list.

Then, at step C20, the client will take different action depending on whether the attributes data for this profile are stored directly within the profile store 36 of the client or within some form of client-accessible database, such as the back-end database 50 illustrated in FIG. 2.

If the attribute data are stored in the profile store 36 of the client, then the client proceeds to step C21 at which point it checks each of the other client's requirement fields against its own corresponding attribute fields.

If all the received requirements match the stored attributes at C21 then at C22 the client determines that a match has been established for this received profile. Then at C23 the value of "Number of Matches" (NM) is set to "1" and the client proceeds to step C24.

However, if at step C20, the attribute data is not stored in the profile store 36 of the client, but is stored as virtual attribute data in back-end database 50 connected to the client, then the client will proceed to step C29. At this point the client instructs the query processor 60 to automatically construct an appropriate query for their database 50 from the received requirement fields of the other client using a customised user-hook.

At C30, this query is submitted to the database 50 of attributes and the details of any matching attribute sets will be returned and maintained in a list. At step C31, if matching attribute sets are found (i.e. the list is not empty), then the client will proceed to step C32, at which point it will set the value of NM to be the number of matching attributes sets that were found (i.e. the length of the list), before proceeding to step C24.

In both the situation in which the attributes are stored in the profile store 36, and in which they are stored in the back-end database 50, the client then proceeds to step C24. At C24 the client sends an "I_MATCH(NM)" message to the other client using the IP details supplied by the introduction server. This message indicates to the other client that the first client's attributes are a match for the other client's requirements. If the value of NM is larger than "1", then it indicates to the other client that the first client has multiple matching items.

When the other client's requirements are not satisfied by the first client's stored attributes, the client proceeds to step C33 and sends an I_DONT_MATCH( )message to the other client. This is the case in both the situation in which the attributes are stored in the profile store 36 and in which they are stored in the back-end database. Hence the client can proceed to C33 from C22 or C31. An "I_DONT_MATCH( )" indicates to the other client that the received requirements do not match the stored attributes. On receipt of a message from the other client or else after a pre-defined timeout, the client logs the details of the failed match attempt at step C27 in the match log 39, before returning to step C18.

If an I_MATCH(NM) message was sent at C24, the client then waits until it receives a message from the other client. At C25 the client checks the type of message received. If the received message was an I_DONT_MATCH( )message, then the requirements of the first client do not match the stored attributes of the second client. The client then proceeds to step C27, where details of the failed match are logged for future reference in the match log 39, before the client returns to step C18.

If at C25, the received message is an I_MATCH( )message, then a two-way match has been established. At step C26, the client will add the appropriate details for this match to an "Established_2_Way_Matches List" before returning to step C18.

At C18, when there are no remaining other clients on the Try_Match List, the client will proceed to step C28. If the Established_2_Way_Match list is empty at C28, then no two-way matches have been found for this profile instance and the client returns to step C1. However, if the Established_2_Way_Match list is not empty, then a two-way match with at least one other client has been identified, and the client proceeds to step C34.

At C34 the client has established one or more two-way matches for a particular profile instance. Once the client has established a two-way match, the client will enter a matched mode. The establishment and operation of this mode will be discussed below in more detail in relation to FIG. 11, however before this, two more detailed examples of how the match processor 42 of each client processes the data in order to ascertain whether the profiles of the respective users match will be discussed.

FIG. 10 shows an abbreviated example of two Relationship Finder Profiles, as respectively populated by the user of a client 2 (User A), and a user of a compatible client (User B). The system comprises other users, who may have active Relationship Finder Profiles stored on their respective clients. However, the matching process will now be discussed in relation to User A and User B alone.

In this example, User A is a woman seeking a personal relationship and User B is a man similarly seeking such a relationship. Both users possess a client 2 in the form of a personal computer of the type illustrated in FIG. 2. In this example the attributes data of both User A's profile and User B's profile are stored in their respective profile stores 36, and are not hosted by an external database 50.

Prior to logging onto the system, User A selects a Relationship Finder Profile from the list of profiles stored on her client 2, and populates the data according to her attributes and requirements, and introduction criteria. These data are stored in the profile store 36 of User A's client 2, and the Relationship Finder Profile activated. In this example User A's client 2 sends the header section of the Relationship Finder Profile along with User A's requirements for this profile to the introduction server 6 on logging on. As discussed, whether or not the requirements are sent on logging on or later is flexible and could vary on a per profile type basis, or on a per client basis, or on a per profile instance basis. Prior to logging on, User B has similarly populated and activated a Relationship Finder Profile.

It is assumed in this example that the introduction server 6 has been triggered to seek compatible profiles for User A's profile, and that the introduction criteria of User A's and User B's profiles are compatible. These introduction criteria will not be discussed further in this example. Therefore the introduction server 6 will have established that the two instances of the Relationship Finder Profile (which have the same Profile ID) are compatible, and will have entered User B's profile onto the Compatible Profile List at S9 of FIG. 5. In this example, it is assumed that the Compatible Profile List for User A's profile comprises the profile User B only.

In addition to the header section (not shown), a profile such as the Relationship Finder Profiles illustrated in FIG. 10 comprises a set of attributes and requirements fields of various predetermined types. The types of data possible in each field, and example field structures will be discussed in more detail later. If and only if every attribute field matches the corresponding received requirement field for a particular profile, will the whole profile result in a match.

As can be seen in FIG. 10, User A is a 27 year old female, who is 5' 8" with brown hair. She has O-levels/GCSEs, A-levels and a University Degree, and has not entered her salary. She would consider being matched with other users who wanted a relationship based upon the commitment level "Good Friendship", "Long Term Partner" or "Casual Sex". These data fields comprise information personal to User A, and are stored in the attributes section of User A's Relationship Finder Profile.

User A is interested in matching with a male who must be between 25 and 30, have a University Degree, be no shorter that 5' 9" and must be interested in a relationship with commitment level of "Casual Sex". These data fields comprise the requirements of user A, and are stored in the requirements section of User A's Relationship Finder Profile. On logging on to the system the requirements are sent to the introduction server 6.

User B is a 31 year old male, who is 6' 1" with black hair. He has O-levels/GCSEs, A-levels and a University Degree, and a salary of £30K. He would consider being matched with other users who wanted a relationship based upon the commitment level "Long Term Partner" or "Casual Sex". These data comprise information personal to user B, and are stored in the attributes section of User B's Relationship Finder Profile.

User B is interested in meeting a female who must be between 20 and 30, be no taller than 6' 1", have any colour hair except grey, and must be interested in a relationship with commitment level of "Casual Sex" or "Long Term Partner". They must also earn a minimum of £15K if they have entered their salary, but as user B set the mandatory flag to equal 'False' in the salary field non disclosure of salary will not lead to rejection. These data comprise the requirements of user B, and once entered on user B's client 2 are stored in the requirements section of User B's Relationship Finder Profile. On logging on to the system the requirements are sent to the introduction server 6.

Considering User A's profile, all the received requirements fields from User B match the stored attributes fields. Therefore at step C22 of FIG. 9, the match processor 42 of User A's client would register a match. The value of NM would then be set to "1" at C23, and an I_MATCH(1) message sent to User B's client at C24.

However, User A's client will not enter matched mode unless a two-way match is established. As all User B's attributes fields match the received requirements from User A's device, User B's client will send an I_MATCH(NM) message to User A's client. User A and User B will have then both sent and received I_MATCH(NM) messages, which will result in a Two-way Match being established (C34).

The above example concerns matching user information using a finder-finder profile. However, there are important differences in the matching process between finder-finder profiles and finder-provider profiles.

In a finder-finder profile, a match will not be established unless the sent requirements of a user of a first client match the stored attributes of the user of a second client, and the sent requirements of the user of the second client match the stored attributes of the first user. This corresponds to a two-way match. Similarly, when using a finder-provider profile, neither client will enter the matched mode until a two-way match has been established. However, there are different criteria for an I_MATCH( )message to be sent from the user of the client designated the finder, and the client of the user designated the provider.

In the example of a house hunter wanting to buy a house, the system could be used with a plurality of clients, each with populated Property Finder Profiles. A Property Finder Profile stored on the house hunter's client will contain a field that indicates that this user is designated a finder in the header section, along with appropriate introduction criteria. The introduction criteria of the house hunter could contain information relating to the location of estate agents that they would be interested in viewing the properties of Correspondingly, the Property Finder Profile stored in an estate agent's client will contain a field that indicates that the estate agent is designated the provider. The estate agent's introduction criteria would typically be minimal, as they would not wish to discriminate against match attempts with any potential customers.

The requirements section of the house hunter's Property Finder Profile stored on their client will contain detailed information about their property requirements. The requirements section of the estate agents client will contain information indicating that they are interested in obtaining a match with any house hunter who is interested in matching with one of their properties.

If the house hunter is interested in buying a 2 bedroom house with a garden, the house hunter's client will try and obtain a match with the client of any estate agent who has such a house or houses in the attributes section of their Property Finder Profile, presuming the introduction criteria of both profiles match. In this example all of the properties listed with the estate agent are held as multiple virtual attribute sets of one profile, the actual attribute data being stored within the estate agent's existing property database 50 connected to the estate agent's client. The ability to include multiple instances of the attribute data within the attributes section of a provider's profile, and to achieve this (where desirable) by interfacing with an existing database of any kind, is a key feature of finder-provider profiles.

As discussed, the matching process is generally similar to that described above for finder-finder profiles. However, the matching process for the provider, in this case the estate agent, loops through checking a single set of received requirements against multiple stored attribute sets (corresponding to all their properties) stored in the back-end database. The actual comparison of the received requirements against the multiple virtual attribute sets will be performed by a suitably constructed database query to their existing database. This will be done at step C30 of FIG. 9, at which point the estate agent will construct a list of the number of matching items.

If the estate agent has one or more suitable properties, an I_MATCH(NM) message will be sent by the estate agent's client. If the estate agent has no suitable properties, an I_DON'T_MATCH( ) message will be sent. In the case of the Property Finder Profile, the requirements of the estate agent are minimal, and perhaps even non-existent (NULL), as they wish to match with as many house hunters as they can. Hence, the house hunter's client will send an I_MATCH( )signal. If both clients have sent and received I_MATCH( )signals, a two-way match has been established (C34).

This example of a finder-provider profile would normally be associated with the situation in which the requirements sent by the provider will be minimal. However, this will not always be the case, an example being an Employment Finder Profile as activated by a company seeking an employee (and therefore a provider in the context of this profile). For example, a user seeking employment (a finder) could only be considered for a match if they had suitable qualifications and experience for the position/s being offered. In this example the two-way match is significant, and would identify suitable candidates for suitable positions to both parties simultaneously, and neither the potential employer nor the potential employee would be notified of a match unless both were what the other was seeking.

Figure 11:
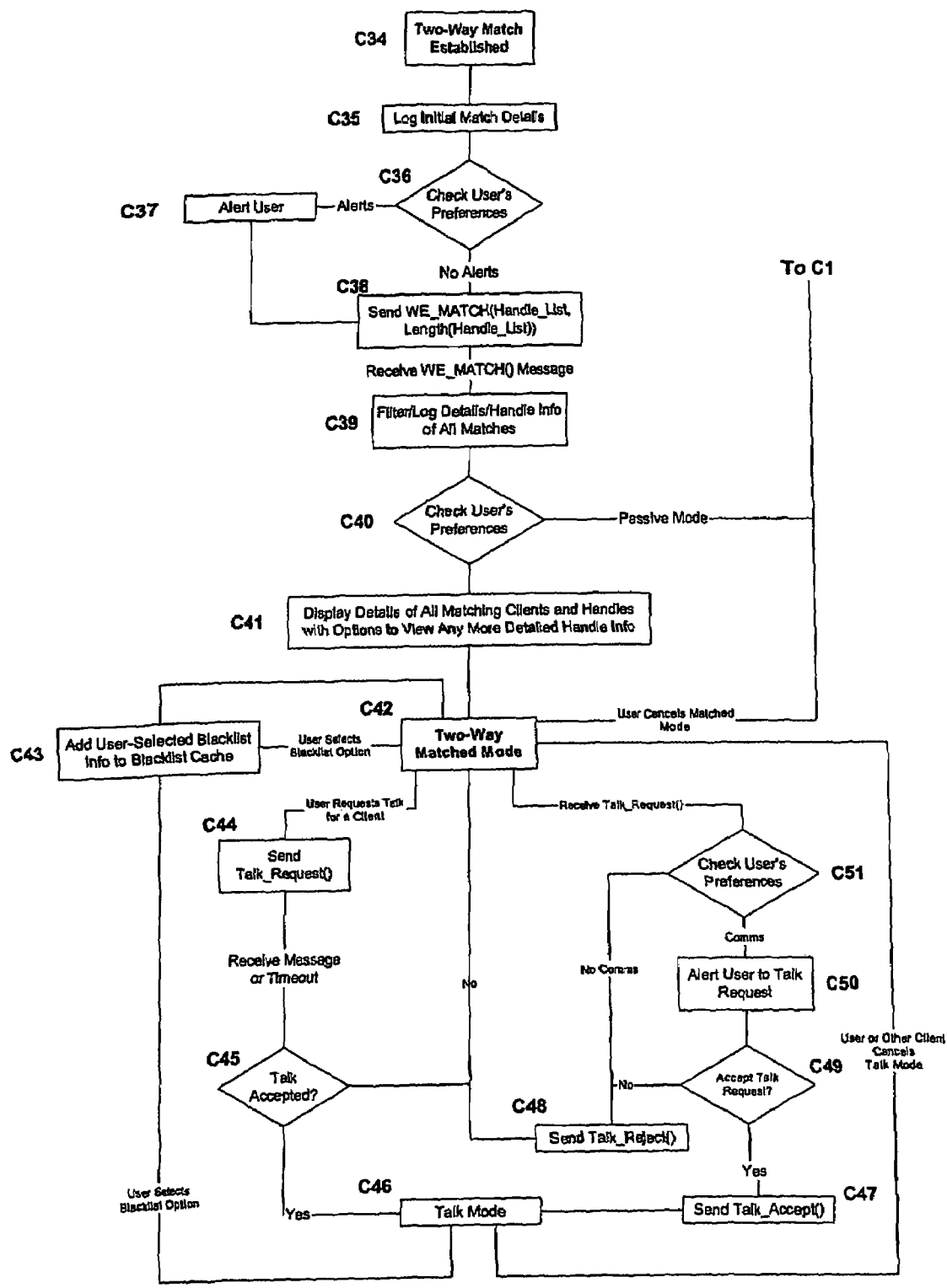
FIG. 11 is a flow diagram illustrating processes that occur on the client after the establishment of a two-way match according to the first specific embodiment of the invention.

The steps following the establishment of a two-way match will now be discussed with reference to FIG. 11. At step C34 the client has established one or more two-way matches for a particular profile instance. At step C35, the client logs some initial details about the established two-way match or matches.

The client then moves to step C36, at which point, depending on the user's predetermined preferences, the client either proceeds to C37 where it alerts the user and then proceeds to step C38, or it proceeds to step C38 directly. Therefore the user is given the option in this embodiment of specifying whether they wish to be alerted to the establishment of a two way match or not. In this embodiment (in which the clients are suitably programmed PCs) the client can alert the user via any standard means such as a pop-up window, or an audible alert. In embodiments of the invention in which the client is a portable device such as a mobile telephone, suitable alert mechanisms can include audible, visual or vibrating alerts.

Steps C38 to C40 may proceed in parallel, the client performing multiple instances of the logical flow, one for each other matched client.

At step C38, the client sends a WE_MATCH(Tag_List, Length(Tag_List)) message to each other matched client. The "Tag_List" contains the Tag information section for each matching item. The "Length( )" parameter informs the other client how many items are on the list, and should be equal to the value of NM that the client previously sent to the other client in the preceding I_MATCH(NM) message.

On receipt of a similar WE_MATCH( )message from the other matched client, the client proceeds to step C39 where it logs the additional match information it has received, such as the Tag sections of all matching items from this other client in the match log 39. Also, at step C39 the client may, depending on the user's recorded preferences for this profile, filter out any matching items that have already been identified to the user during a previous two-way match event (utilising the unique Tag ID supplied by the other client for each matching item's tag section).

The client then proceeds to step C40, at which point, depending on the users recorded preferences for this profile, it either returns to step C1 (once all parallel processes have reached this point), or else proceeds to step C41. The client might specify that the client returns to C1 at this point, if the user has selected some form of passive mode for this profile. Commercial "providers" are an example of user's who might wish to run in such a passive mode. Such users might monitor the contents of the match log 39 periodically for information about how many and what kind of matches they are attaining.

At step C41, the client displays to the user details of all of the two-way matches for this profile before proceeding to step C42 and the ensuing Two-Way Matched Mode. In some embodiments, this display can dynamically adjust, as more information arrives from any of the parallel processes that are exchanging WE_MATCH( )messages.

In the Two-Way Matched Mode, the user may explore details of any or all of these matches, including the information contained in the Tag sections for each matching item. This tag information can comprise any information that can be easily exchanged between clients, and the information contained therein will depend on the type of profile. In some embodiments a tag field can contain computer software, for example, in the form of a java applet that enables two matched clients to commence a programmed dialogue. Such programmed dialogues could be initiated when both clients are functioning in a passive mode.

In the case of the Property Finder Profile the tag sent from an estate agent's client could comprise a contact telephone number, web address or precise location of the estate agent, together with some details (for example including photographs, interactive walk-throughs, and floor plans) and reference numbers of all the matched properties.

In some embodiments, the client 2 may comprise a cache of any Tag IDs received from a particular Client ID after a two-way match has been established. For finder-provider profiles with multiple attribute sets, for example, the provider could automatically supply this Tag ID (for example, a reference number) along with the tag information for each matching attribute set. This could be used to automatically identify only those results that are new since the last time a match attempt was made. For example, this could enable a user to identify any new properties that have been added to a particular estate agent's books since the last time a match was identified.

In Two-Way Matched Mode (at step C42), the user can continue to explore the match details presented in the user display 41. In addition, the user has a number of options that will determine any subsequent actions by the client. The actions of any of the other matched clients may also determine the subsequent actions of the client.

The user may, for example, for any of the matched other clients, or for any of the matched other profile instances, select an option to blacklist any of this other client, this profile type belonging to this other client, or this particular profile instance belonging to this other client. Such a selection is handled at step C43, whereupon the appropriate details will be stored in the client blacklist cache 37 and uploaded to the appropriate section of the blacklist cache 9 that is stored on the server. After an entry has been made to the blacklist cache 37 the client returns to step C42.

The user may select the option to issue a "Talk" request to one or more of the matched clients. Each talk request will cause the client to proceed to step C44, at which point it sends a "Talk_Request( )" message to the selected other client. On receipt of a response (or a timeout) the client proceeds to step C45. If, at step C45, the client received a "Talk_Reject( )" message (or if the client timed out) then the client returns to step C42. If, the client received a Talk_Accept( )message then the client proceeds to step C46 and "Talk Mode" is established.

Similarly, while at step C42, the client may receive a Talk_Request( )message from one or more of the other clients. For each such message the client proceeds to step C51, where, depending on the users recorded preferences for this profile, it either automatically sends a Talk_Reject( )message (at step C48) before returning to step C42, or else it alerts the user to the Talk request at C50. At step C50, the user is presented with the option to accept or reject the talk request. At step C49, depending on the option selected by the user, the client either sends a Talk_Reject( )message at step C48 before returning to step C42, or sends a Talk_Accept( )message at step C47 before proceeding to step C46 and establishing Talk Mode.

In Talk Mode (C46), both clients have agreed to participate in some form of dialogue. In this embodiment, using personal computers connected over the Internet 4, the users communicate to each other via direct text messaging over the Internet 4. For example, if a user using a Sports Finder Profile has established a Two-Way-Match with another user, the two users could then enter Talk Mode and converse via direct text messaging. By doing this they could arrange a physical meeting if desired.

In other embodiments the users could communicate in Talk Mode via direct voice, direct video, or by any means over the Internet 4. In some embodiments the clients have the option (at this, or at some previous stage) to send each other anonymous email messages. Such messages could be routed via the introduction server 6 which would map the anonymous Client ID to the actual private email address of the appropriate client to preserve anonymity.

In Talk Mode, a user might, for some reason, wish to blacklist some or all profiles from the other client. In such cases, when the user selects this option, the client will proceed to step C43.

Otherwise, on conclusion or cancellation of Talk Mode by either the user or the other client, the client returns to step C42 and awaits the next event. At step C42, the client will return to C1 when the user elects to exit Two-Way Matched mode.

The previously described flow charts detail the matching processes according to one specific embodiment of the invention. However, different embodiments can employ different methods of communication between the various elements of the system. For example, whether certain communications are peer-to-peer from one client to another client, rather than being routed via the server, or being sent directly from the server on the client's behalf can vary in different embodiments. Furthermore, the precise breakdown may vary within one embodiment depending on the properties of different profile types.

In the embodiments thus far described the introduction server 6 either maintains a copy of the requirements section of every active profile in the introduction database 8 or else acquires it during the introduction process. These requirements are then sent directly to the relevant clients with compatible profiles at the appropriate point in the matching process. The introduction server 6 then provides the relevant clients with the necessary IP information to conduct communications directly in a peer-to-peer manner over the Internet 4. All subsequent communications regarding the success or failure of each attempt to match the received requirements with those of the corresponding stored attributes are then routed peer-to-peer between the relevant clients. Once each client has been furnished with the IP information, the server plays no further part in any subsequent communications between the two clients. However, in some embodiments the introduction server 6 is informed as to the eventual outcome of the communications or match attempts between clients.

Furthermore, in some embodiments the introduction server 6 does not receive the requirements sections of any profiles at any stage. In such cases, at step L6 of FIG. 4 each client would not send the requirements of any active profiles, and instead only the header sections of every active profile would be sent. The introduction server 6 would then determine which profiles are compatible and provide all the relevant clients with the appropriate IP information to enable the transfer of all further data involved in the matching process and subsequent communication to be transferred peer-to-peer between the clients.

Using the introduction server 6 to provide the clients involved in a compatible profile introduction with the necessary IP information to conduct communications directly in a peer-to-peer manner over the Internet 4 maximises the inherent scalability of the system. However, this is done at the expense of reducing the anonymity of the two clients.

In other embodiments, after the server has received the requirements, all subsequent communications between clients including those regarding the success or failure of each attempt to match the received requirements with those of the corresponding stored attributes are routed via and handled by the introduction server 6.

In such methods, the introduction server 6 acts an intermediary between the relevant clients throughout every communication. Therefore, none of the clients are made aware of any IP details of any other client. All messages between clients are exchanged via the introduction server 6, and the introduction server 6 forwards each message to the relevant client after removing all information about the actual identity of the originating client. This methodology maximises the inherent anonymity of the system. However, this is at the expense of reducing the scalability of the system, as the introduction server 6 must incur the additional overhead of active participation in every client-to-client communication.

In some embodiments, the communications model employed and the breakdown of which communications are peer-to-peer between clients, which are sent via the introduction server 6, and which are sent by the introduction server 6 on the clients' behalf can vary on a per profile or per profile instance basis.

In embodiments in which the requirements are stored by the introduction server 6 in the introduction database 8, these requirements need not be permanently stored. In some embodiments in which they are not permanently stored, the introduction server 6 requests the requirement sections from each client as and when they are needed, if a copy is not already present in the introduction database 8.

In all embodiments so far described it is the responsibility of the clients themselves to perform the comparison of the received requirements with those of their own stored attributes. One or more clients involved in a matching process might compare the received requirements against a potentially very large number of sets of virtual attributes stored in a very large database 50. The ability to distribute the match processing, which must query these very large databases, represents a scaleable solution to the problem of both storing and searching a potentially vast, disparate, and distributed collection of context sensitive data. It is also the case that in as the attribute data is stored locally, it is never transmitted, and therefore remains totally private to the user.

However, in some embodiments of the invention the clients could send the attributes of the profiles as well as the requirements to the introduction processor 300. In such embodiments the whole of the matching process could take place on the introduction server 6, and the clients would be informed when a two-way match has been established.

As discussed above, while the previously described embodiments employ a two-way match algorithm, there are many examples of applications where one side of the two-way match would ideally be trivial or even non-existent. That is, where one client is willing to match with any other client that wishes to match with it (for example an estate agent might be an example of such a client). In such cases, the user would wish to populate their requirements section so as to be either extremely non-specific or perhaps even non-existent (NULL). In order to facilitate this some embodiments allow certain profile types (for example, those with a predetermined flag in the header section set to a certain range of values) to have NULL requirements or attributes sections. The ability to specify either NULL requirements sections or NULL attributes sections may be allowed or disallowed by the profile template's author for any of both parties, or only the finder party, or only the provider party.

In such cases, the introduction server 6 can perform the trivial side of the match itself, only involving the client with the NULL attributes section once a two-way match has been established. This is because NULL attributes will always match with NULL requirements. Such embodiments are suited to "instant-style" or "one-off" match attempts.

In the embodiment described below the first client need not be a registered user of the communications system, and need not perform any actual match processing. This embodiment is applicable to finder-provider type profiles in which the finder is allowed to have NULL attributes and the provider NULL requirements, and where the first client is a finder. In this embodiment, the introduction server 6 will carry out all communications and match processing on behalf of the first client (there is no match processing as there are no attributes for the first client beyond those contained within the introduction attributes).

In such an embodiment, the introduction server 6 could be incorporated within or co-operate with an Internet search engine. The search engine could offer as one of its search options the ability to perform profile-based searches. In this embodiment, the first user (a finder who need not be a registered user) visits the search engine's website, selects the profile-based search option, and selects one of the supported profile types (e.g. Property Finder). The first user is then presented with a form in which to define their introduction requirements and attributes, and also their requirements proper. Once completed, this populated form is submitted to the search engine. In this embodiment the finder's attributes are NULL.

The search engine now, via the introduction server 6, identifies compatible other clients (from among its active registered clients) and sends them the first user's requirements. In this embodiment, the introduction server 6 acts on the first client's behalf and sends and receives all messages concerning the match attempts.

The first user is then presented with any matching results and associated tag information, and, if they are a registered user and logged in, they are given additional options to store this particular profile, schedule periodic match attempts for the profile, set Introduction Limits, etc.

In this embodiment one side of the two-way match is automatically considered a match because the first finder client will have NULL attributes and the other provider clients will have corresponding NULL requirements. Therefore, the introduction server 6 does not store the first user's attributes, as for the finder variant of the profile there are no attributes (other than any attributes that might be in the introduction criteria). The first client does not participate in the matching process. After populating the requirements for the profile, and submitting them to the introduction server 6, the first client simply waits for results from the introduction server 6 indicating the outcome of any match attempts (profile-based searches). The introduction server 6 acts on behalf of the first client throughout the match attempt (i.e. it sends an I_MATCH message to all of the compatible clients and handles the I_MATCH or I_DON'T_MATCH messages from the compatible clients).

As discussed, the introduction criteria of a profile could take the form of geographic location data. For example, when using a Property Finder Profile, the estate agent (the provider) could specify their location in the introduction attributes, and the property seeker (the finder) could specify a location and search radius in the introduction requirements. The introduction server 6 will initiate a match attempt between the two profile instances if the geographic location of the provider falls within the search radius of the finder.

As is the case with the full requirement and attribute data, it is possible that, for certain profile types, one half of the two-way match will be trivial. In this example, for instance, the estate agent is not concerned by the location of the property seeker, so their introduction requirements are likely to be minimal or non-existent (NULL).

In embodiments that use the Internet 4 as the communications medium and the introduction server 6 as a virtual meeting place for compatible profiles, there are no inherent geographic or proximity-based constraints to the system. This is a general characteristic of the Internet 4, which is, by nature, global in scope. For example, IP addresses, domain names, and host names contain no reliable geographic information. However, the ability to conduct searches over the Internet 4 that are able to take geographic location into account is highly desirable.

For many applications (i.e. profile types), therefore, the introduction criteria comprise fields that describe geographic locations and geographic location requirements. These are comprised in a number of field types that allow for the specification of geographic location and proximity data either as geocoded data or else based on place naming schema, which may be hierarchical, e.g. Country, County/State/Province, Town, Street, Post/Zip Code, etc.

In addition, as the introduction criteria are stored in the introduction database 8 and processed by the introduction server 6, third party Geographic Information Systems (GIS) and their Geographic Databases of information can be utilised. These include systems provided by ESRI such as ArcIMS, ArcGIS, and ArcSDE.

By interfacing with such existing software products and/or databases of detailed place information, the introduction server 6 can allow geographic introduction attribute data to be described by an address or by a Postcode/ZipCode entered by the user. Furthermore, the client could enter the introduction attribute data by such means as clicking on an interactive map displayed on suitable browser software on the client. Introduction attribute data can then be automatically converted, i.e. geocoded, into the appropriate geographic coordinates (geocode) by and for the GIS system. Geographic introduction requirement data could be similarly entered with the addition of a geocoded radius field to allow a search area to be defined.

For example, the introduction criteria could be structured as follows:

Header:
Introduction Attributes: GEO_XY:I_AM_HERE: x,y
Introduction Requirements: GEO_XY:I_AM_LOOKING_HERE: x,y GEO_RAD:WITHIN_RADIUS: R miles The same or similar GIS system could then be utilised efficiently to determine if a profile's geocoded introduction requirements are satisfied by another profile's geocoded introduction attributes.

Embodiments of the invention can use both standard hierarchical methods and geocoding methods. Furthermore additional methods can be supported by the addition of appropriate field types. On this basis, searches could be conducted according to different granularities. For example, a user could specify that they are interested in limiting match attempts to all suitable estate agents in Britain, or in Berkshire, or in Crowthorne or in Crowthorne High Street. In addition, as the introduction criteria are specific to a particular instance of a profile, a user can have multiple active profiles each searching different geographic areas.

Similarly a user can specify geographic introduction attributes to whatever granularity they are comfortable with, and it is not necessary for a user to specify their complete address. Although introduction attribute data is not visible to other users, a user may not wish for other users to be able to identify them as having compatible profiles that pin down their position within too specific an area (within a very small village, for example).

Any geographic information contained within the introduction criteria of the header section does not negate the possible need for further geography related attributes and requirements in the body of the profile. Such geographic attributes and requirements similarly comprise suitable geographic location and proximity field types. To use an analogy with a shop with the example of a finder-provider profile, any geographic introduction attributes merely define the location of the provider, which is their conceptual front door. The geographic introduction requirements of the finder define the location and radius of the conceptual front-doors they would like their match attempts to "walk through". Once past the front-door, the requirements proper are exchanged, and any further geographic requirements pertaining to the item or user being searched for are now the responsibility of the full profile matching mechanism to resolve.

The geographic information for a given profile—as might be contained within either the introduction criteria or the profile body, or both—is generally static. That is, the user will generally enter this information at the time a profile is populated to specify any relevant geographic location to be associated with the profile's introduction attributes, attributes proper, or tags (e.g. an estate agent's, or a particular property's, location), and to narrow down the scope of a profile's introduction requirements and requirements proper (e.g. the estate agent must be located in Bristol, and the property must be located in Clifton in Bristol).

However, embodiments of the invention can use dynamic geographic information. Such information could be obtained by a global positioning system (GPS), and incorporated within certain profiles where this is desirable. Geographic information obtained in such a way could be utilised, for example, to allow a user to attempt to match with all of the other users within a certain radius of their current position.

For many profile types, it is desirable that the introduction criteria be comprised of data other than geographic information.

Examples of introduction criteria of a non-geographic nature include:

A Business Category for shopping related finder-provider profiles, e.g. Retail, Wholesale, Private;
Information about the sex of an individual and the sex of the individual they are seeking for Personal Relationship type finder-finder profiles, e.g. [Male], [Female], [Male, Female].

The self-describing nature of profiles enables a large number of other forms of such introduction criteria comprised of any standard and appropriate field types. Thus, an effectively infinite variety of information can be used to determine if any two profiles should perform the full matching process. The full matching process itself can use an effectively infinite variety of information as the attributes and requirements data to define the characteristics of, and the search-criteria for, the information being matched, and can use an effectively infinite variety of information as the tag data to describe any matched information. Hence, embodiments of the invention can be used as a general-purpose system for querying and matching information. The ability of the query processor 60, to automatically construct a suitable query for a proprietary database based on received requirements from a common profile type, provides a general-purpose system for querying heterogeneous, distributed databases.

As discussed, embodiments of the invention provide a means of querying remote databases in heterogeneous environments. A profile's type determines and clearly defines the relevant attributes (the data) and the appropriate requirements (the search-criteria). This context specific nature of a profile provides a mechanism by which to interface between remote and potentially highly disparate databases that nonetheless contain very similar information. For example, a large record store will inevitably have an inventory database in some form or other. The databases of all large record stores are all very likely to contain similar information, as they are all concerned with selling what amounts to the same stock. It is very likely that the databases of all such large record stores contain a set of core information that is effectively identical to each other's database.

However, it is quite likely that these data are stored and retrieved in entirely different ways in each database. Each database might be implemented under different $3^{rd}$ party technologies, such as Oracle or Sybase, as well as employing very different logical structures. For example, one record store could use as the third field of a record within their database a field entitled "Artist". While another similar store might have a similar field, but store it as the first field of a record within their database entitled "Artist/Group". Furthermore, the internal representations of this data in each database may be different. For example, one of the above stores might use a 200-character array of 16-bit ASCII characters, while the other might use a linked list of 32-bit ASCII characters.

A customer wishing to query the inventory of a record store would be required to have access to the store's computer system, and know something about the implementation and underlying structure of the database, in order to construct a meaningful query. It is therefore unlikely that a customer will be able to directly query the store's computer system and access the information they may require.

In practice, record stores, or indeed any other business, that wish to provide their customers with some form of limited access to their inventory or other database will provide a customized interface either through dedicated terminals within their store or else via the World Wide Web.

However, users of a system for matching information according to embodiments of the present invention could be provided with a Record Finder Profile. This profile type could comprise the core attributes common to all records and CDs, together with the necessary requirements fields to construct meaningful queries against this data. In such an example the virtual attributes sets of the record store would be stored in their existing database, which would act as a back-end database 50.

A record store wishing to allow users to search certain aspects of their database of CDs could populate an appropriate provider variant of a Record Finder Profile, activate it, and automatically convert any received requirements sections from a user of a finder variant of the Record Finder Profile into the appropriate queries for their particular database of CDs.

A user's requirements could define a number of CDs that the user is interested in buying. If the introduction criteria of each profile match, and if the store has any of the CDs that the user is interested in, a match will be established. Tag information for the matching CDs can then be sent to the user, which could include the price of the CDs in question, the store's location, the precise location within the store, the CD's current stock level, and any special offers (such as buy one CD and get another free) that are applicable.

The record stores would have to provide a means of converting any received requirements into a suitable query for their database using a query processor 60. It will be apparent to those skilled in the art that this would be a simple operation. For example this could be performed by a suitable user supplied computer program or script (called from a pre-defined user hook in the client software). This user hook, or another user hook, could similarly be used to retrieve and generate any appropriate tag data once a two-way match has been established.

The same Record Finder Profile could be used by the user to query the databases of every record store with the Record Finder Profile, without any modification of the databases of each record store. Such a method of matching information allows users to query a large number of databases, regardless of how the data are internally arranged therein. The user can also be confident that the information they obtain from such a query is accurate, as it has been obtained from the record store's database at the time of enquiry. This contrasts to conventional price comparison Internet web sites, which allow a user to compare the prices of goods from a variety of retailers. However, such systems rely on infrequent updates and are as such not suitable for providing accurate stock information. Similarly, they are reliant on each retailer supplying this information to a central source, and in some cases certain retailers may be reluctant to so openly share price or stock information with their competitors. Hence such price comparison web sites are inherently limited.

Embodiments of the invention provide a means by which a user can query the disparate databases of other users without the full contents of the database or the virtual attributes sets of the profile (a subset of the database) ever having to be shared with any other user for a match to be established. However, once a match has been established the users can share information as required.

An example of some data structures for the self-describing profiles discussed above will now be described. In these examples, a profile is made up of a collection of fields, and each profile type comprises at least the following main sections: the header (comprising the introduction criteria), the attributes, the requirements, and the tag sections Each section of the profile could be delineated by an XML-like tag, e.g.

```
<header>
  ...
</header>
<attributes>
  ...
</attributes>
<requirements>
  ...
</requirements>
<tag>
  ...
</tag>
```

Each section of a profile could be comprised of one or more fields of a pre-defined type. The precise composition and function of each field type may vary depending on the context in which they appear, e.g. whether the field is located within the introduction criteria, the attributes section, the requirements section, or the tag section.

Two example field types will now be discussed with reference to Table 1 and Table 2.

Table 1 shows an illustration of the characteristics that comprise a Selection field type. The Selection field type allows the user to select from a pre-defined list of alternative values. The creator of the profile structure can implement a Many Flag characteristic to distinguish between lists that require only one value to be selected, and those in which multiple values can be selected. The creator of the profile structure can also implement the Include Flag within the requirements section of the profile to allow the user to explicitly match (include) or fail (exclude) against particular attributes. The OR_Values Flag allows the creator of a profile to specify in the requirements section of a profile whether multiple selected values should, by default, be matched with the appropriate attributes as a logical OR or as a logical AND. The Selectable_AND_OR Flag can be used within the requirements section to specify whether or not to allow the user to override this default behaviour.

TABLE 1

Selection Example

| Component | Attribute Context | Requirement Context |
|---|---|---|
| FIELD | Contains the field name as presented to the user | Same as attributes |
| ID | Identifies this attribute field uniquely within the Profile | Contains the ID of the attribute field against which it is to be compared to establish a match |
| TYPE | i.e. SELECTION | Same as attributes |
| Mandatory | If set to TRUE, identifies this field as Mandatory. If set to FALSE, identifies this field is Optional. Determines whether or not the user MUST supply a value for this field. | When set to True, do NOT match with users who have not entered any data for this field. When set to False, ALWAYS match with users who have not entered any data for this field. |
| Many | If set to TRUE, user may select more than one value. If set to FALSE, user may select only one value | Same as attributes |
| Values | List of Values to choose from | Same as attributes |
| Default | Default Value from Values | Same as attributes |
| Selected Values | List of User-selected values | Same as attributes |
| Help | Help text to be displayed as a hint to the user as to the meaning of this field | Same as attributes |
| Include | N/A | If set toTRUE, values selected will be included. If set to FALSE, values selected will be excluded. |
| OR_Values | N/A | If set to TRUE, will match "any" of selected values. If set to FALSE, will match on "all" selected values only. |
| Selectable_AND_OR | N/A | If set to TRUE, user can select between OR and AND for selected values. If set to FALSE, user cannot select the behaviour. Behaviour will be determined by the value of "OR_Values". |

An example of an occurrence of a Selection field type as might be used within an attributes section of a profile is as follows:

```
<!FIELD Property Type>
<ID=10>
<Type=SELECTION>
<Mandatory=TRUE>
<Many=FALSE>
<Values=Detached House, Semi-Detached House, Apartment, Bungalow>
  <Default=NULL>
<Selected Values="">
<Help="Select the type of property you are selling">
</Property Type>
```

An example of an occurrence of a Selection field type as might be used within a requirements section of a profile is as follows:

<!FIELD Property Type>

<ID=# 10>

<Type=SELECTION>

<Mandatory=TRUE>

<Many=TRUE>

<Include=TRUE>

<OR_Values=TRUE>

<Selectable_AND_OR=FALSE>

<Values=Detached House, Semi-Detached House, Apartment, Bungalow>

<Default=Semi-Detached House>

<Selected Values=" ">

<Help="Select the type of property you are seeking">

</Property Type>

Table 2 shows an illustration of the characteristics that comprise an Int Numeric field type. The integer numeric field type records and matches attributes and requirements based on integer numeric information. In the illustration of an integer numeric field type in Table 2, the user can (depending on the value of the Range Flag) enter a minimum/maximum pair of values.

TABLE 2

Integer Numeric Example

| Component | Attribute Context | Requirement Context |
|---|---|---|
| FIELD | Contains the field name as presented to the user | Same as attributes |
| ID | Identifies this attribute field uniquely within the Profile | Contains the ID of the attribute field against which it is to be compared to establish a match |
| TYPE | i.e. INT_NUMERIC | Same as attributes |
| Mandatory | If set to TRUE, identifies this field as Mandatory. If set to FALSE, this field is Optional. Determines whether or not the user MUST supply data. | If set to True, do NOT match with users who have not entered any data for this field. If set to False, ALWAYS match with users who have not entered any data for this field. |
| Range | N/A | If set to TRUE, user can select a minimum and maximum value. If set to FALSE, user can select one value only |
| Min | Specifies minimum permissible selected value | Same as attributes |
| Max | Specifies maximum permissible selected value | Same as attributes |
| Selected Value | The value entered by the user | Same as attributes if Range = FALSE, otherwise N/A |
| Selected Min | N/A | If Range = TRUE, the min value entered by the user. |
| Selected Max | N/A | If Range = TRUE, the max value entered by the user. |
| Default | Default Value | Default value or default min and max values |
| Help | Help text to be displayed as a hint to the user as to the meaning of this field | Same as attributes |

An example of an occurrence of an Int_Numeric field type as might be used within an attributes section of a profile is as follows:

<!FIELD Your Age>

<ID=12>

<Type=INT_NUMERIC>

<Mandatory=FALSE>

<Min=16>

<Max=>

<Selected Value=NULL>

<Default=NULL>

<Help="Enter Your Age (Optional)">

</Your Age>

An example of an occurrence of an Int_Numeric field type as might be used within a requirements section of a profile is as follows:

<!FIELD Age>

<ID=#12>

<Type=INT_NUMERIC>

<Mandatory=FALSE>//i.e. Match If not Disclosed

<Range=TRUE>

<Min=16>

<Max=>

<Selected Min=NULL>

<Selected Max=NULL>

<Default Value=NULL>

<Help="Enter The Age Range of the Person You Are Looking For">

</Age>

In the above examples, the Field ID is used to uniquely identify a field within the attributes section of a profile, and is used by all of the corresponding requirements fields to identify the relevant attributes fields.

In the example field types shown in Table 1 and Table 2, some characteristics are for control purposes only and would not be presented directly to the user. The Many Flag in Table 1 is an example of such a characteristic. The device used to populate a profile containing this field type recognises that when the Many Flag is set to True it will present the user with the option to select multiple items from the selection list. When false, it will present a suitable menu structure so as to prevent the user from selecting more than one value.

Certain fields in a profile may be allowed to be kept unpopulated, i.e. blank. For example, a user may not wish to enter their age or salary into the attributes field of a Relationship Finder Profile. When a user enters their requirements for such an individual field that can be kept blank, they are given the option of specifying whether or not this field be considered mandatory or not (the Mandatory Flag in Tables 1 and 2 is used for this purpose when it occurs within a requirements section). This will set the Mandatory Flag for the field to "True" or "False". Selecting that an individual requirements field be mandatory will result in blank fields in other user's attributes never returning a match. Conversely, selecting that a requirements field is not mandatory will always result in a match being indicated with corresponding blank attribute fields.

The above field types are only exemplary, and it will be apparent that many additions or modifications to the above are possible. For example, other field types could include Keyword, Time, Exact Text, Floating Point Numeric, Geocode_XYZ, Geocode_XYZ_Dynamic, Software_Applet, Image, Video, etc.

Fields of type Keyword, for example, would allow users to specify a list of keywords, which are in effect free text that can be entered as attributes and matched against by requirements. Such fields, which allow free-text matching, enable a profile to be extended beyond the confines of its original design. For example, the name of the designer or builder of the property could be included within the keyword field of the attributes for a Property Finder Profile, if the author of the Property Finder Profile omitted this field from the original design. This field could then of course be officially incorporated into a later release of the Property Finder Profile.

For finder-finder profiles, the attributes and requirements sections of a profile are built from a set of fields that are mirrored for both users. However, the list of attribute fields will not necessarily be the same as the list of requirements fields, and for example two requirements could be matched against a single attribute (e.g. an include list and an exclude list). For finder-provider profiles, such as the Property Finder Profile, the attributes and requirements sections of the profile are substantially different.

The header of the profile includes the profile ID that uniquely identifies the profile type. In addition the header may include the introduction criteria of each profile, any Subset identifiers, and any timing information that indicates the predetermined active period of the profile. For finder-provider profiles, the header may also contain a field that indicates whether the user is a finder or a provider within the context of this profile.

The attributes section of a profile can comprise a variable set of attributes fields. In some embodiments of the invention it may be desirable to reference the attributes of the user with an external back-end database 50. As discussed, a supplied user hook may be used to call a suitably configured external program or script via the query processor 60 to dynamically convert received requirements into a suitable database query for the data stored in such a database and to return any records that constitute matching virtual attribute sets.

The requirements section of a profile may comprise a variable set of search criteria fields. As discussed, unlike the attributes of the user, the requirements are sent to other devices during the matching process.

The tag section will comprise the information sent to users once a two-way match has been established. As discussed, the use of a tag is optional and may contain elements that are populated dynamically from the search results by the query processor 60.

The software used to populate the profiles generates the appropriate forms and presents the data in an appropriate way to the user. The client 2 recognises the field type, and uses this information to apply the correct algorithm when matching, in order to obtain a match or no match result for each field. Similarly, the introduction server 6 recognises the field type, and uses this information to apply the correct algorithm when identifying compatible profiles, in order to obtain a match or no match result for each field in the introduction criteria. The use of self-describing profiles comprising pre-defined field types allows the introduction server 6 and the client 2 to parse any legally constructed profile, built from any combination of fields. Hence, both an official and a $3^{rd}$ party could create and distribute a profile template to suit any particular need.

Furthermore, the self-describing nature of profiles enables the introduction server 6 and the client 2 to support a large and ever changing variety of applications (one per available Profile ID) without requiring any modification to the underlying implementation. All of the context specific information relating to a particular application can be contained within a suitably authored and populated profile.

Although in the specific embodiment described above the Internet is used, this is not essential to the present invention. The present invention can be applied to an application shared between machines that communicate with each other, for example, over a network. Therefore, although the specific embodiment network uses the Internet, the present invention is applicable to any network whether it be a conventional landline network or a wireless network. More specifically, the present invention is applicable to the Internet, an intranet, an extranet, a local area network, a wide area network or a network employing wireless application protocol.

Many further variations and modifications will suggest themselves to those versed in the art upon making reference to the foregoing illustrative embodiments, which are given by way of example only, and which are not intended to limit the scope of the invention, that being determined by the appended claims.

The invention claimed is:

1. A system for matching information comprising:
a first sub-system programmed to store at least one profile, wherein the said at least one profile contains predetermined attributes and requirements and predetermined introduction information;
a second sub-system programmed to store at least one profile, wherein the said at least one profile contains predetermined attributes and requirements and predetermined introduction information;
an introduction processor programmed to receive data relating to the said introduction information from the said first sub-system, wherein the introduction processor is programmed to compare the said introduction information from the said first sub-system with introduction information received from the said second sub-system and to register a compatible profile introduction between the said first sub-system and the said second sub-system when the said introduction information of the said first sub-system or the said second sub-system is satisfied by the introduction information of the other of the said first sub-system or the said second sub-system; and
a match processor comprised within the said first sub-system, the said match processor being programmed to receive information relating to requirements of the said second sub-system when the said introduction processor registers a compatible profile introduction between the said first sub-system and the said second sub-system, the said match processor being further programmed to register a match between the said first sub-system and the said second sub-system when the said attributes of the said first sub-system match the said requirements of the said second sub-system; and
wherein the said first sub-system does not need to receive information relating to the said attributes of the said second sub-system, in order to register a match with the said second sub-system.

2. A system for matching information according to claim 1, wherein the introduction processor is programmed to register a compatible profile introduction between the said first sub-system and the said second sub-system only when both the said introduction information of the said first sub-system is satisfied by the introduction information of the said second sub-system and the said introduction information of the said second sub-system are satisfied by the introduction information of the said first sub-system.

3. A system for matching information according to claim 1, wherein the introduction information of the said first sub-system and the said second sub-system comprises introduction attributes and introduction requirements, and wherein the said introduction processor is programmed to compare the introduction attributes from the said first sub-system with the introduction requirements from the said second sub-system and to compare the introduction attributes from the said second sub-system with the introduction requirements from the said first sub-system, and to register a compatible profile introduction between the said first sub-system and the said second sub-system when the said introduction requirements of the said first sub-system or the said second sub-system are satisfied by the introduction attributes of the other of the said first sub-system or the said second sub-system.

4. A system for matching information according to claim 3, wherein the introduction processor is programmed to register a compatible profile introduction between the said first sub-system and the said second sub-system only when both the said introduction requirements of the said first sub-system are satisfied by the introduction attributes of the said second sub-system and the said introduction requirements of the said second sub-system are satisfied by the introduction attributes of the said first sub-system.

5. A system for matching information according to claim 1, further comprising an introduction data store connected to the said introduction processor, the said introduction data store being programmed to store received introduction information from the said first sub-system or the said second sub-system.

6. A system for matching information according to claim 5, wherein the said introduction data store is programmed to store information relating to the requirements of the said first sub-system and the said second sub-system, and wherein the introduction processor is programmed to send information relating to the requirements of the said first sub-system to the said second sub-system, and to send information relating to the requirements of the said second sub-system to the said first sub-system, on the establishment of a compatible profile introduction.

7. A system for matching information according to claim 1, wherein on the establishment of a compatible profile introduction the said first sub-system is programmed to send information relating to the requirements of the profile involved in the compatible profile introduction to the said second sub-system via the introduction processor.

8. A system for matching information according to claim 1, wherein on the establishment of a compatible profile introduction the said first sub-system is programmed to send information relating to the requirements of the profile involved in the compatible profile introduction to the said second sub-system via a peer-to-peer connection between the said first sub-system and the said second sub-system.

9. A system for matching information according to claim 1, wherein the said first sub-system is programmed to enter a matched mode when the said match processor has established that a match has been made.

10. A system for matching information according to claim 9, wherein the said first sub-system is programmed to enter the said matched mode only when the said match processor has established that a match has been made and that a match signal has been received from the said second sub-system, the said match signal indicating that the said second sub-system has registered a corresponding match.

11. A system for matching information according to claim 1, wherein the said second sub-system does not comprise a match processor, and wherein the said introduction processor is programmed to receive information relating to the said requirements of the said first sub-system when the said introduction processor registers a compatible profile introduction between the said first sub-system and the said second sub-system, the said introduction processor being further programmed to register a match between the said second sub-system and the said first sub-system when a condition determined by the information relating to the said requirements of the said first sub-system is satisfied.

12. A system for matching information according to claim 11, wherein the said attributes of the said second sub-system and the said requirements of the said first sub-system are null, and wherein the said introduction processor will always register a match between the said second sub-system and the said first sub-system.

13. A system for matching information according to claim 11, wherein the said first sub-system is programmed to enter a matched mode only when the said match processor has established that a match has been made and that a match signal has been received from the said introduction processor, the said match signal indicating that the said introduction processor has registered a corresponding match between the said second sub-system and the said first sub-system.

14. A system for matching information according to claim 1, wherein the said first sub-system is further programmed to store at least one tag, the or each said tag comprising information to be shared with the said second sub-system on the establishment of a match, wherein the said first sub-system is programmed to enable the or each said tag to be sent to the said second sub-system on the establishment of a match.

15. A system for matching information according to claim 14, wherein the said first sub-system is programmed to send the or each said tag to the said second sub-system via the introduction processor.

16. A system for matching information according to claim 14, wherein the said first sub-system is programmed to send the or each said tag to the said second sub-system via a peer-to-peer connection between the said first sub-system and the said second sub-system.

17. A system for matching information according to claim 14, wherein the or each said tag comprises any one or combination of text data, graphics data, audio data, video data, geographic data, hypertext-inks or computer software.

18. A system for matching information according to claim 17, wherein the or each said tag comprises a java applet, wherein the or each said Java applet is programmed to establish a programmed dialogue between the said first sub-system and the said second sub-system.

19. A system for matching information according to claim 1, wherein the said first sub-system is further programmed to allow a user to designate which of the stored at least one profiles the user designates as active; and the introduction processor is further programmed to receive information relating to the said introduction information from only the active profile or profiles stored in the said first sub-system.

20. A system for matching information according claim 1, wherein the or each said profile comprises a self-describing data file, each self-describing data file comprising at least one field.

21. A system for matching information according to claim 1, wherein the said first sub-system is programmed to store at least one profile that is a finder-finder profile, the said finder-finder profile comprising at least one requirement field for every corresponding attribute field.

22. A system for matching information according to claim 1, wherein the said first sub-system is programmed to store at least one profile that is a finder-provider profile, the or each said finder-provider profile comprising a variant for a finder and a variant for a provider, and wherein for each attribute field in the or each provider variant there is at least one corresponding requirement field in the finder variant.

23. A system for matching information according to claim 22, wherein the said first sub-system is programmed to store an indication of whether a user of the said first sub-system is a provider or a finder in the profile.

24. A system for matching information according to claim 22, wherein the said first sub-system is programmed to store multiple instances of the said attributes for the provider variant of the profile.

25. A system for matching information according to claim 24, wherein the said first sub-system comprises a backend database, the said backend database comprising information relating to the at least one profile.

26. A system for matching information according to claim 25, wherein the said backend database is programmed to store information relating to multiple instances of the said attributes for the provider variant of the profile as multiple sets of virtual attributes.

27. A system for matching information according to claim 26, wherein the said first sub-system comprises a query processor, the said query processor being programmed to construct a query from the information relating to the received requirements of the said second sub-system and to submit the query to the said backend database, wherein on reception of the said query the backend database is programmed to provide the match processor with information relating to any matching instances of the said virtual attributes.

28. A system for matching information according claim 25, wherein the said first sub-system is further programmed to store at least one tag, the or each said tag comprising information to be shared with the said second sub-system on the establishment of a match, wherein the said first sub-system is programmed to enable the or each said tag to be sent to the said second sub-system on the establishment of a match; and wherein the said backend database is programmed to store tag information as virtual tag data.

29. A system for matching information according to claim 28, wherein the said first sub-system comprises a query processor, the said query processor being programmed to query the said backend database in order to generate the said tag information from the virtual tag data.

30. A system for matching information according claim 1, wherein the or each said profile comprises a header section, the header section comprising the predetermined introduction information of the respective profile.

31. A system for matching information according to claim 30 wherein the said first sub-system is further programmed to allow a user to designate which of the stored at least one profiles the user designates as active; and the introduction processor is further programmed to receive information relating to the said introduction information from only the active profile or profiles stored in the said first sub-system; and wherein the said introduction processor is programmed to receive the header section of the active profile or profiles stored in the said first sub-system.

32. A system for matching information according to claim 30, wherein the header section of the or each said profile comprises one or more subset identifiers, the or each subset identifier comprising predetermined segregation information, wherein the introduction processor is programmed to use the or each said subset identifier to segregate otherwise compatible profiles according to the predetermined segregation information.

33. A system for matching information according to claim 1, wherein the said first sub-system is further programmed to store a unique ID of the said first sub-system.

34. A system for matching information according to claim 1, wherein the said first sub-system is further programmed to store a unique Profile ID for the or each profile stored in the said first sub-system.

35. A system for matching information according to claim 34, wherein the said first sub-system is programmed to store multiple instances of a profile with the same Profile ID, wherein each said multiple instance of a profile is assigned a unique Profile Instance ID.

36. A system for matching information according to claim 1, wherein the introduction processor comprises a recent encounters cache for the said first sub-system, the said recent encounters cache comprising information relating to compatible sub-systems that have been involved in profile introductions with the said first sub-system, wherein the introduction processor is programmed to refrain from trying to establish a compatible profile introduction with profiles received from compatible sub-systems if appropriate information is contained in the said recent encounters cache.

37. A system for matching information according to claim 36, wherein the said recent encounters cache comprises any one or combination of a list of unique IDs of compatible sub-systems, a list of unique Profile IDs from compatible sub-systems, or a list of the profile Instance IDs for a particular instance of a profile from compatible sub-systems.

38. A system for matching information according to claim 1, wherein the introduction processor comprises a blacklist cache for the said first sub-system, the said blacklist cache comprising information relating to compatible sub-systems that have been involved in profile introductions with the said first sub-system that have been blacklisted by a user of the said first sub-system, wherein the introduction processor is programmed to refrain from trying to establish a compatible profile introduction with profiles received from compatible sub-systems if appropriate information is contained in the said blacklist cache.

39. A system for matching information according to claim 38, wherein the said blacklist cache comprises any one or combination of a list of unique IDs of compatible sub-systems, a list of unique Profile IDs from compatible sub-systems, or a list of the profile Instance IDs for a particular instance of a profile from compatible sub-systems.

40. A system for matching information according to claim 1, wherein the said first sub-system comprises a sub-system recent encounters cache, the said sub-system recent encounters cache comprising any one or combination of: a list of unique IDs of compatible sub-systems, a list of unique Profile IDs from compatible sub-systems, or a list of the profile Instance IDs for a particular instance of a profile from compatible sub-systems that have been involved in match processing with the said first sub-system.

41. A system for matching information according to claim 1, wherein the said first sub-system further comprises a sub-system blacklist cache, the said sub-system blacklist cache comprising any one or combination of: a list of unique IDs of compatible sub-systems, a list of unique Profile IDs from compatible sub-systems, or a list of the profile Instance IDs for a particular instance of a profile from compatible sub-systems that have been blacklisted during match processing by a user of the said first sub-system.

42. A system for matching information according to claim 1, wherein the said first sub-system is programmed to store a match log, the said match log comprising information regarding previously established matches.

43. A system for matching information according to claim 42 wherein the said first sub-system is further programmed to store at least one tag, the or each said tag comprising information to be shared with the said second sub-system on the establishment of a match, wherein the said first sub-system is programmed to enable the or each said tag to be sent to the said second sub-system on the establishment of a match; and wherein the match log comprises match information comprised in any received tags.

44. A system for matching information according to claim 1, wherein on establishment of a match the said first sub-system is programmed to enter a talk mode with the said second sub-system, wherein in the said talk mode the said first system is programmed to share information with the said second sub-system.

45. A system for matching information according to claim 44, wherein in the said talk mode the said first system is programmed to share information with the said second sub-system via any one or combination of: direct text, direct voice, direct video, or anonymous email over a communications network.

46. A system for matching information according claim 1, wherein the introduction information comprises geographic information.

47. A system for matching information according to claim 46, wherein the said geographic information is obtained dynamically using GPS.

48. A system for matching information according to claim 1, wherein the said first sub-system is programmed to communicate with the said introduction processor via any one of the Internet, an intranet, an extranet, a local area network, a wide area network or a network employing wireless application protocol.

49. A system for matching information according to claim 48, wherein the said first sub-system is programmed to communicate with the said introduction processor via a wireless application protocol comprising any one of: 808.11a, 808.11b, WAP, GRPS or 3G transmission.

50. A system for matching information according to claim 1, wherein the introduction processor is programmed to send software to a user device to enable the said user device to function as a first sub-system.

51. A system for matching information according to claim 50, wherein the said software is in the form of a java applet.

52. An operation method for a system for matching information comprising:

using a first sub-system to store at least one profile, wherein the said at least one profile contains predetermined attributes and requirements and predetermined introduction information;

using a second sub-system to store at least one profile, wherein the said at least one profile contains predetermined attributes and requirements and predetermined introduction information;

using an introduction processor to receive data relating to the said introduction information from the said first sub-system, to compare the said introduction information from the said first sub-system with introduction information received from the said second sub-system, and to register a compatible profile introduction between the said first sub-system and the said second sub-system when the said introduction information of the said first sub-system or the said second sub-system is satisfied by the introduction information of the other of the said first sub-system or the said second sub-system; and using a match processor comprised within the said first sub-system to receive information relating to requirements of the said second sub-system when the said introduction processor registers a compatible profile introduction between the said first sub-system and the said second sub-system, and to register a match between the said first sub-system and the said second sub-system when the said attributes of the said first sub-system match the said requirements of the said second sub-system; and wherein the said first sub-system does not need to receive information relating to the said attributes of the said second sub-system, in order to register a match with the said second sub-system.

53. A computer storage medium having computer program code stored thereupon for controlling a computer to carry out a method according to claim 52.

54. The computer storage medium according to claim 53 comprising a carrier medium carrying the computer program code.

* * * * *